(12) United States Patent
Cassarly et al.

(10) Patent No.: US 7,777,955 B2
(45) Date of Patent: Aug. 17, 2010

(54) RIPPLED MIXERS FOR UNIFORMITY AND COLOR MIXING

(75) Inventors: William J. Cassarly, Wooster, OH (US); Thomas L. R. Davenport, Tucson, AZ (US); James P. McGuire, Jr., Pasadena, CA (US)

(73) Assignee: Optical Research Associates, Pasadena, CA (US)

( * ) Notice: Subject to any disclaimer, the term of this patent is extended or adjusted under 35 U.S.C. 154(b) by 45 days.

(21) Appl. No.: 11/442,673

(22) Filed: May 26, 2006

(65) Prior Publication Data

US 2007/0024971 A1 Feb. 1, 2007

Related U.S. Application Data

(60) Provisional application No. 60/703,808, filed on Jul. 29, 2005.

(51) Int. Cl.
*G02B 27/10* (2006.01)
*G02B 5/136* (2006.01)
*F21V 7/04* (2006.01)
*G01D 11/28* (2006.01)

(52) U.S. Cl. ............ 359/618; 359/546; 362/551; 362/555; 362/26

(58) Field of Classification Search .......... 359/546, 359/618; 222/137, 145.6, 570; 366/339, 366/343; 455/226.1, 330; 241/46.11; 362/551, 362/555, 26

See application file for complete search history.

(56) References Cited

U.S. PATENT DOCUMENTS

| | | | |
|---|---|---|---|
| 2,215,900 A | 9/1940 | Bitner | |
| 2,254,961 A | 9/1941 | Harris | |
| 3,997,240 A | 12/1976 | Kebabian | |
| 4,260,220 A | 4/1981 | Whitehead | |
| 4,551,628 A | 11/1985 | Grossman | |
| 4,906,070 A | 3/1990 | Cobb, Jr. | |
| 4,918,583 A | 4/1990 | Kudo et al. | |
| 5,056,892 A | 10/1991 | Cobb, Jr. | |
| 5,109,465 A | 4/1992 | Klopotek | |

(Continued)

FOREIGN PATENT DOCUMENTS

WO  WO 03/071321 A1  8/2003

OTHER PUBLICATIONS

Feuermann, Daniel et al., "Optical Performance of Axisymmetric Edge-ray Concentrators and Illuminators", Applied Optics, vol. 37, No. 10, pp. 1905-1912, Apr. 1998.

(Continued)

*Primary Examiner*—Jessica T Stultz
*Assistant Examiner*—Mahidere S Sahle
(74) *Attorney, Agent, or Firm*—Knobbe Martens Olson & Bear LLP

(57) ABSTRACT

Various embodiments described herein comprise mixers comprising a light pipe having input and output ends and a central region therebetween. An optical path extends in a longitudinal direction from the input end through the central region to the output end. The central region of the light pipe comprises one or more rippled reflective sidewalls having a plurality of elongate ridges and valleys and sloping surfaces therebetween. Light from the input end propagating along the optical path reflects from the sloping surfaces and is redirected at a different azimuthal direction toward the output end thereby mixing the light at the output end. Illuminance and/or color mixing can therefore be provided.

114 Claims, 44 Drawing Sheets

U.S. PATENT DOCUMENTS

| | | | |
|---|---|---|---|
| 5,303,084 | A | 4/1994 | Pflibsen et al. |
| 5,363,470 | A | 11/1994 | Wortman |
| 5,609,780 | A | 3/1997 | Freedenberg et al. |
| 5,745,632 | A | 4/1998 | Dreyer |
| 5,844,588 | A | 12/1998 | Anderson |
| 5,949,941 | A | 9/1999 | DiGiovanni |
| 5,966,491 | A | 10/1999 | DiGiovanni |
| 6,005,722 | A * | 12/1999 | Butterworth et al. ........ 359/712 |
| 6,043,425 | A | 3/2000 | Assad |
| 6,080,467 | A | 6/2000 | Weber et al. |
| 6,158,882 | A | 12/2000 | Bischoff, Jr. |
| 6,219,480 | B1 | 4/2001 | Cassarly et al. |
| 6,350,041 | B1 * | 2/2002 | Tarsa et al. .................. 362/231 |
| 6,419,365 | B1 | 7/2002 | Potekev et al. |
| 6,467,916 | B2 | 10/2002 | Winston |
| 6,504,948 | B1 | 1/2003 | Schedmmel et al. |
| 6,517,210 | B2 | 2/2003 | Peterson et al. |
| 6,676,263 | B2 | 1/2004 | Winston |
| 6,746,124 | B2 | 6/2004 | Fischer et al. |
| 6,857,752 | B2 | 2/2005 | Eckhardt |
| 6,862,091 | B2 | 3/2005 | Johnson |
| 6,921,178 | B2 | 7/2005 | Ohkawa |
| 6,995,355 | B2 | 2/2006 | Rains, Jr. et al. |
| 7,021,797 | B2 | 4/2006 | Minano et al. |
| 7,329,029 | B2 | 2/2008 | Chaves et al. |
| 2001/0012429 | A1 | 8/2001 | Wach et al. |
| 2005/0180159 | A1 | 8/2005 | Wu et al. |
| 2005/0225988 | A1 | 10/2005 | Chaves et al. |
| 2006/0049782 | A1 | 3/2006 | Vornsand et al. |

OTHER PUBLICATIONS

Ries, Harald et al., "Performance Limitations of Rotationally Symmetric Nonimaging Devices", J. Optical Society of America A, vol. 14, No. 10, pp. 2855-2862, Oct. 1997.

Bortz, John et al., "Advanced Nonrotationally Symmetric Reflector for Efficient and Uniform Illumination of Rectangular Apertures", Proc. SPIE, vol. 3781, pp. 110-119, Oct. 1999.

Shatz, Narkis et al., "Nonrotationally Symmetric Reflectors for Efficient and Uniform Illumination of Rectangular Apertures", Proc. SPIE, vol. 3428, pp. 176-183, Jul. 1998.

Shatz, Narkis et al., "An Inverse Engineering Perspective on Nonimaging Optical Design", Proc. SPIE, vol. 2538, pp. 136-156, Aug. 1995.

Shatz, Narkis et al., "Nonrotationally Symmetric Nonimaging Systems that Overcome the Flux-transfer Performance Limit Imposed by Skewness Conservation", Proc. SPIE, vol. 3139, pp. 76-85, Jul. 1997.

Leutz, Ralf et al., "Squaring the Circle—The Use of Microstructures for Converting and Homogenizing Beam Patterns", Proc. SPIE vol. 5186, pp. 106-112, Nov. 2003.

Garwin R.L., "The Design of Liquid Scintillation Cells", Review of Scientific Instruments, No. 23, pp. 755-757, Apr. 18, 1952.

Davenport, Thomas L.R. et al., "Optimization for Efficient Angle-to-Area Conversion in Illumination Systems", Proc. SPIE, vol. 5524, pp. 93-100, Oct. 2004.

Davenport, Thomas L.R. et al., "Optimizing Angle-to-Area-Converting Light-piping Systems Using Surface Features", Proc. SPIE, vol. 5942, pp. 1-10, Aug. 2005.

Davenport, Thomas L.R. et al., "Optimization for Illumination Systems: The Next Level of Design", Proc. SPIE, vol. 5456, pp. 81-90, Sep. 2004.

Gibson, William, "Curled Light Pipes for Thin Organic Scintillators", Review of Scientific Instruments, vol. 35, No. 8, pp. 1021-1023, Aug. 1964.

Kneipp, K.G., "Use of Prismatic Films to Control Light Distribution", International Lighting in Controlled Environments Workshop, Mar. 1994 (15 pages), available at http://ncr101.montana.edu/Light1994Conf/6_6_Kneipp/Kneipp%20text.htm.

Chaves, J. et al., "Virtual Filaments that Mimic Conventional Light Bulb Filaments", Proc. SPIE, vol. 5529, pp. 120-129, Sep. 2004.

Luetz, Ralf et al., "Microstructured Light Guides Overcoming the Two-dimensional Concentration Limit", Applied Optics, vol. 44, No. 32, pp. 6885-6889, Nov. 10, 2005.

Davenport, Thomas R.L. et al., "Optimization for Efficient Angle-to-Area Conversion in Illumination Systems", presentation delivered at SPIE Annual Meeting (21 pages), Aug. 2, 2004.

International Search Report—Jun. 26, 2008.

Written Opinion of International Searching Authority for PCT/US06/29274—Jun. 26, 2008.

International Preliminary Report on Patentability for International application No. PCT/US2006/029274, dated Apr. 9, 2009.

William J. Cassarly et al., "Non-Rotationally Symmetric Mixing Rods," International Optical Design Conference 2006, held Jun. 4-8, 2006, eds. Gregory et al., Proc. SPIE-OSA, SPIE vol. 6342, pp. 63420Q-1 to 63420Q-12.

Extended European Search Report for EP Application No. 06788704, dated Sep. 30, 2009.

Office Action for European Appl. No. 06788704.2 dated Feb. 25, 2010.

* cited by examiner

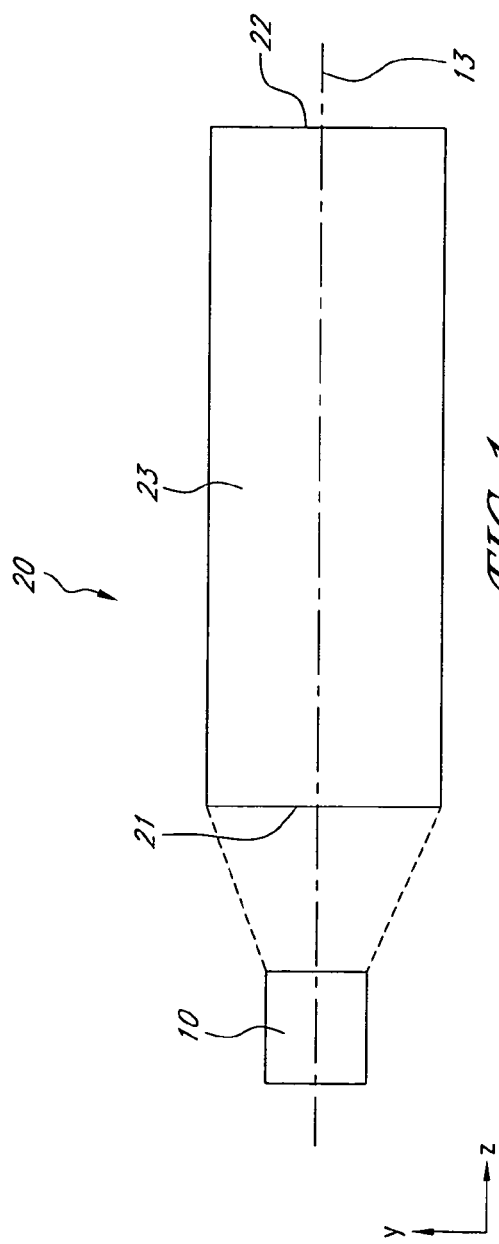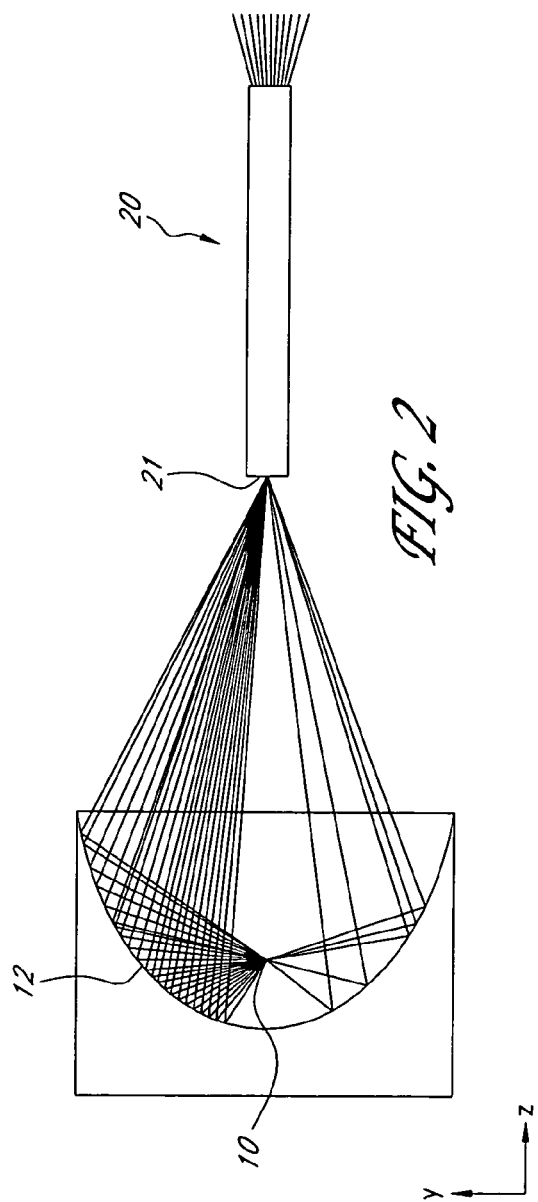

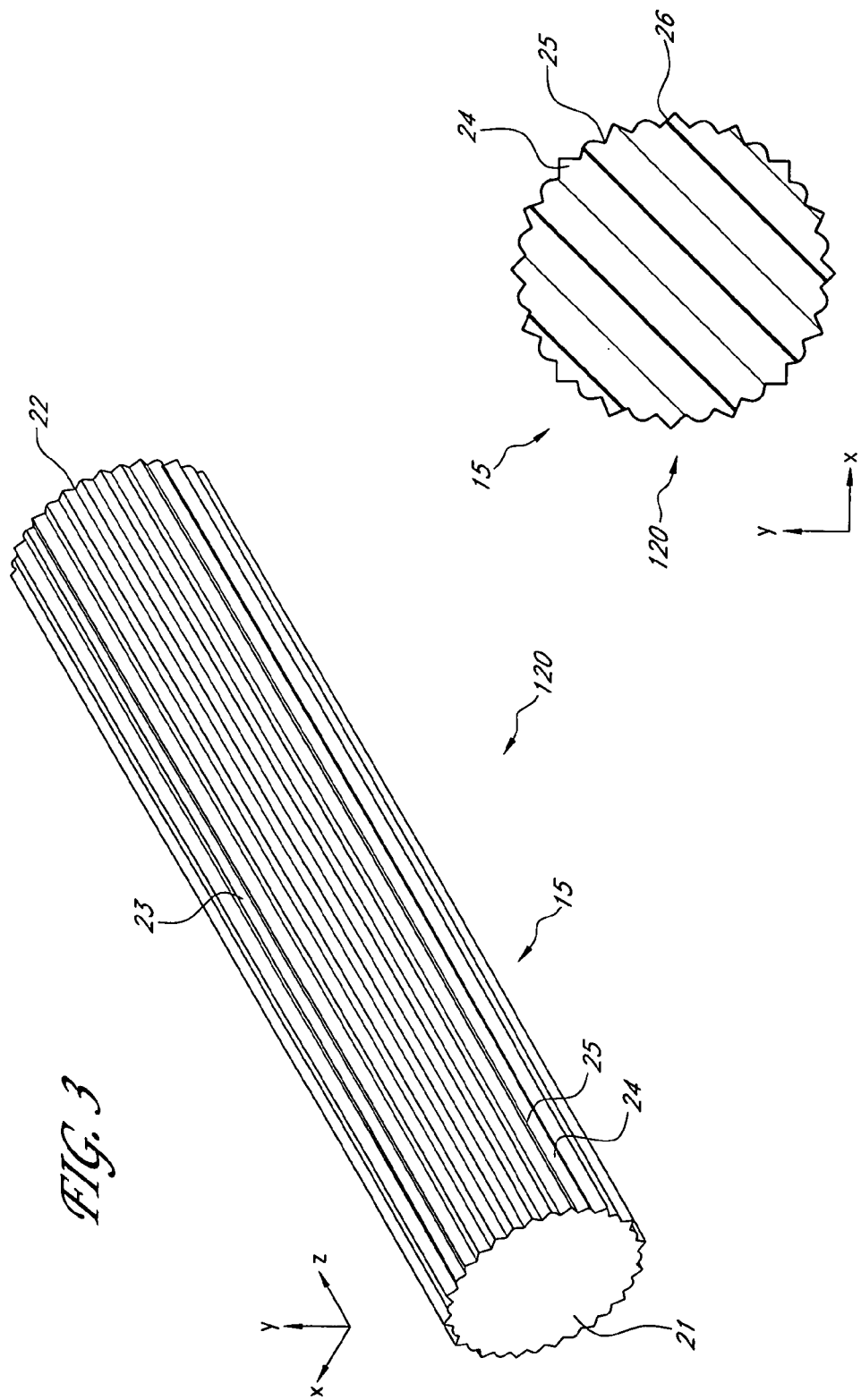

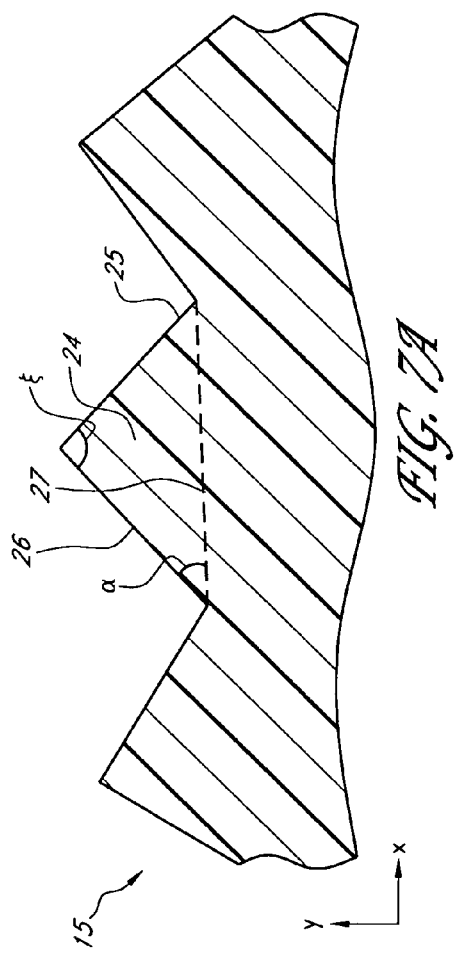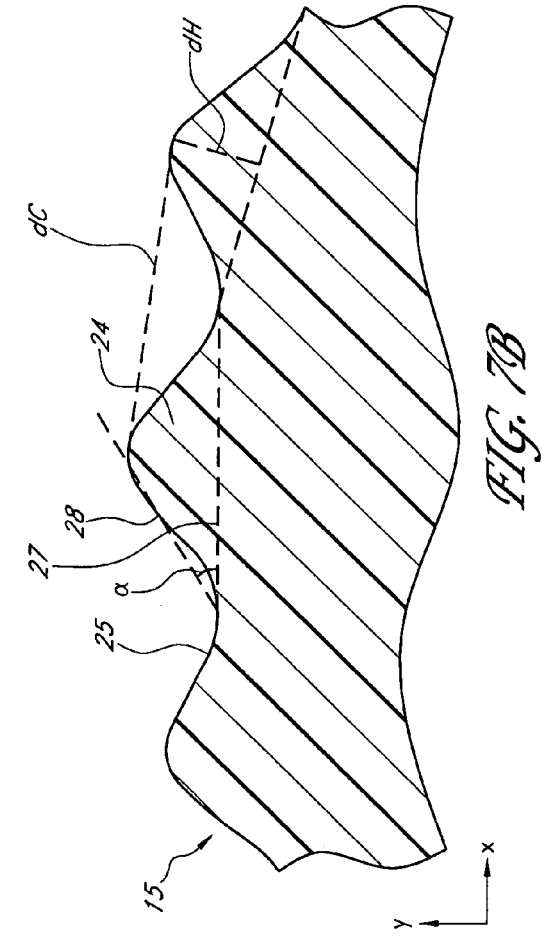

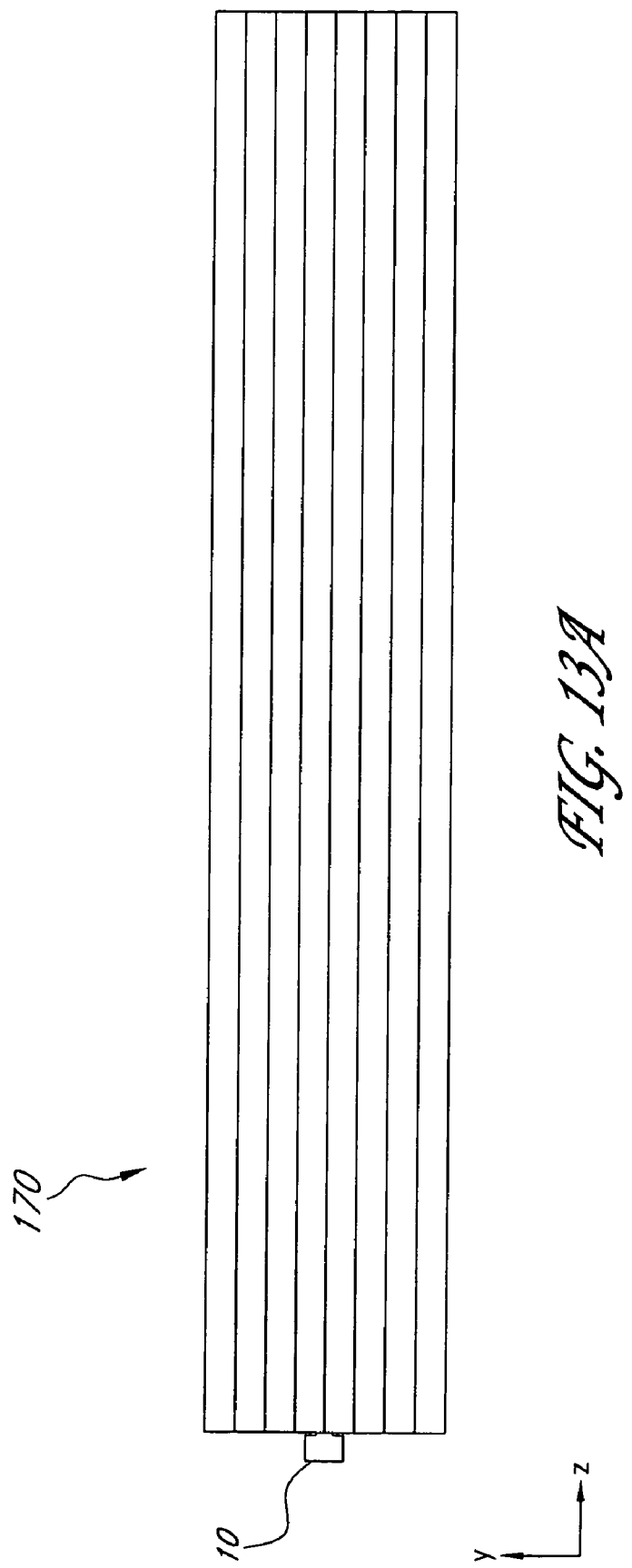

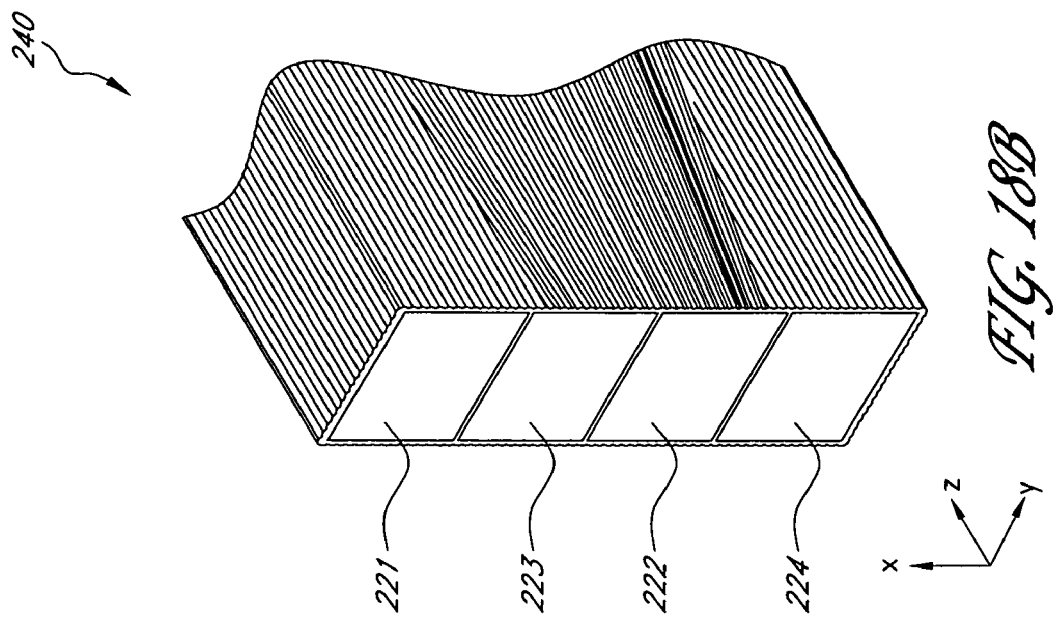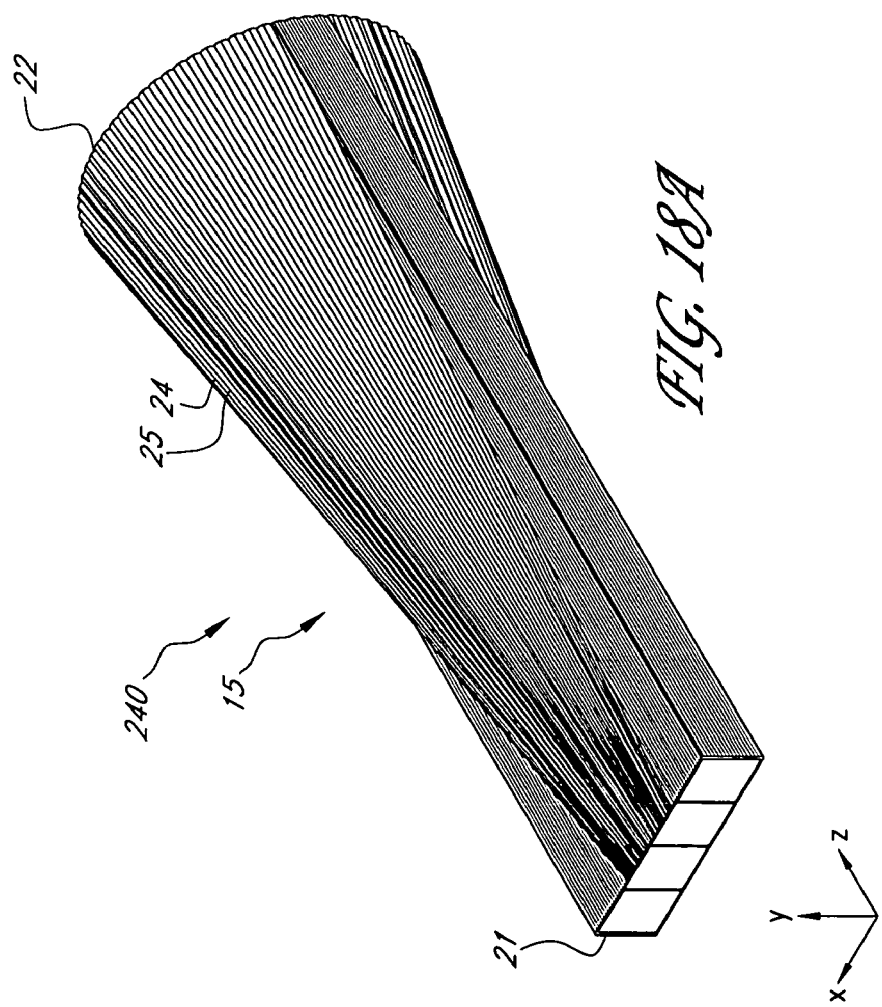

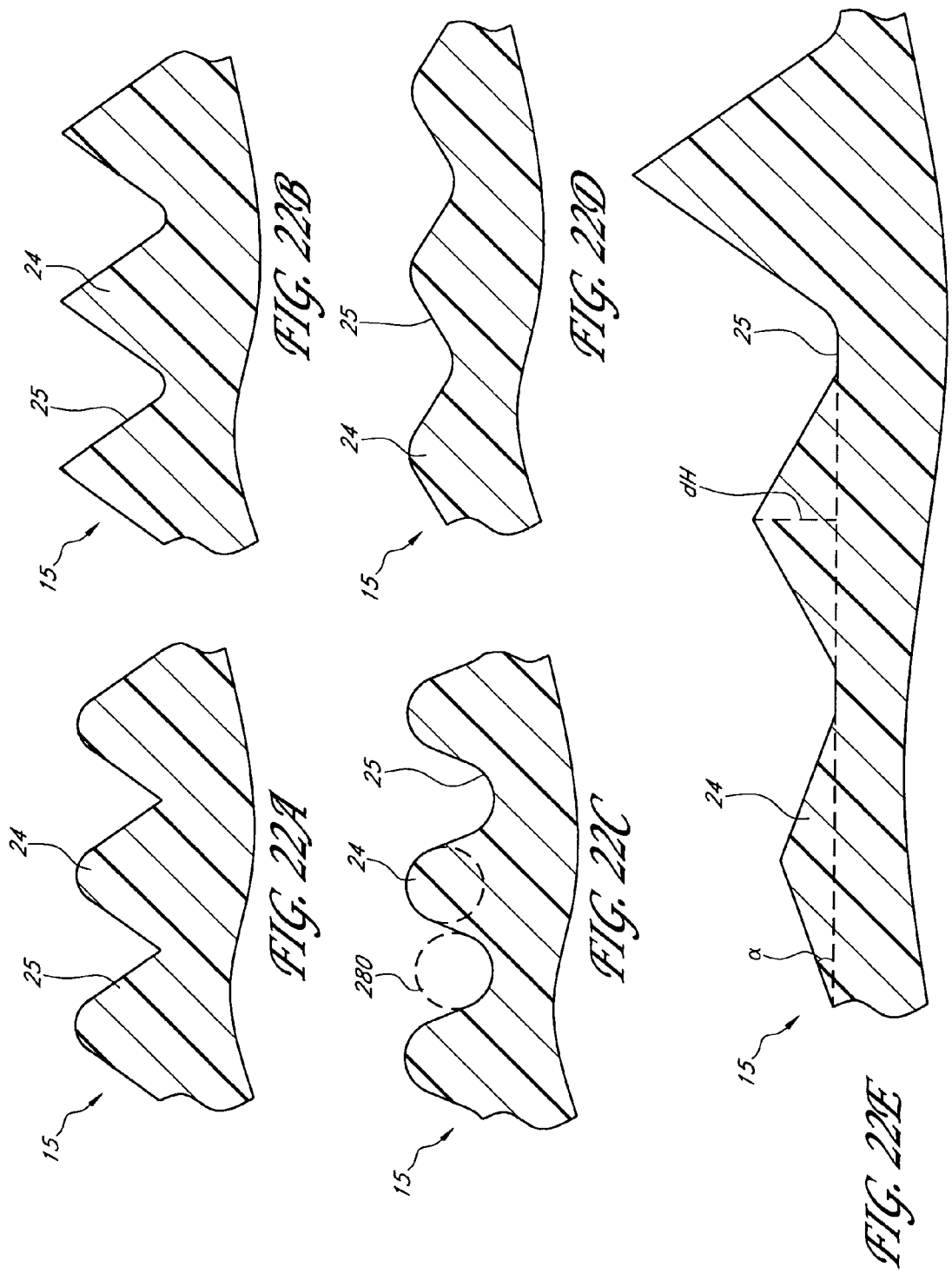

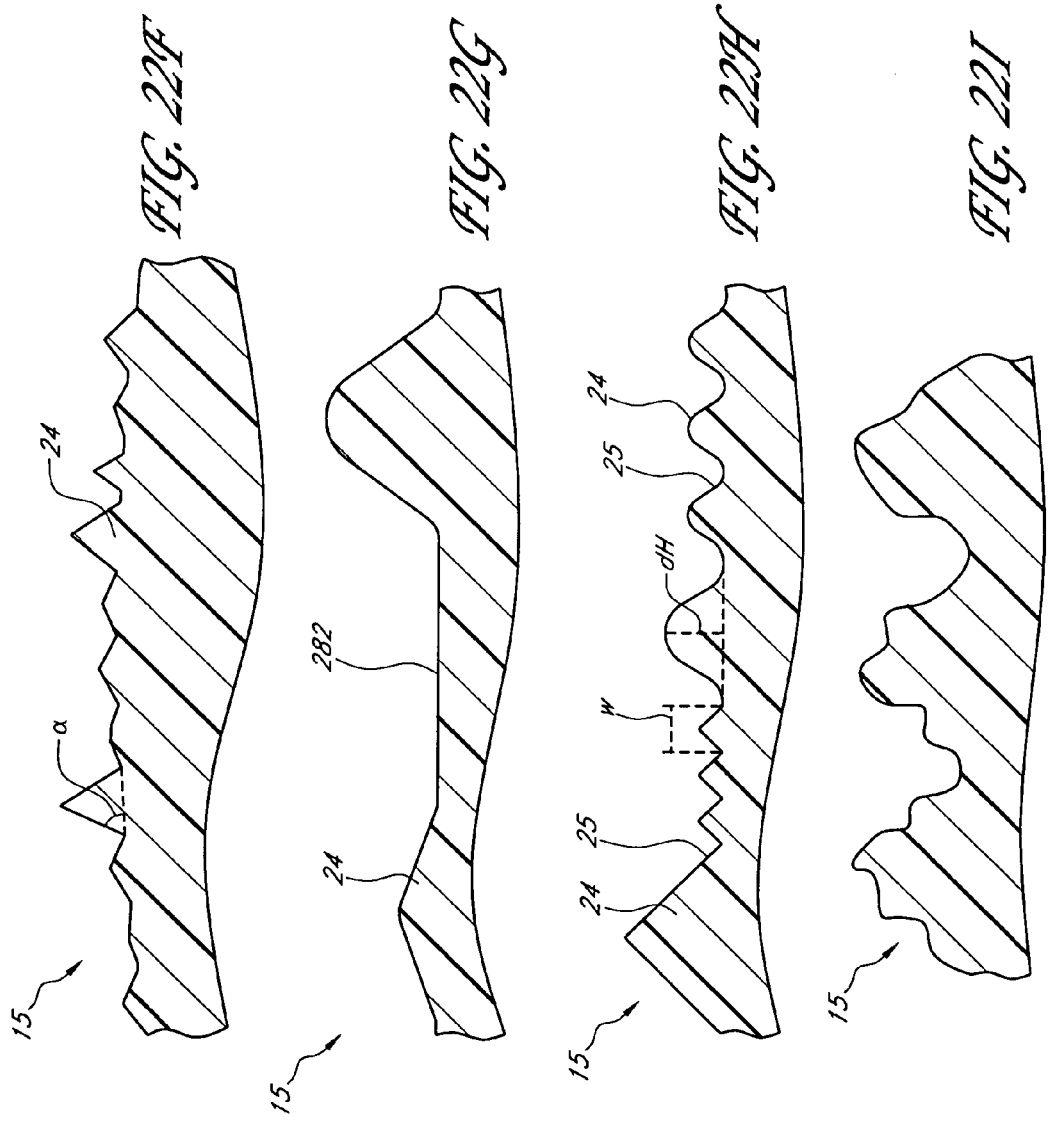

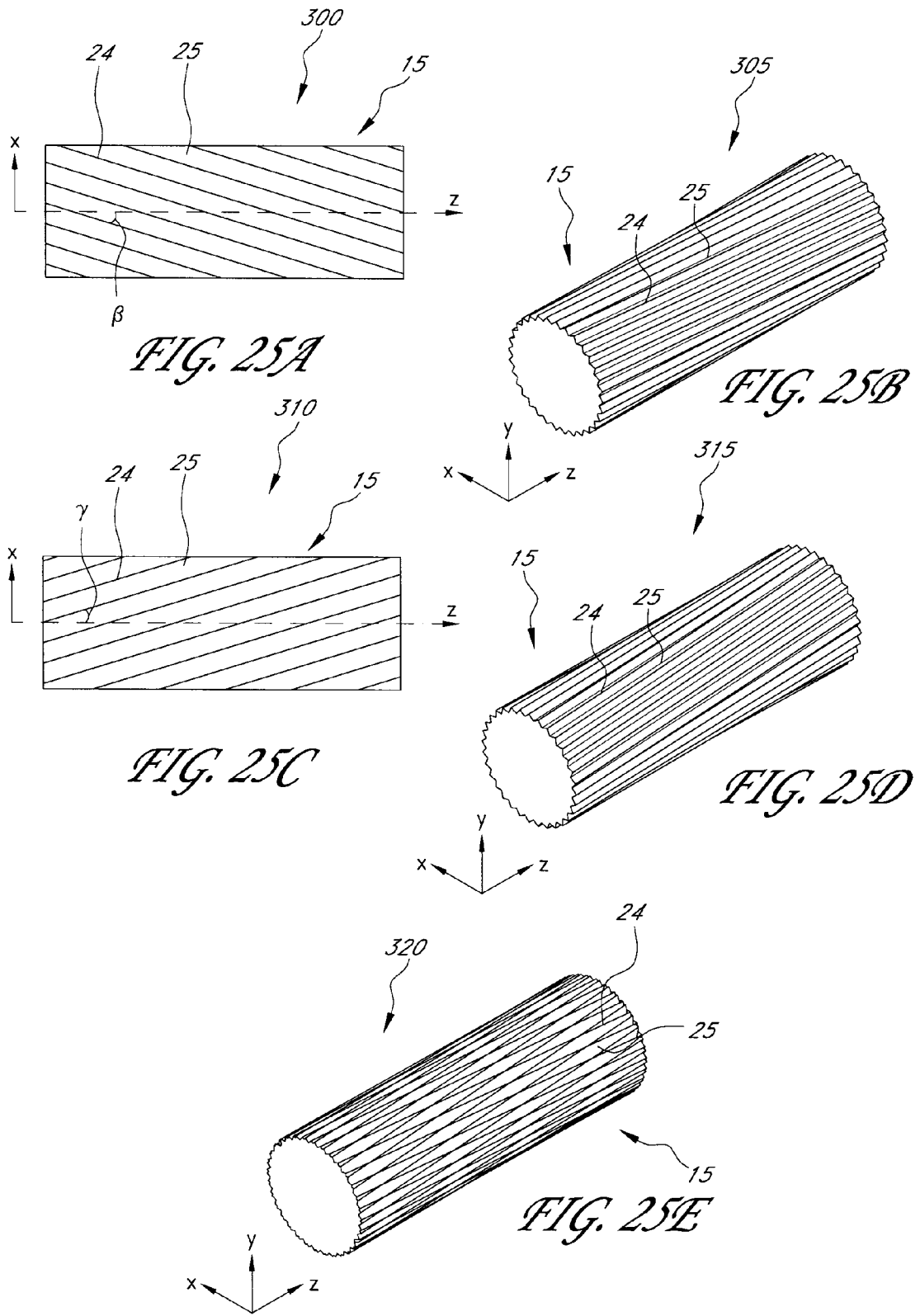

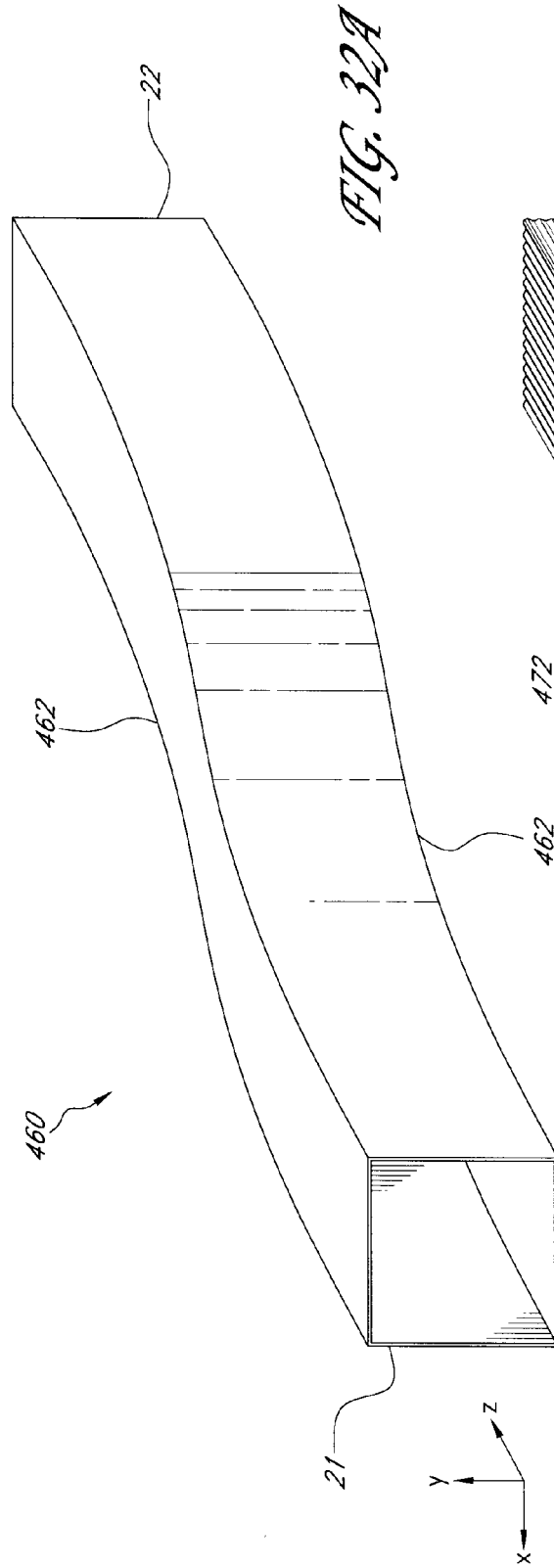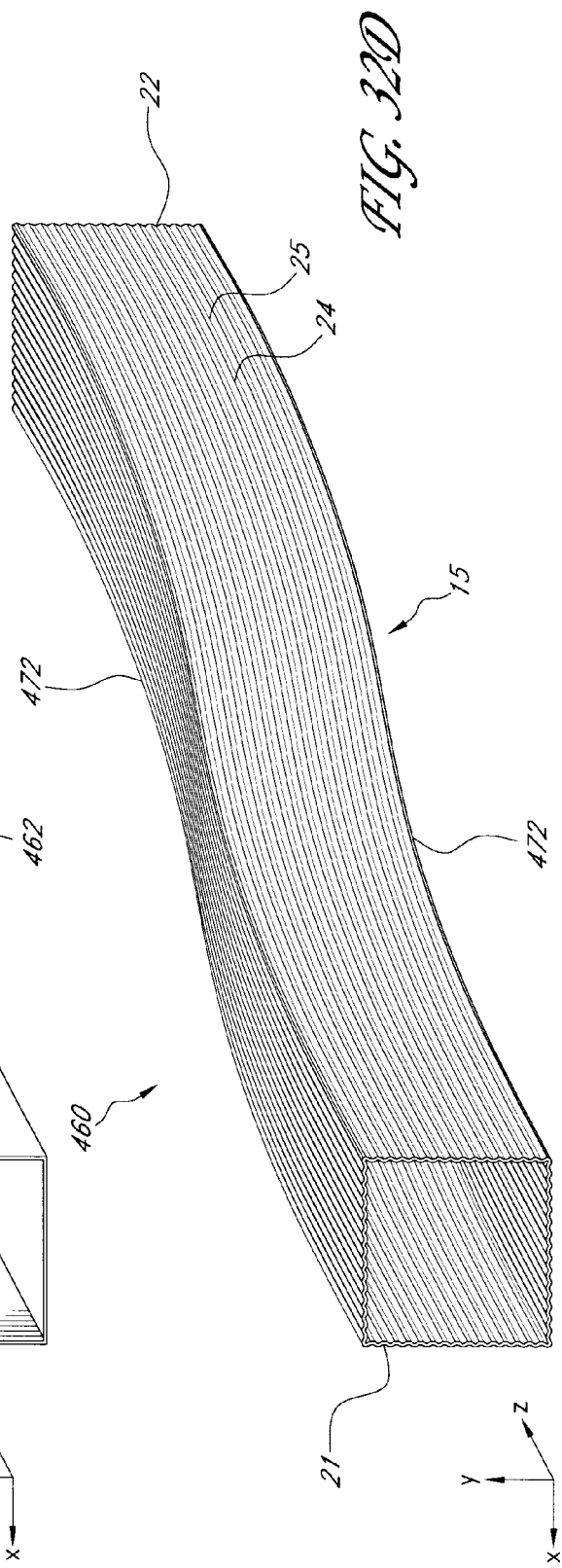

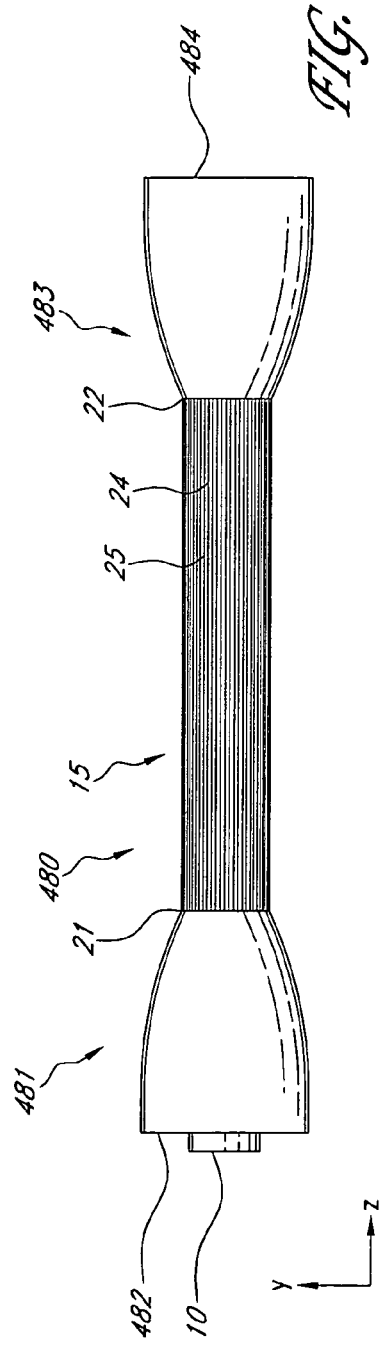
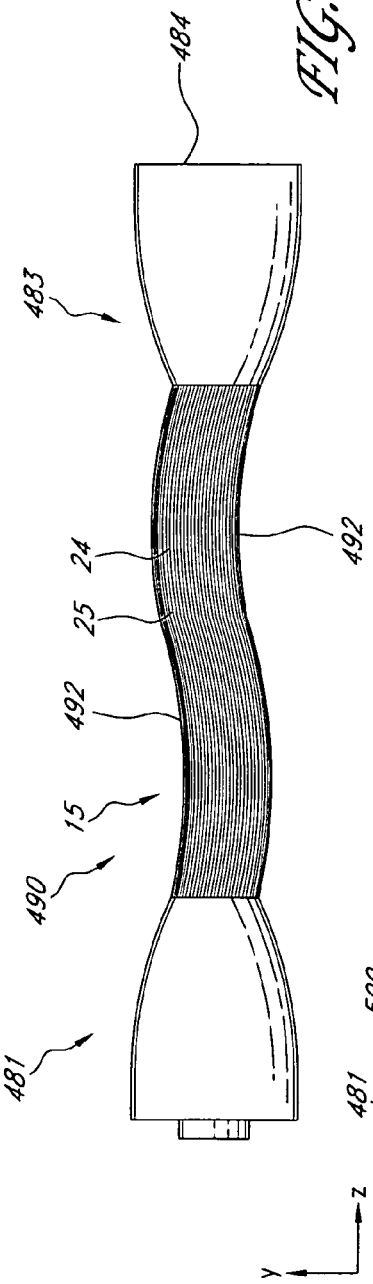
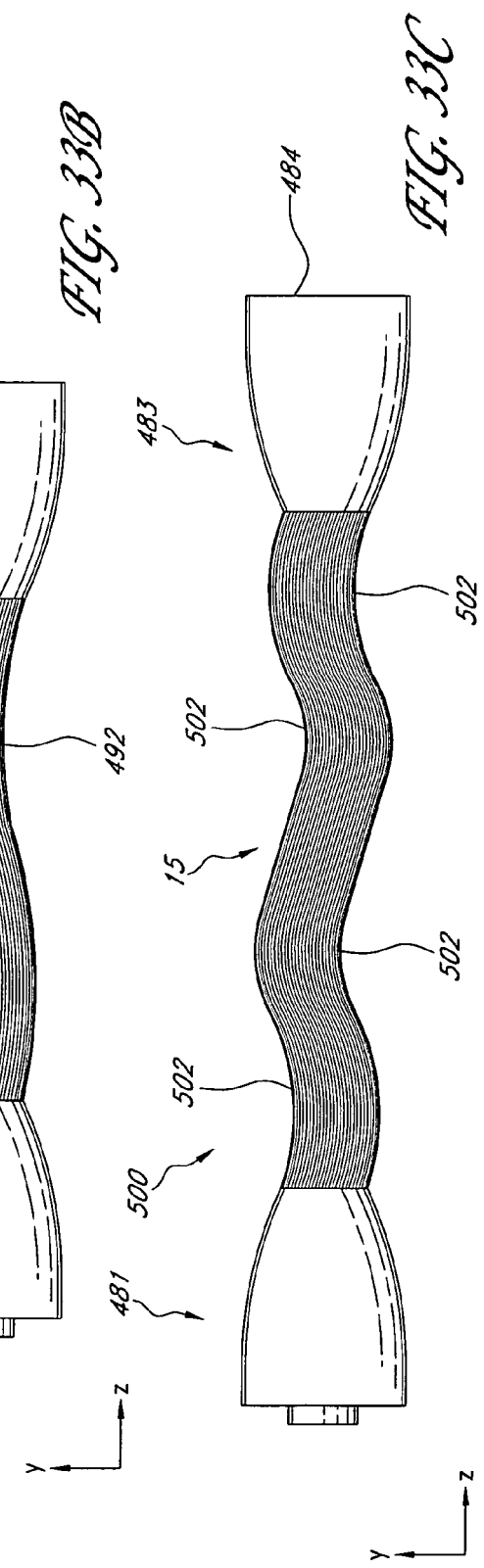
FIG. 33A
FIG. 33B
FIG. 33C

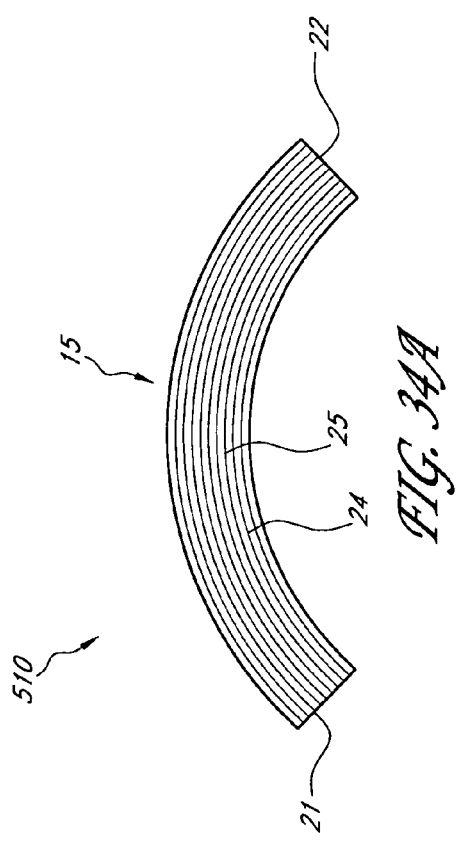
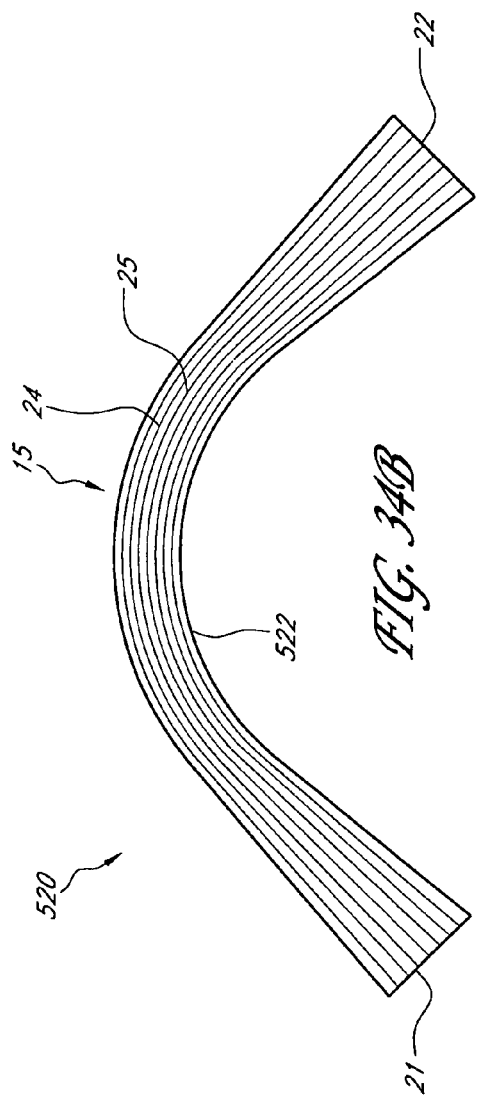

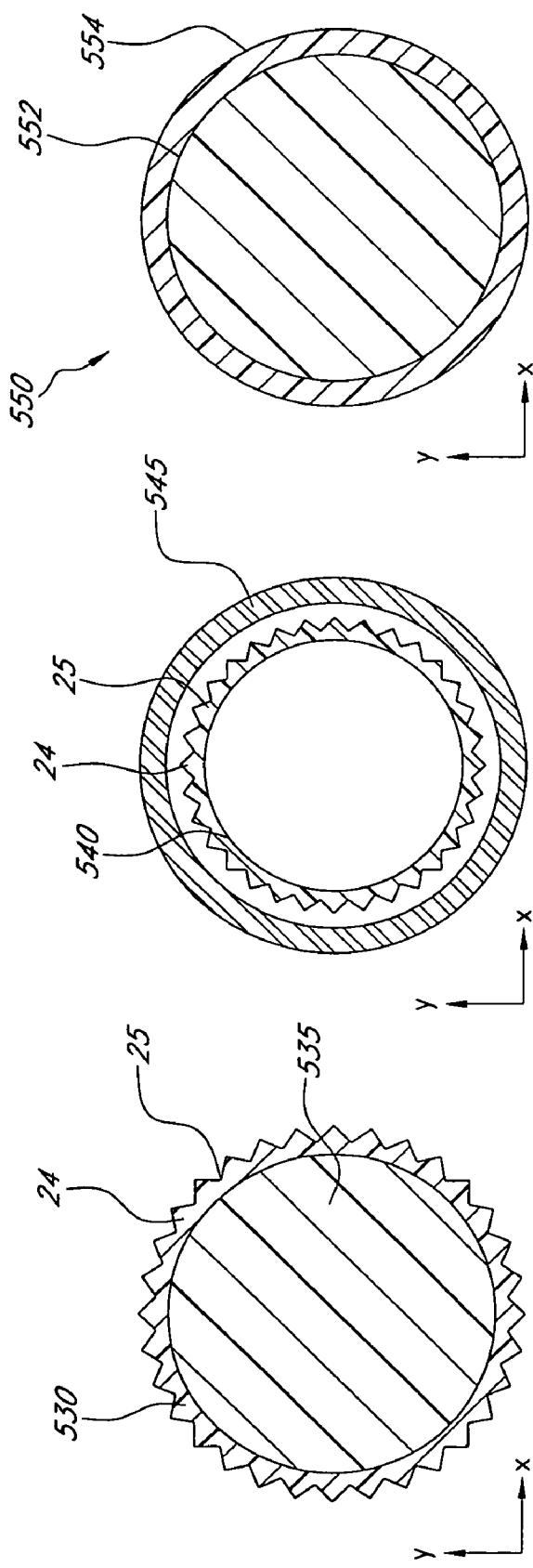

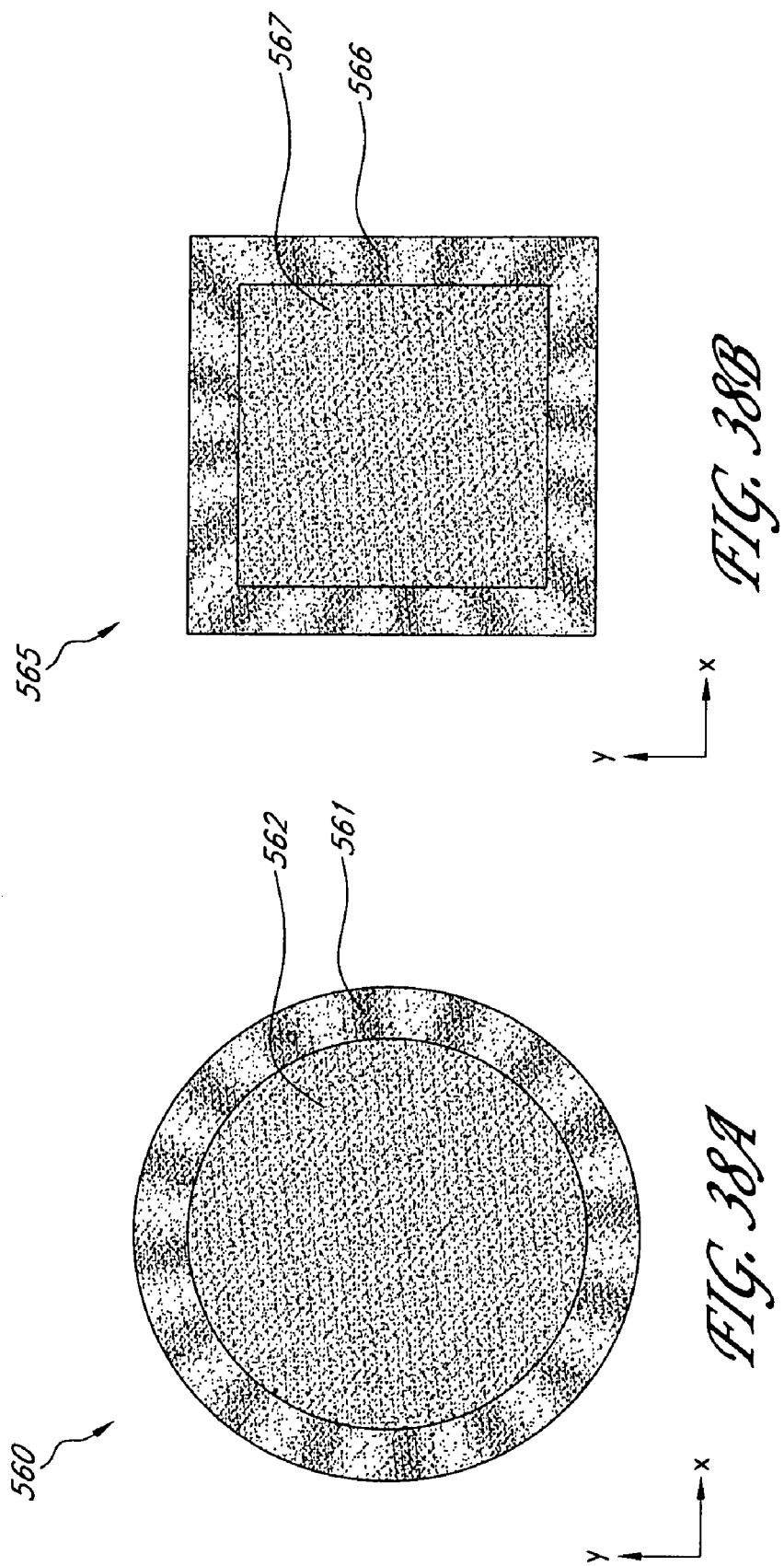

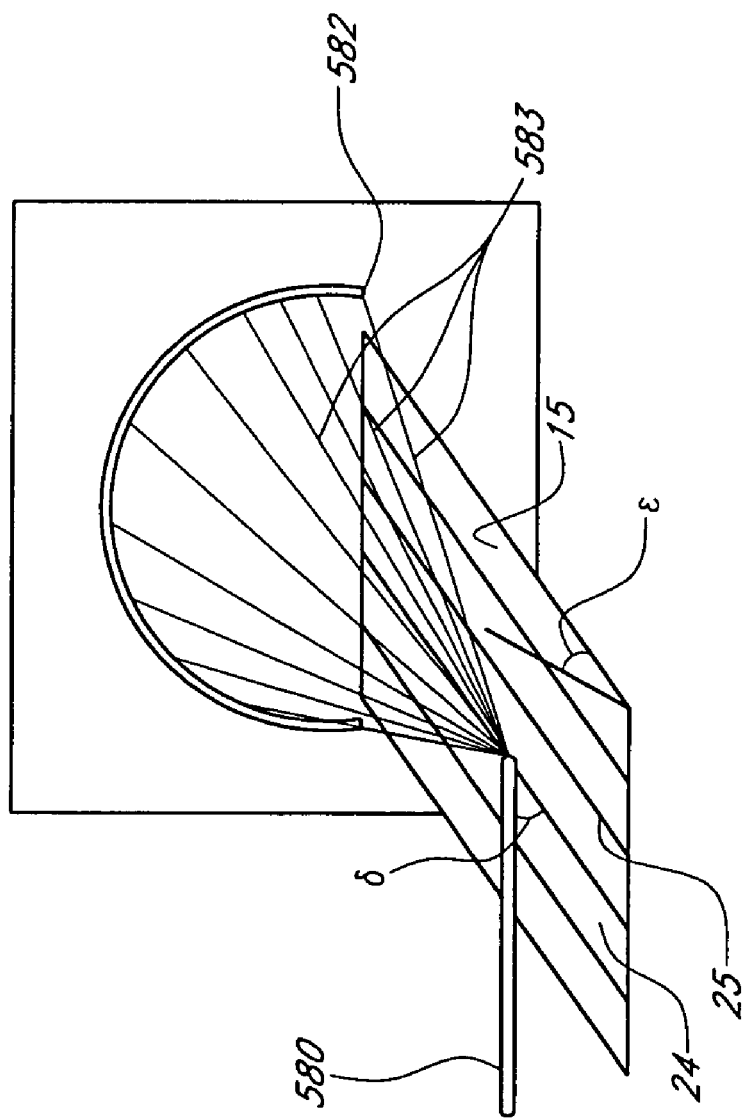
FIG. 40
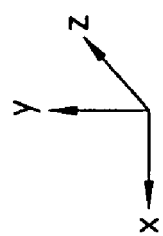

RIPPLED MIXERS FOR UNIFORMITY AND COLOR MIXING

CROSS-REFERENCE TO RELATED APPLICATIONS

This application claims the benefit under 35 U.S.C. §119 (e) of U.S. Provisional Application No. 60/703,808, filed Jul. 29, 2005, titled RIPPLED MIXERS FOR UNIFORMITY AND COLOR MIXING, the entire contents of which are hereby incorporated by reference herein and made a part of this specification.

BACKGROUND

1. Field of the Inventions

Certain embodiments disclosed herein relate generally to structures for mixing light, such as for example mixing rods, and relate more specifically to light-mixing structures having multiple ridges and valleys.

2. Description of the Related Art

It is a common practice to improve the uniformity of light by coupling light sources with mixing rods. This practice can homogenize illuminance and color across a spatial region, as well as homogenize the intensity. However, known mixing rods suffer from various drawbacks including limitations in the level of homogenization achievable.

SUMMARY

In certain embodiments, an illumination system comprises a plurality of light emitting diodes and a mixer. The mixer comprises a light pipe having input and output ends and a central region therebetween. The mixer further comprises an optical path extending in a longitudinal direction from the input end through the central region to the output end with the plurality of light emitting diodes disposed in proximity to the input end. The central region of the light pipe comprises one or more rippled sidewalls having a plurality of elongate ridges and valleys and sloping surfaces therebetween. The ridges and valleys comprise vertices at least partially formed by a rounded surface or formed by two or more substantially non-orthogonal surfaces. Light from the plurality of light emitting diodes propagating along the optical path reflects from the sloping surfaces and is redirected at a different azimuthal direction toward the output end thereby mixing the light at the output end.

In certain embodiments, a lighting apparatus comprises a light source comprising a plurality of emitters and a mixer having an input and an output and a central region therebetween. The mixer comprises at least one rippled surface in the central region comprising a plurality of peaks and valleys connected by sloping surface portions. The peaks and valleys each comprise an apex at least partially formed by a rounded surface portion or by two or more substantially nonorthogonal surface portions. Light entering the input propagating longitudinally along the central region is deflected by the sloping surface portions of the rippled surface in an azimuthal direction thereby increasing mixing of the light in the mixer and uniformity at the output.

In certain embodiments, a mixer for mixing light comprises an elongate member having an input and an output and a central region therebetween. The input has a different size or shape than the output. The elongate member comprises at least one rippled surface in the input, output, and central region comprising a plurality of peaks and valleys connected by sloping surface portions. Light entering the input propagating longitudinally along the central region is deflected by the sloping surface portions of the rippled surface in an azimuthal direction thereby increasing mixing of the light and uniformity at the output.

In certain embodiments, a mixing coupler comprises an elongate member having an input and an output and a central region therebetween. The elongate member comprises at least one rippled surface in the central region comprising a plurality of peaks and valleys connected by sloping surface portions. Light entering the input propagating longitudinally along the central region is deflected by the sloping surface portions of the rippled surface in an azimuthal direction thereby increasing mixing of the light and uniformity at the output. The input comprises a plurality of separate input ports or the output comprises a plurality of separate output ports.

In certain embodiments, a lighting apparatus comprises a mixer having an input and an output and a central region therebetween. The mixer comprises at least one rippled surface in the central region comprising a plurality of peaks and valleys connected by sloping surface portions. Light entering the input propagating longitudinally along the central region of the mixer is deflected by the sloping surface portions of the rippled surface in an azimuthal direction thereby increasing mixing of the light in the mixer and uniformity at the output. The lighting apparatus further comprises a projection lens disposed to receive light from the mixer output and project the light to an enlarged spot.

In certain embodiments, a lighting apparatus comprises a first mixer comprising at least one rippled surface comprising a plurality of peaks and valleys connected by sloping surface portions. Light entering the first mixer is deflected by the sloping surface portions of the rippled surface in an azimuthal direction thereby increasing mixing of the light in the first mixer. The lighting apparatus further comprises a second mixer comprising at least one rippled surface comprising a plurality of peaks and valleys connected by sloping surface portions. Light entering the second mixer is deflected by the sloping surface portions of the rippled surface in an azimuthal direction thereby increasing mixing of the light in the second mixer. The lighting apparatus further comprises coupling optics coupling light output by the first mixer into the second mixer.

In certain embodiments, a mixer for mixing light comprises an elongate member having an input and an output and a central region therebetween. The elongate member comprises at least one rippled surface in the central region comprising a plurality of peaks and valleys connected by sloping surface portions. Light entering the input propagating longitudinally along the central region is deflected by the sloping surface portions of the rippled surface in an azimuthal direction thereby increasing mixing of the light and uniformity at the output. The rippled surface further comprises scatter features that diffuse light incident thereon.

In certain embodiments, a mixer for mixing light comprises an elongate member having an input and an output and a central region therebetween. The central region comprises an elongate reflective region having a refractive index that varies azimuthally about a longitudinal axis through the elongate member so as to form alternating elongate high and low index portions with elongate gradient index portions therebetween. The elongate high and low index portions and the elongate gradient index portions extend longitudinally in the central region such that light entering the input propagating longitudinally along the central region is deflected by the elongate gradient index portions in an azimuthal direction thereby increasing mixing of the light and uniformity at the output.

In certain embodiments, a mixer for mixing light comprises an elongate member having an input face and an output face and a central region therebetween. The input face or the output face is elliptical in shape. The elongate member comprises at least one rippled surface in the central region comprising a plurality of peaks and valleys connected by sloping surface portions. Light entering the input face propagating longitudinally along the central region is deflected by the sloping surface portions of the rippled surface in an azimuthal direction thereby increasing mixing of the light and uniformity at the output face.

In certain embodiments, a mixer for mixing light comprises an elongate member having an input face and an output face and a central region therebetween. The input face or the output face has a shape other than circular or elliptical or square or rectangular. The elongate member comprises at least one rippled surface in the central region comprising a plurality of peaks and valleys connected by sloping surface portions. Light entering the input face propagating longitudinally along the central region is deflected by the sloping surface portions of the rippled surface in an azimuthal direction thereby increasing mixing of the light and uniformity at the output face.

In certain embodiments, a mixer for mixing light, the mixer comprises a rigid elongate member having an input face and an output face and a central region therebetween. The rigid elongate member is bent and comprises at least one rippled surface in the central region comprising a plurality of peaks and valleys connected by sloping surface portions. Light entering the input face propagating longitudinally along the central region is deflected by the sloping surface portions of the rippled surface in an azimuthal direction thereby increasing mixing of the light and uniformity at the output face.

In certain embodiments, a mixer for mixing light comprises an elongate member having an input face and an output face and a central region therebetween. The elongate member comprises at least one rippled surface in the central region comprising a plurality of peaks and valleys connected by sloping surface portions. Light entering the input face propagating longitudinally along the central region is deflected by the sloping surface portions of the rippled surface in an azimuthal direction thereby increasing mixing of the light and uniformity at the output face. The mixer further comprises a non-imaging optical element at the input or the output. At least a portion of the peaks comprises rounded surfaces portions.

In certain embodiments, a lighting apparatus comprises a substrate and a plurality of mixers coupled with the substrate. One or more of the plurality of mixers comprises an input and an output and a central region therebetween. The one or more of the plurality of mixers comprises at least one rippled surface in the central region comprising a plurality of peaks and valleys connected by sloping surface portions. Light entering the input propagating longitudinally along the central region of the one or more of the plurality of mixers is deflected by the sloping surface portions of the rippled surface in an azimuthal direction thereby increasing mixing of the light in the one or more of the plurality of mixers and uniformity at the output.

In certain embodiments, a lighting apparatus comprises a mixer having an input and an output and a central region therebetween. The mixer comprises at least one rippled surface in the central region comprising a plurality of peaks and valleys connected by sloping surface portions. Light entering the input propagating longitudinally along the central region of the mixer is deflected by the sloping surface portions of the rippled surface in an azimuthal direction thereby increasing mixing of the light in the mixer and uniformity at the output. The lighting apparatus further comprises a diffuser disposed to receive light from the mixer output.

In certain embodiments, a mixer for mixing light comprises an elongate member having an input face and an output face and a central region therebetween. The elongate member comprises at least one rippled surface in the central region comprising a plurality of peaks and a plurality of valleys connected by sloping surface portions. Light entering the input face propagating longitudinally along the central region is deflected by the sloping surface portions of the rippled surface in an azimuthal direction thereby increasing mixing of the light and uniformity at the output face. A first portion of the plurality of peaks are formed by rounded sloping surface portions and a second portion of the plurality of peaks are formed by substantially planar sloping surface portions.

In certain embodiments, an illumination system comprises a plurality of light emitting diodes and a mixer. The mixer comprises a light pipe having input and output ends and a central region therebetween. The mixer further comprises an optical path extending in a longitudinal direction from the input end through the central region to the output end with the plurality of light emitting diodes disposed in proximity to the input end. The central region of the light pipe comprises one or more rippled sidewalls having a plurality of elongate ridges and valleys and sloping surfaces therebetween. At least one of the ridges or at least one of the valleys is formed by at least three surfaces. Light from the plurality of light emitting diodes propagating along the optical path reflects from the sloping surfaces and is redirected at a different azimuthal direction toward the output end thereby mixing the light at the output end.

In certain embodiments, a lighting apparatus comprises a light source comprising a plurality of emitters and a mixer having an input and an output and a central region therebetween. The mixer comprises at least one rippled surface in the central region comprising a plurality of peaks and valleys connected by sloping surface portions. At least one of the peaks and valleys is formed by three or more surfaces. Light entering the input propagating longitudinally along the central region is deflected by the sloping surface portions of the rippled surface in an azimuthal direction thereby increasing mixing of the light in the mixer and uniformity at the output.

BRIEF DESCRIPTION OF THE DRAWINGS

Embodiments are depicted in the accompanying drawings for illustrative purposes, and should in no way be interpreted as limiting.

FIG. 1 is a schematic illustration of a mixer coupled with a light source.

FIG. 2 is a side elevation view of a light source optically coupled to a mixer via a reflector.

FIG. 3 is a perspective view of one embodiment of a mixer that comprises a rippled sidewall comprising a plurality of ridges and valleys.

FIG. 4 is a cross-sectional view of the mixer of FIG. 3 showing sloping surfaces connecting the ridges and valleys.

FIG. 7A is a partial cross-sectional view of one embodiment of a mixer wherein a rippled sidewall is formed by facets oriented by an angle $\alpha$.

FIG. 7B is a partial cross-sectional view of one embodiment of a mixer wherein a rippled sidewall has rounded ridges having a height and spacing that define an angle $\alpha$.

FIG. 13A is a side elevation view of a light source coupled with one embodiment of a square mixer that comprises rippled reflective sidewalls.

FIG. 17F is a plot of the illuminance distribution at an output face of the rippled mixer of FIG. 17E when only one of the light emitting diodes is turned on.

FIG. 18A is a perspective view of one embodiment of an angle-to-area converting mixer that can be coupled at an input end with a linear array of light emitting diodes.

FIG. 18B is a partial perspective view of the mixer of FIG. 18A coupled at the input end with the linear array of light emitting diodes.

FIG. 22A is a cross-sectional view of one embodiment of a rippled sidewall comprising ridges that have rounded vertices and valleys that have sharp vertices.

FIG. 22B is a cross-sectional view of one embodiment of a rippled sidewall comprising ridges that have sharp vertices and valleys that have rounded vertices.

FIG. 22C is a cross-sectional view of one embodiment of a rippled sidewall comprising ridges and valleys that are highly rounded.

FIG. 22D is a cross-sectional view of one embodiment of a rippled sidewall comprising ridges and valleys that have vertices connected by splines.

FIG. 22E is a cross-sectional view of one embodiment of a rippled sidewall comprising ridges that have variable heights.

FIG. 22F is a cross-sectional view of one embodiment of a rippled sidewall comprising ridges that have angles $\alpha$ that vary irregularly or randomly.

FIG. 22G is a cross-sectional view of one embodiment of a rippled sidewall comprising ridges that are separated by a large gap.

FIG. 22H is a cross-sectional view of one embodiment of a rippled sidewall comprising ridges and valleys with sharp vertices connected by planar sloping surfaces as well as rounded ridges and valleys connected by curved surfaces.

FIG. 22I is a cross-sectional view of one embodiment of a rippled sidewall comprising ridges and valleys that are also rippled.

FIG. 25A is a top plan view of one embodiment of a rippled mixer that comprises ridges and valleys that are oriented at an angle $\beta$ with respect to the length of the mixer.

FIG. 25B is a perspective view of one embodiment of a rippled mixer that comprises ridges and valleys that are oriented at an angle $\beta$ with respect to the length of the mixer.

FIG. 25C is a top plan view of one embodiment of a rippled mixer that comprises ridges and valleys that are oriented at an angle $\gamma$ with respect to the length of the mixer.

FIG. 25D is a perspective view of one embodiment of a rippled mixer that comprises ridges and valleys that are oriented at an angle $\gamma$ with respect to the length of the mixer.

FIG. 25E is a perspective view of one embodiment of a composite mixer that is formed by combining the rippled mixers of FIGS. 25B and 25D.

FIG. 32A is a perspective view of one embodiment of a mixer comprising bends.

FIG. 32D is a perspective view of one embodiment of a mixer comprising bends and rippled sidewalls having ridges and valleys.

FIG. 33A is a side elevation view of one embodiment of a mixer that comprises a rippled sidewall coupled with two nonimaging optical elements and a light source.

FIG. 33B is a side elevation view of one embodiment of a mixer that comprises a rippled sidewall and two bends and is coupled with two nonimaging optical elements and a light source.

FIG. 33C is a side elevation view of one embodiment of a mixer that comprises a rippled sidewall and four bends and is coupled with two nonimaging optical elements and a light source.

FIG. 34A is a top plan view of one embodiment of a curved mixer comprising a rippled sidewall.

FIG. 34B is a top plan view of one embodiment of a curved mixer comprising a rippled sidewall and two tapered ends.

FIG. 36A is a cross-sectional view of one embodiment of a mixer that comprises a solid rod and a film comprising ridges and valleys.

FIG. 36B is a cross-sectional view of one embodiment of a mixer that comprises a hollow tube and an insert comprising ridges and valleys.

FIG. 37 is a cross-sectional view of one embodiment of a mixer comprising a rod and a hologram.

FIG. 38A is a front plan view showing one embodiment of a circular mixer comprising a substantially optically transmissive outer layer having an index of refraction that varies around the perimeter of the mixer FIG. 38B is a front plan view showing one embodiment of a square mixer comprising a substantially optically transmissive outer layer having an index of refraction that varies around the perimeter of the mixer.

FIG. 40 schematically illustrates a partial perspective view of one embodiment of a rippled sidewall from which a collimated beam of light is reflected into a semicircular distribution pattern.

FIG. 41F is a plot of the illuminance distribution obtained by reflecting a beam of collimated light from the sidewall of FIG. 41E.

FIG. 42 is a schematic illustration of a system comprising two rippled mixers coupled with each other via transfer optics.

FIG. 43 is a schematic illustration of one embodiment of a rippled mixer coupled with a diffuser.

FIG. 44A is a schematic illustration of a top plan view of one embodiment of a mixer array comprising a plurality of rippled mixers.

FIG. 44B is a schematic illustration of a side elevation view of the mixer array of FIG. 44A.

DETAILED DESCRIPTION OF THE PREFERRED EMBODIMENTS

Figure 5A:
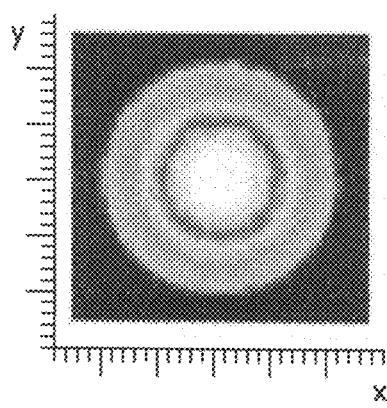
FIG. 5A is a plot of the illuminance distribution at an input face of one embodiment of a mixer.

Many illumination designs benefit from homogenized light. Accordingly, efforts have been made to obtain substantially uniform illuminance distributions from light sources, such as light emitting diodes (LEDs), that produce non-uniform illuminance distributions. One known method of achieving this goal employs mixing rods. In many embodiments, flux from a light source is transferred to an input end of a mixing rod. The flux propagates through the mixing rod, typically reflecting from the sidewalls of the mixing rod one or more times. In certain embodiments, coupling a light source that produces a non-uniform illuminance distribution with the input end of the mixing rod produces a substantially uniform illuminance distribution at an output end of the mixing rod.

Certain mixing rod configurations are particularly effective in achieving substantially uniform illuminance distributions. For example, straight rods having rectangular or hexagonal cross-sections are known to work well. Such configurations produce rectangular and hexagonal beam patterns, respectively. However, circular beam patterns are preferred in many applications, such as flashlights, spotlights, fiber illuminators, and projection systems with circular pupils. Unfortunately, circular straight rods generally provide inferior spatial mixing as compared with rectangular or other faceted configurations. Accordingly, hexagonal mixing rods are often used in place of circular mixing rods in order to approximate a circular beam pattern while achieving the advantages of a mixing rod having planar sidewalls. Consequently, there is a need for mixing rods that produce circular beam patterns that have substantially uniform illuminance distributions.

Furthermore, known mixing rod configurations have various limitations. For example, even when the illuminance distribution at the output face of a mixing rod is substantially uniform, the distribution obtained by performing a virtual defocus of the light exiting the mixing rod back to the input face has non-uniformities. Similar non-uniformities exist in the angular distribution of the light exiting the mixing rod. In illumination systems that employ relays, for example, the input face of the mixing rod is often approximately conjugate to the pupil of the relay optics. As a result of multiple reflections of the light source in the mixing rod, the light distribution produced at the pupil plane generally contains a non-uniform illuminance distribution. This distribution may comprise multiple images of the light source, producing a regular pattern of bright and dark regions. This effect is similar to what is seen when looking into a kaleidoscope, hence such illuminance distributions are referred to herein as "kaleidoscope illuminance distributions." There is a need for mixing rods that produce more uniform illuminance distributions at the pupil, and for mixing rods that produce more uniform intensity distributions.

In addition, the performance of square, hexagonal, and other known configurations of effective mixing rods tends to degrade as the length of the mixing rods is decreased. For example, uniformity of the kaleidoscope illuminance distribution from a mixing rod tends to diminish with decreasing length because fewer images of the non-uniform illuminance distribution at the input face are obtained. Furthermore, shorter mixing rods generally become increasingly sensitive to alignment of a light source with the input face. This phenomenon is particularly disadvantageous for systems that couple multiple LEDs with mixing rods. For example, some systems situate red, green, and blue LEDs at the input face of a mixing rod in order to produce white light. Because the LEDs are generally offset from a center point of the input face, the uniformity of the distribution of red, green, and blue light and the quality of the white light produced by the systems decreases as the mixing rod becomes shorter.

Certain embodiments disclosed herein reduce or eliminate the above-noted problems. In some instances, providing ridges and valleys along an exterior or interior perimeter of a mixing rod substantially improves the performance of the mixing rod. Other advantageous embodiments are also disclosed.

FIG. 1 schematically illustrates a light source 10 coupled with a mixer 20. In the illustrated arrangement, the mixer 20 comprises an input face 21, an output face 22, and a central region 23 extending between the input face 21 and the output face 22.

The light source 10 can comprise any suitable light-producing device, such as one or more fluorescent lamps, halogen lamps, incandescent lamps, discharge lamps, light emitting diodes, or laser diodes. In some embodiments, the light source 10 comprises the output of one or more fiber optic lines. In certain embodiments, the light source 10 is configured to generate multi-chromatic light (e.g., white light), while in other embodiments the light source 10 is capable of generating substantially monochromatic light at one or more selected wavelengths. The light source 10 can produce coherent or incoherent light. Other forms of light-producing devices can also be used. In some arrangements, the light source 10 comprises a combination of light-producing devices. In certain configurations, the light source 10 comprises a plurality of different color LEDs. In further configurations, the light source 10 comprises an array of red, green, and blue LEDs (an "RGB LED array"). In some embodiments, the light source 10 comprises one or more phosphor LEDs or LEDs (e.g., UV LEDs) with a phosphor. For example, phosphors can be used to convert the LED output to a more desired wavelength such as blue to yellow (using e.g., YAG).

The mixer 20 can have a variety of configurations. In many embodiments, the mixer 20 comprises a light pipe. In some arrangements, the mixer 20 comprises a hollow tube with one or more sidewalls. Accordingly, in some instances, a surface of the mixer 20 is lined with a substantially reflective film, coated with a substantially reflective material, or otherwise configured to reflect a substantial portion of light incident thereon. In some arrangements, a surface of the mixer 20 is lined with a substantially reflective film comprising metal or a dielectric multilayer coating. Other reflective coatings such as paint or pigment, e.g., diffuse white paint, may also be used. Still other arrangements for increasing the reflectivity of surfaces of the mixer 20 may also be used. In some embodiments, the hollow tube and accordingly the mixer is rigid, and in other embodiments, the hollow tube is flexible.

In other configurations, the mixer 20 comprises a solid light conduit. Accordingly, in some arrangements, the mixer 20 comprises a substantially optically transmissive material, such as glass or plastic or some other polymeric material. Other materials may also be used. In some embodiments, the material is rigid, and in other embodiments, the material is flexible. Light may propagate within the mixer 20 being reflected one or more times from the interface between the optically transmissive material and ambient medium, e.g., air, as a result of total internal reflection. In some embodiments, reflections within solid light conduits have smaller absorption losses than do reflections within hollow light conduits having reflective sidewalls. In certain embodiments, solid light conduits are thus more advantageous.

In many instances, the angle of light from the light source 10 is reduced when coupled into the solid mixer 20 as a result of refraction. Accordingly, some solid mixers 20 are longer than similarly sized and dimensioned hollow mixers 20 in order to achieve similar levels of mixing. In some instances, solid mixers 20 attenuate less energy than do hollow, reflective mixers 20, and are therefore advantageous for certain applications.

As illustrated in FIG. 1, a longitudinal or optical axis 13 extends through the mixer 20 from the input surface 21 to the output surface 22. The optical axis 13 shown in FIG. 1 is parallel to the z-axis. In the embodiment shown, the mixer 20 is linear, although the mixer may bend and have different shapes as discussed more fully below. In some embodiments, the mixer 20 comprises a cylinder.

The shape of the cross-section of the mixer 20 that is orthogonal to the optical axis 13 can have a wide variety of shapes, including, for example, a circle, ellipse, oval, rectangle, pentagon, hexagon, or other polygon. Additionally, in some arrangements, the cross-sectional shape of the mixer 20 has a rippled perimeter that includes multiple elongate ridges and valleys. This rippled perimeter results from one or more rippled sidewalls of the mixers, which will be discussed more fully below. As used herein, these sidewalls are said to be ribbed as a result of the multiple elongate ridges and valleys. The terms ribbed and rippled, e.g., ribbed sidewalls and rippled sidewalls, are used interchangeably herein.

In some arrangements, the cross-sectional shape and area of the mixer 20 are constant along the full length of the mixer, as measured along the optical axis 13 or z axis. In such arrangements, the input face 21 and the output face 22 are the same shape and size. In other arrangements, the cross-sectional shape and/or area of the mixer 20 varies along the length thereof, as measured along the z axis. In certain of such configurations, the input face 21 and the output face 22 may vary with respect to each other in shape and/or size. In some instances, the input face 21 defines a rectangle or square and the output face 22 defines a circle or vice versa. Other arrangements are also possible.

The mixer 20 can have a wide variety of lengths. In some configurations, the length of the mixer 20 is larger than a width thereof (e.g., a measurement along the orthogonal x or y axis). In various configurations, the length-to-width ratio for a mixer 20 that comprises a hollow tube is about 11:1 or less, about 10:1 or less, 9:1 or less, or about 8:1 or less, about 7:1 or less, about 6:1 or less, about 5:1 or less, about 4:1 or less, or about 3:1 or less. In other configurations, the length-to-width ratio for a mixer 20 that comprises a solid conduit is at least about 16:1 or less, about 15:1 or less, about 14:1 or less, about 13:1 or less, about 12:1 or less, about 11:1 or less, about 10:1 or less, about 9:1 or less, about 8:1 or less, about 7:1 or less, about 4:1 or less, or about 1.5:1 or less. Other sizes and configurations are also possible.

FIG. 2 schematically illustrates the light source 10 coupled with the mixer 20 via a reflector 12. In some arrangements, the reflector 12 is an elliptical collector having an ellipsoidally shaped reflective surface. In certain of such arrangements, the light source 10 can be located at one focus of the reflector 12, and an input face 21 of the mixer 20 can be located at the other focus of the reflector 12. The reflector 12 can assume a variety of other shapes and configurations. Additional reflective devices or other optical elements (e.g., lenses, diffractive elements, etc.) can be used to couple the light source 10 with the mixer 20. In certain configurations, no optical element is used. For example, in some arrangements, the light source 10 is placed at or adjacent to the input face 21 of the mixer 20. Numerous other devices and methods can be employed to couple the light source 10 with the mixer 20.

FIG. 3 schematically illustrates one embodiment of a mixer 120 comprising a rippled sidewall 15. In certain embodiments, the rippled sidewall 15 is substantially curved and, in some embodiments, can form a cylinder. In some embodiments, the mixer 120 comprises a right circular cylinder. In many embodiments, light propagating within the mixer 120 is reflected more times than it would be within a mixer that has the same dimensions as the mixer 120 but does not have rippled sidewalls. In certain embodiments, the mixer 120 outputs a substantially circular beam at the output face 22.

In some embodiments, the rippled sidewall 15 comprises a plurality of elongate ridges 24 and valleys 25 that extend along the length of the mixer. In the illustrated embodiment, the mixer 120 comprises a solid light conduit. The mixer 120 has a length, as measured along the z axis (defined in FIG. 3), ten times greater than its diameter, as measured in the xy plane (defined in FIG. 3). In the illustrated embodiment, the ridges 24 and the valleys 25 extend from the input face 21 to the output face 22 of the mixer 120 along the central region thereof 23. Each of the ridges 24 and the valleys 25 has a constant height along the length of the mixer 120. As shown, the ridges 24 and the valleys 25 run parallel to the length of the mixer 120. As discussed below, numerous other configurations of the ridges 24 and the valleys 25 are possible. Accordingly, discussion of the illustrated embodiment is for illustrative purposes only, and should not be construed as limiting.

FIG. 4 schematically illustrates a cross-sectional view of the mixer 120 orthogonal to the optical axis 13 or z-direction. In the illustrated embodiment, the rippled sidewall 15 comprises ridges 24 and the valleys 25 around the full perimeter of the mixer 120. The mixer 120 comprises thirty-two ridges 24 and thirty-two valleys 25. Sixteen of the ridges 24 are formed by two substantially flat sloping surfaces 26 that meet at a vertex. The other sixteen ridges 24 are formed by curved sloping surfaces 26 that meet at a vertex. The two varieties of the ridges 24 alternate around the perimeter of the mixer 120, e.g., each ridge 24 of one variety is between two ridges 24 of the other variety In certain embodiments, the height of each ridge 24, i.e., the shortest distance between the vertex of the ridge 24 and a straight line connecting the vertices of two adjacent valleys 25, is between about 1 micron and about 1000 microns, between about 0.01 millimeters and 0.20 millimeters, between about 0.05 millimeters and about 0.15 millimeters, or between about 0.10 and about 0.13 millimeters. In other embodiments, the height is greater than about 0.01 millimeters, greater than about 0.05 millimeters, or greater than about 0.10 millimeters. In still other embodiments, the height is less than about 0.20 millimeters, less than about 0.15 millimeters, or less than about 0.13 millimeters. In some embodiments, the height is about 0.12 millimeters.

In various embodiments, the height-to-width ratio is greater than about 1:500, greater than about 1:300, greater than about 1:250, greater than about 1:200, greater than about 1:150, or greater than about 1:100. In some embodiments, the height-to-width ratio is less than about 1:100, less than about 1:150, less than about 1:200, less than about 1:250, less than about 1:300, or less than about 1:500.

In various embodiments, the width or spacing of each ridge 24, e.g., the distance between the vertices of two adjacent valleys 25, is between about 1 micron and about 1000 microns, between about 0.10 millimeters and 0.50 millimeters, between about 0.30 millimeters and 0.45 millimeters, or between about 0.35 millimeters and 0.40 millimeters. In some embodiments, the width is greater than about 0.25 millimeters, greater than about 0.30 millimeters, or greater than about 0.35 millimeters. In other embodiments, the width is less than about 0.50 millimeters, less than about 0.45 millimeters, or less than about 0.40 millimeters. In some embodiments, the width is about 0.38 millimeters.

In various embodiments, the ridge-width-to-mixer-width ratio is greater than about 1:100, greater than about 1:50, or greater than about 1:30. In some embodiments, the ridge-width-to-mixer-width ratio is less than about 1:30, less than about 1:50, or less than about 1:100. In some embodiments, the ridges 24 have an average spacing of between about 1 percent and about 30 percent of the width of the mixer 120.

As described more fully below, the mixer 120 can comprise more or fewer ridges 24 and valleys 25, and numerous heights, widths, and configurations of the ridges 24 and valleys 25 are possible.

Light input into the input face 21 propagates along an optical path down the mixer through the central region 23 between the input face and the output face 22. Much of this light is reflected from the ribbed sidewalls and in particular reflects from the sloping surfaces forming the ridges 24 and valleys 25. This light reflects from the sloping surfaces is redirected at a different azimuthal direction toward the output end thereby mixing said light at the output end.

FIGS. 5A-5F demonstrate that circular mixers having rippled sidewalls 15, such as the mixer 120 depicted in FIGS. 3 and 4, can be effective in creating a substantially uniform illuminance distribution at an output face thereof. Each of FIGS. 5A-5F corresponds with an arrangement such as that schematically depicted in FIG. 2, wherein the reflector 12 is an elliptical collector, the light source 10 is located at one focus of the reflector 12, and the center of the input face 21 is located at the other focus of the reflector 12, and wherein two distinct mixers are used separately for purposes of comparison, as detailed below.

Figure 5B:
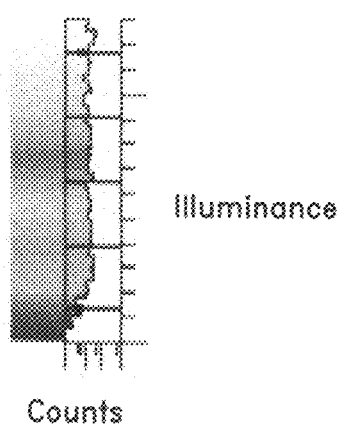
FIG. 5B is a histogram of the illuminance values displayed in the plot of FIG. 5A.

FIGS. 5A and 5B illustrate the illuminance distribution at the input face 21 of a mixer. FIG. 5A is a spatial plot representing illuminance values at the input face 21, and FIG. 5B is a histogram of each illuminance value measured over the surface of the input face 21. A shading scale corresponding with both FIGS. 5A and 5B is shown along the left-hand side of the histogram of FIG. 5B. The shading scale generally indicates that the lowest intensities are shaded the darkest and the highest intensities are shaded the brightest, although the gradation between these two extremes is not uniform.

FIG. 5A illustrates that the illuminance distribution at the input face 21 is non-uniform. The shaded spatial plot indicates that light intensity is high toward the center of the input face 21 and drops off toward the edges of the circular perimeter of the mixer. FIG. 5B also indicates that the illuminance distribution of the input face 21 is non-uniform due to the large range of illuminance values that are present in the histogram.

Figure 5C:
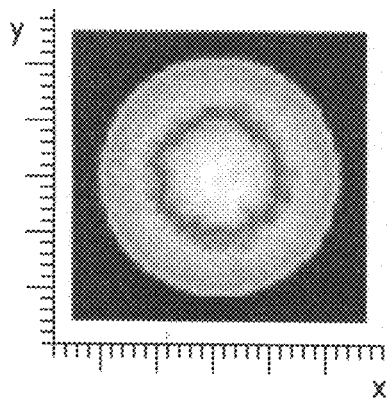
FIG. 5C is a plot of the illuminance distribution at an output face of one embodiment of a smooth mixer.
Figure 5D:
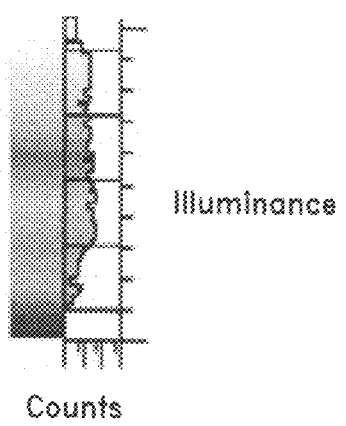
FIG. 5D is a histogram of the illuminance values displayed in the plot of FIG. 5C.

The plots shown in FIGS. 5C and 5D depict the illuminance distribution at the output face 22 of a smooth circular mixing rod (not shown). The plots are of the same variety described with respect to FIGS. 5A and 5B, respectively. The mixing rod has a circular cross-section orthogonal to the optical axis or longitudinal (z) direction and a length-to-diameter ratio of about 10:1. This length-to-diameter ratio is useful for comparing the performance of the smooth circular mixing rod with that of a smooth mixing rod having a square cross-section orthogonal to the optical axis or z axis. Such smooth square mixing rods are known to produce substantially uniform illuminance distributions when the length-to-width ratio thereof is about 10:1 (for example, see FIG. 12B) and the numerical aperture of the coupled light is about 0.5. In certain embodiments, the length-to-width ratios are smaller. In some embodiments, substantially uniform illuminance distributions can be achieved with higher numerical apertures and shorter mixing rods or lower numerical apertures and longer mixing rods. As shown in FIGS. 5A and 5B, the illuminance distribution is non-uniform, and is not much improved over the illuminance distribution at the input face 21.

Figure 5E:
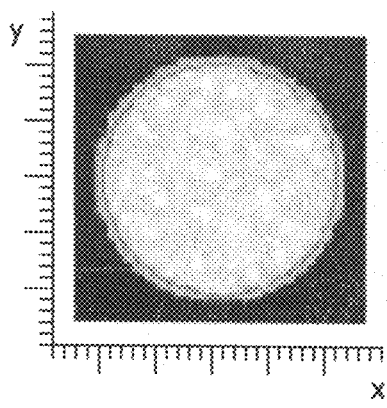
FIG. 5E is a plot of the illuminance distribution at an output face of the mixer of FIGS. 3 and 4 that comprises a rippled sidewall.
Figure 5F:
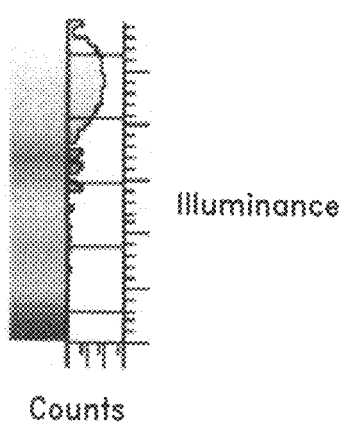
FIG. 5F is a histogram of the illuminance values displayed in the plot of FIG. 5E.

The plots shown in FIGS. 5E and 5F are of the same variety described with respect to FIGS. 5A and 5B, respectively, but correspond to the output of the rippled mixer 120 shown in FIGS. 3 and 4, which comprises a rippled sidewall 15. As mentioned above, the rippled mixer 120 has a length-to-diameter ratio of about 10:1. Accordingly, the only difference between the smooth circular mixing rod associated with FIGS. 5C and 5D and the rippled mixer 120 associated with FIGS. 5E and 5F is the ridges 24 and the valleys 25 disposed around the mixer 120.

FIGS. 5E and 5F depict the illuminance distribution at the output face 22 of the rippled mixer 120. As shown, the illuminance distribution is substantially uniform. FIG. 5E demonstrates that the illuminance is fairly constant over the entire face 22, and FIG. 5F comprises a much narrower and more concentrated range of illuminance values, as compared with FIGS. 5B and 5D. Accordingly, FIGS. 5A-5F show that mixers comprising rippled sidewalls are able to create circular beam patterns having substantially uniform spatial illuminance distributions at the output face. In addition, in many embodiments, rippled sidewalls improve the uniformity of the angular distribution of light exiting the output face. Further, in many embodiments, rippled sidewalls improve uniformity of the color of the light at the output face. Accordingly, the foregoing and following discussion with respect to spatial illuminance distributions of rippled mixers is, in many embodiments, applicable to the angular and/or color distributions of the mixers.

The above-noted results satisfy a longstanding need. For example, in some instances it is desirable to couple a bundle of optical fibers with a mixing rod. Such bundles often are manufactured with round input ends. Accordingly, in some embodiments, a circular rippled mixer such as the mixer 120 can be used directly with a round bundle of fibers to provide each fiber within the bundle substantially the same flux density.

FIGS. 6A-6F demonstrate that mixers having rippled sidewalls 15 can also reduce alignment sensitivity of the light source 10 with the input face 21. Each of FIGS. 6A-6F corresponds with an arrangement similar to that schematically depicted in FIG. 2, wherein the center of the input face 21 is located at one focus of the reflector, and two distinct mixers are used separately for purposes of comparison, as detailed below; however, the light source 10 is shifted upward (i.e., along the y axis in the positive direction) within the reflector 12 and thus away from the other focus of the reflector.

Figure 6A:
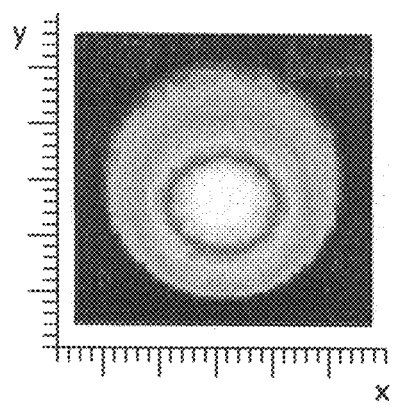
FIG. 6A is a plot of the illuminance distribution at an input face of one embodiment of a mixer wherein the light source is off-center.
Figure 6B:
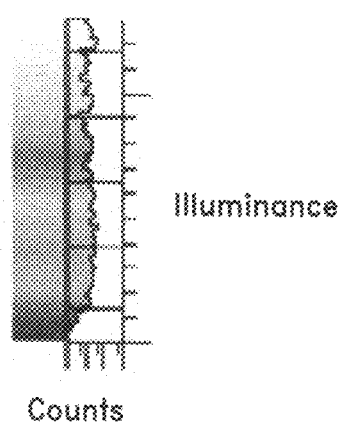
FIG. 6B is a histogram of the illuminance values displayed in the plot of FIG. 6A.

The plots shown in FIGS. 6A and 6B depict the illuminance distribution at the input face 21. As shown in FIG. 6A, the illuminance distribution is shifted downward (i.e., along the y axis in the negative direction) with respect to that shown in FIG. 5A, and is thus off-centered. A region of high intensity is located below the center point of the input face 21 (e.g., below the optical axis), and the intensity drops off toward the edges of the mixer (e.g., the sidewalls).

Figure 6C:
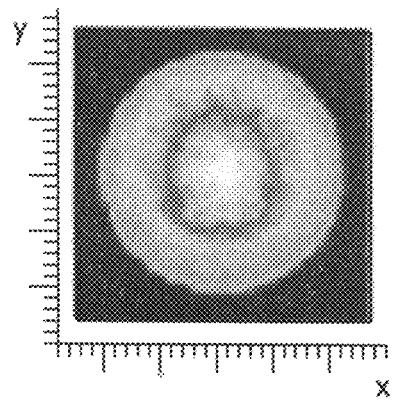
FIG. 6C is a plot of the illuminance distribution at an output face of one embodiment of a smooth mixer wherein the light source is off-center.
Figure 6D:
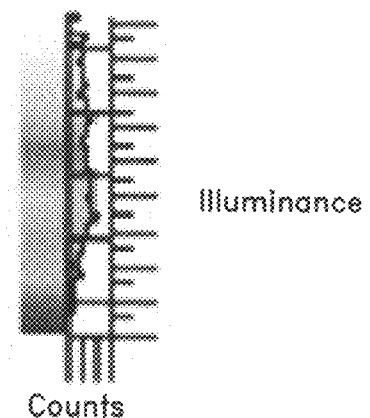
FIG. 6D is a histogram of the illuminance values displayed in the plot of FIG. 6C.

The plots shown in FIGS. 6C and 6D were obtained with the smooth circular mixing rod described above with respect to FIGS. 5C and 5D. FIGS. 6C and 6D depict the illuminance distribution at the output face 22 of the smooth circular mixing rod. As shown, the illuminance distribution is non-uniform, and is not much improved over the illuminance distribution shown in FIGS. 6A and 6B.

Figure 6E:
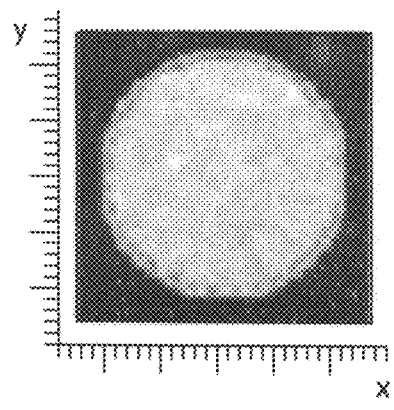
FIG. 6E is a plot of the illuminance distribution at an output face of the mixer of FIGS. 3 and 4 that comprises a rippled sidewall.
Figure 6F:
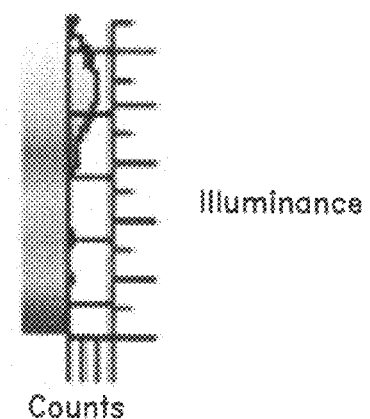
FIG. 6F is a histogram of the illuminance values displayed in the plot of FIG. 6E.

The plots shown in FIGS. 6E and 6F were obtained with the rippled mixer 120. FIGS. 6E and 6F depict the illuminance distribution at the output face 22 of the mixer 120. As shown, the illuminance distribution is substantially uniform. FIG. 6E demonstrates that the illuminance is fairly constant over the entire face 22, and FIG. 6F demonstrates a much narrower and more concentrated range of illuminance values, as compared with FIGS. 6B and 6D. Furthermore, comparison of FIGS. 6E and 6F with FIGS. 5E and 5F reveals that performance of the mixer 120 is relatively unaffected by the shifted alignment of the light source 10 with respect to the input face 21. Accordingly, providing mixers with rippled sidewalls can reduce alignment sensitivity of the mixers, which can increase the design and manufacturing tolerances and result in more robust designs.

While the above examples demonstrate the effectiveness of the mixer 120 schematically depicted in FIGS. 3 and 4, numerous other mixer and ripple configurations are possible. FIGS. 7A and 7B schematically illustrate two of many varieties of cross-sectional configurations of ripple sidewalls. Additional varieties are discussed in more detail below.

FIG. 7A schematically illustrates one cross-sectional configuration of a rippled sidewall 15 comprising a plurality of ridges 24 and valleys 25. Half of the ridges 24 resemble those shown in FIG. 4, as each is formed by two substantially planar sloping surfaces 26 that meet at a vertex. Rippled sidewalls 15 comprising substantially flat surfaces are referred to herein as "faceted."

Although not always true (as detailed below), the respective shapes of ridges 24 and valleys 25 can be fairly complimentary to each other in some instances, thus the general shape of some rippled sidewalls 15 can be described in terms of ridges 24 alone. Accordingly, references to ridges 24 only are occasionally made herein when describing the general shape of certain rippled sidewalls 15. However, such references should not be construed as limiting the principles and/ or embodiments described herein to those instances where ridges 24 and valleys 25 are complimentary.

With continued reference to FIG. 7A, each ridge 24 can be described in terms of an angle α defined by the sloping face 26 on either side of the ridge 24 and a line 27 extending between the vertices of the two closest valleys 25 on either side of the ridge 24. The valleys 25 can similarly be described in terms of an angle α. Accordingly, the angle α depends on the spacing and height of the ridges 24 or the valleys 25. For example, higher ridges 24 or closer spacing result in larger angle α. In the illustrated embodiment, each ridge 24 is symmetrical. As detailed below, other configurations are possible for faceted rippled sidewalls 15. For example, the ridges 24 and/or valleys 25 of the rippled sidewalls 15 are not symmetrical and/or are formed by more than two substantially flat faces defining a ridge or valley. In some embodiments, the angle α is between about 15 degrees and about 65 degrees. In other embodiments, the angle α is between about 15 degrees and about 35 degrees or between about 10 degrees and about 25 degrees. Other ranges and values are possible.

In some embodiments, the ridges 24 or valleys 25 can be described in terms of a vertex angle ζ defined by the angle between two substantially planar sloping faces 26. In some embodiments, the angle ζ is between about 15 degrees and about 65 degrees. Other ranges and values are possible.

FIG. 7B schematically illustrates one cross-sectional configuration of a rippled sidewall 15 comprising ridges 24 and valleys 25 having rounded or curved vertices. In such configurations, the angle α can also generally describe an average angle of the ridges 24 or the valleys 25. In the illustrated embodiment, the angle α is defined by the line 27 extending between the vertices of the two valleys 25 neighboring the ridge 24 and by a tangent line 28 extending between a vertex of a neighboring valley 25 and the vertex of the ridge 24. As described below, numerous configurations are possible for rounded ridges 24. For example, the ridges can be highly rounded, ellipsoidal, circular, parabolic, any combination thereof, or have any other curved shape. In various embodiments, the angle α is between about 20 degrees and about 65 degrees, between about 20 degrees and about 37 degrees, or between about 27 degrees and about 33 degrees.

The slope and curvature of the surfaces 26 forming the ridges 24 (and valleys) can affect the performance of the mixer 20. However, in examples that follow, the angle α is generally associated with ridges 24 such as those shown in the illustrated embodiment.

With continued reference to FIG. 7B, in some instances, the angle α is defined in terms of the height dH of the ridges 24 and the distance dC between successive ridges 24. One particularly advantageous definition of the angle α is as follows:

$$\alpha = \arctan(2dH/dC)$$

In some embodiments, increasing or decreasing the number of ridges and valleys disposed around a mixer and thereby changing the distance dC, while adjusting the parameters dH such that α remains constant in the above equation, can often result in similar performances between the original mixer and the modified mixer.

However, in some arrangements, the number of ridges 24 disposed around a mixer affects the performance of the mixer. In certain embodiments, the number of ridges 24 is greater than 16. In other embodiments, the number of ridges 24 is greater than 50. In various other embodiments, the number of ridges 24 is greater than 100, 150, 200, 250, 300, 400, 500, 1000, 2000, 3000, or 4000. In some embodiments, the number of ridges 24 is greater than 5000.

Figure 8A:
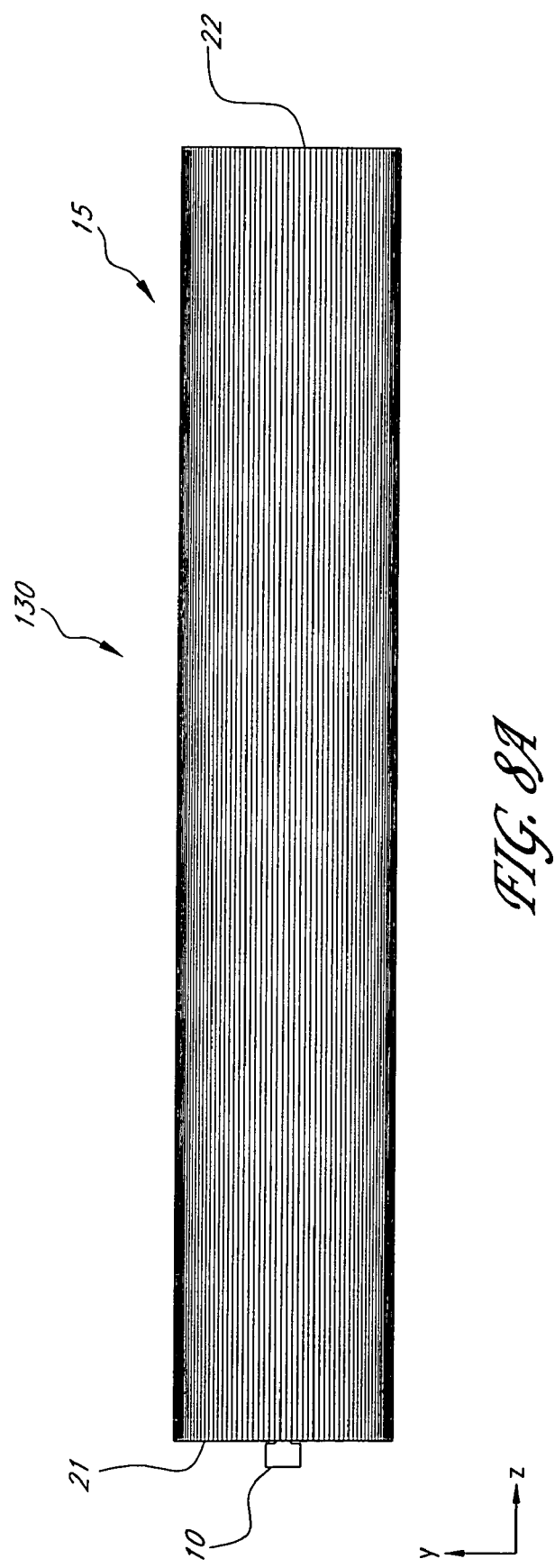
FIG. 8A is a side elevation view of a light source coupled with one embodiment of a mixer that comprises a rippled sidewall comprising a plurality of ridges and valleys.
Figure 8C:
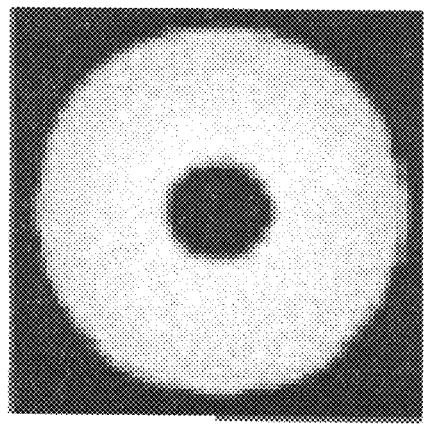
FIG. 8C is a plot of the intensity distribution of the light source of FIG. 8A, which is configured to have a central dark region.
Figure 8B:
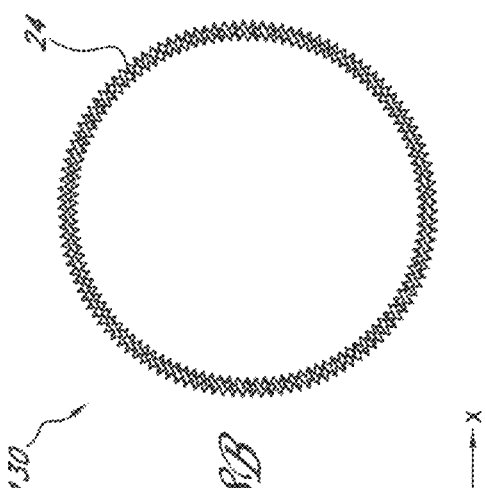
FIG. 8B is a cross-sectional view of the mixer of FIG. 8A.

FIG. 8A schematically illustrates one embodiment of a mixer 130 coupled with the light source 10. In the illustrated embodiment, the mixer 130 comprises a hollow tube that defines a generally cylindrical shape having a circular cross-section orthogonal to the optical axis (z-axis) therethrough. The hollow tube has a reflective coating or film covering its interior surface. The mixer 130 has a length-to-diameter ratio of about 6:1. The mixer 130 further comprises a rippled sidewall 15 having 128 ridges 24, as schematically illustrated in FIG. 8B. For purposes of comparison, as discussed below, in one configuration the ridges 24 are formed by planar sloping surfaces (as shown), and in another configuration the ridges 24 have rounded vertices and are formed by curved surfaces.

As shown in FIG. 8A, the light source 10 is disposed at the center of the input face 21. The light source 10 has a diameter that is one fifth the diameter of the input face 21. FIG. 8C is a plot of the intensity distribution of the light source 10 of the illustrated embodiment. The light source 10 comprises a Lambertian source that is clipped such that the angular distribution for angles below about 9 degrees and above about 30 degrees is zero. As such, the light source 10 simulates the effect of a reflector that has a hole therein, such as can be found in certain flashlight configurations, and/or simulates the effect of the blockage caused by the light source itself being disposed within a reflector. Additionally, blocking low-angle rays removes light having a nearly uniform angular distribution that would otherwise pass through the mixer 20 without interacting with the sidewalls thereof, and thus may have only a small effect on the illuminance distribution at an output face 22 of the mixer 20.

Figure 9:
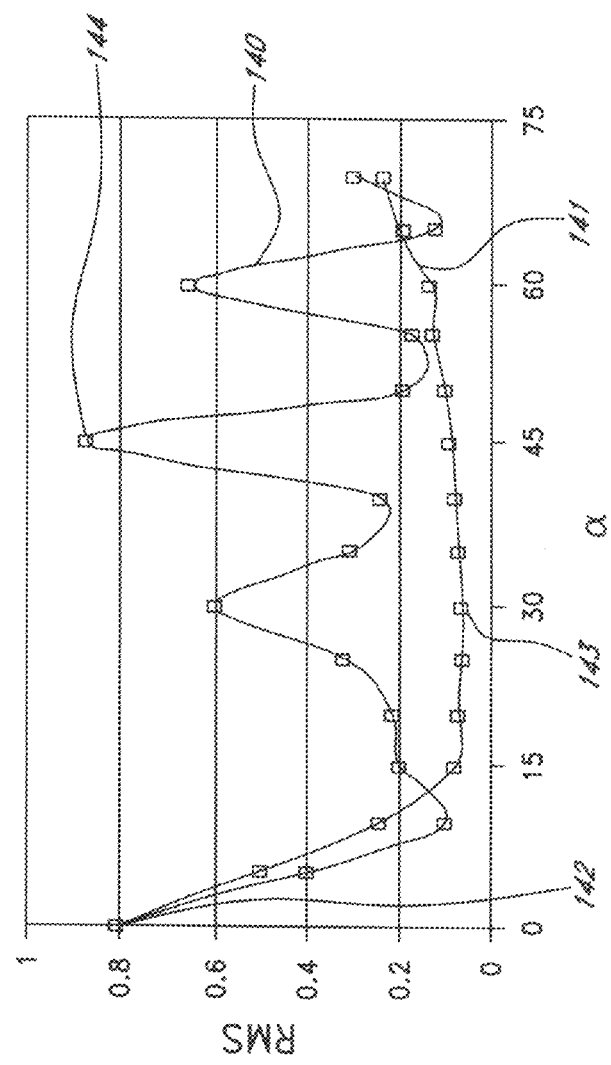
FIG. 9 is a plot of the standard deviation, $\sigma_{Illuminance}$, of the illuminance distribution at the output face of a rippled mixer such as shown in FIGS. 8A and 8B as a function of the angle $\alpha$ of the ridges; plots for mixers having faceted and rounded rippled

The following examples demonstrate that the angle α of the ridges 24 can affect the performance of the mixer 130. FIG. 9 is a plot of the standard deviation of the illuminance distribution, $\sigma_{Illuminance}$, at the output face 22 as a function of the angle α for the system illustrated in FIG. 8A. Smaller values of the standard deviation (i.e., smaller values along the y axis) correspond with greater uniformity of the illuminance distribution. For purposes of comparison, the plot comprises a curve 140 representing data obtained when the mixer 130 comprises ridges 24 having sharp vertices formed by planar facets (such as the ridges depicted in FIG. 7A), and a curve 141 representing data obtained when the mixer 130 comprises ridges 24 having rounded vertices formed by curved surfaces (such as the ridges depicted in FIG. 7B). The plot further comprises three illustrative points 142-144 that correspond with FIGS. 10A and 10B, FIGS. 10C and 10D, and FIGS. 10E and 10F, respectively. At the point 142, the angle α is 0 degrees. Accordingly, the point 142 corresponds with a mixer 130 that does not comprise rippled sidewalls, and thus corresponds with a smooth circular mixing rod. Consequently, standard deviation values lower than the value at the point 142 represent illuminance distributions having greater uniformity than that produced by the smooth mixing rod. Conversely, higher standard deviation values represent less uniform illuminance distributions than that produced by the smooth circular mixing rod.

As shown by the curve 140, the performance of the mixer 130 having sharp ridges 24 changes significantly with varying values of α. Rippled sidewalls 15 characterized by an angle α of about 45 degrees actually yield a less uniform illuminance distribution at the output face 22 than is obtained with a smooth circular mixing rod. As shown by the curve 141, the mixer 20 having rounded ridges 24 is less sensitive to changing values of α.

Figure 10A:
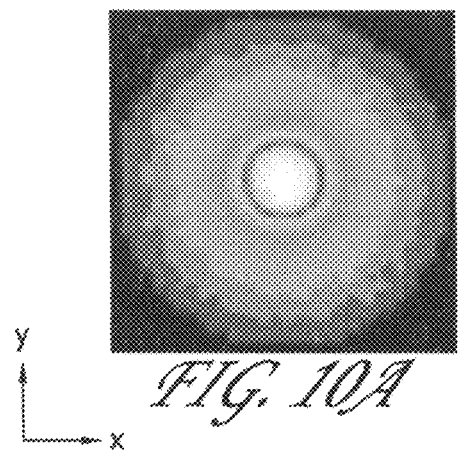
FIG. 10A is a plot of the illuminance distribution at an output face of one embodiment of a mixer without rippled sidewalls.
Figure 10B:
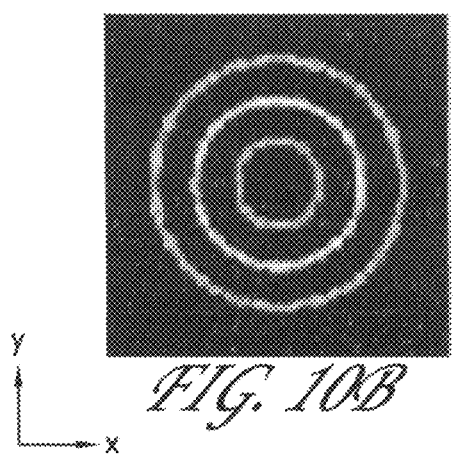
FIG. 10B is a plot of the illuminance distribution obtained by performing a virtual defocus of the light exiting the mixing rod back to the input face of the mixer without rippled sidewalls.

As noted above, FIGS. 10A and 10B correspond with the point 142. FIG. 10A is a spatial plot representing illuminance values at the output face 22. As shown, the intensity is highest at the center of the output face 22 and drops off towards the edges thereof. FIG. 10B is a plot representing the kaleidoscope illuminance distribution obtained by defocusing the light exiting the mixer 130 back to the input face 21 of the mixer. As shown in FIG. 10B, the kaleidoscope illuminance distribution is highly non-uniform and contains multiple bright and dark regions caused by multiple images of the light source 10.

Figure 10C:
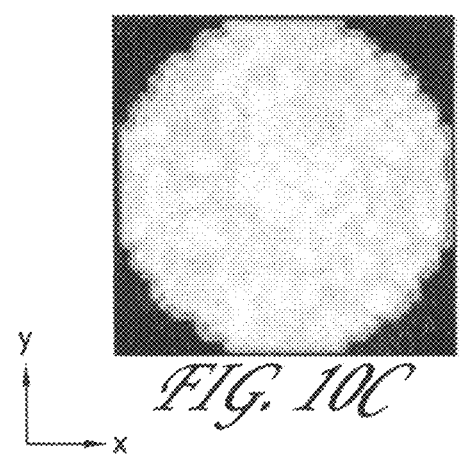
FIG. 10C is a plot of the illuminance distribution at an output face of one embodiment of a mixer comprising a rippled sidewall.
Figure 10D:
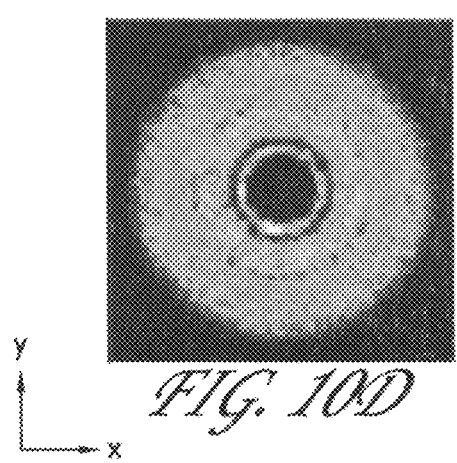
FIG. 10D is a plot of the illuminance distribution obtained by performing a virtual defocus of the light exiting the mixing rod back to the input face of the rippled mixer used with FIG. 10C.

FIGS. 10C and 10D correspond with the point 143, which represents the lowest standard deviation value obtained with either of the mixers 130, and hence represents the most uniform illuminance distribution. It is noted that the rippled circular mixer 130 having rounded ridges 24 produced the value at the point 143.

FIG. 10C is a spatial plot representing illuminance values at the output face 22. As shown, the intensity is substantially uniform over the entire output face 22. FIG. 10D is a plot representing the kaleidoscope illuminance distribution of the mixer 130, which is much more uniform than that shown in FIG. 10B. In FIG. 10D, images of the light source 10 are substantially smeared, almost to the point of being indistinguishable from each other. Accordingly, mixers having rippled sidewalls 15 can dramatically improve the uniformity of kaleidoscope illuminance distributions.

Figure 10E:
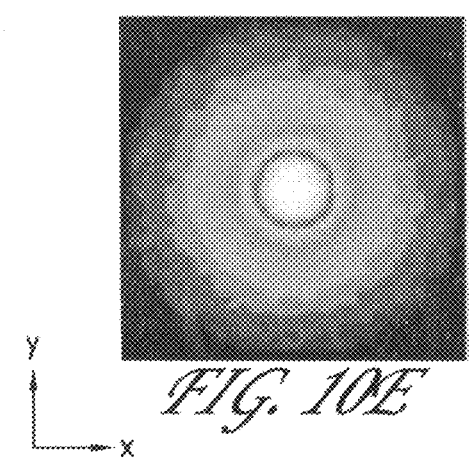
FIG. 10E is a plot of the illuminance distribution at an output face of one embodiment of a mixer comprising a rippled sidewall.
Figure 10F:
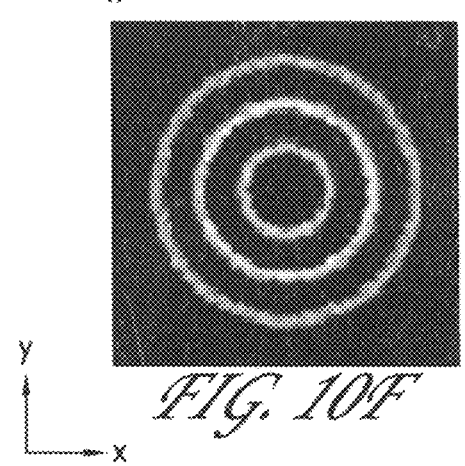
FIG. 10F is a plot of the illuminance distribution obtained by performing a virtual defocus of the light exiting the mixing rod back to the input face of the mixer used with FIG. 10E.

FIGS. 10E and 10F correspond with the point 144, which represents the highest standard deviation value obtained with either of the mixers 130, and hence represents the least uniform illuminance distribution. It is noted that the rippled circular mixer 130 having sharp ridges 24 formed by substantially flat surfaces and an angle α of about 45 degrees produced the value at the point 144. In some embodiments, mixers having sharp ridges 24 characterized by an angle α of about 45 degrees act much like retroreflecting prisms. For example, in some embodiments, light incident on a ridge 24 is reflected from two surfaces of the ridge 24 such that light leaving the ridge 24 propagates along a path parallel to the path traced by the incident light, as viewed along the optical axis (e.g., the z axis defined in FIGS. 8A and 10A-10E) of the mixer 130.

FIG. 10E is a spatial plot representing illuminance values at the output face 22. As shown, the intensity is highest at the center of the output face 22 and drops off towards the edges thereof. The illuminance distribution is even more peaked than that shown in FIG. 10A. FIG. 10F is a plot representing the kaleidoscope illuminance distribution of the mixer 130, which resembles the distribution shown in FIG. 10B.

In certain embodiments, improved kaleidoscope illuminance is achieved with a diffuser at the output face of the mixer. In some embodiments, the diffuser is a low angle diffuser. For example, in certain embodiments the diffuser is configured to diffuse collimated light incident perpendicular to the diffuser into an angular distribution having a full-width half-maximum (FWHM) of about 30 degrees or less, about 6 degrees or less, or about 3 degrees or less. Other diffuser angles and diffuser distributions are also possible. In certain embodiments, the FWHM is approximately equal to the angular size of the input face of the mixer, as seen from the output face of the mixer. In some embodiments, the FWHM follows the equation:

$$FWHM \approx \arctan(D/L)$$

where "D" is the input size of the mixer and "L" is the length of the mixer.

In certain advantageous embodiments, a rippled mixing rod having a substantially uniform transverse cross section along a length thereof is coupled with a diffuser. In many embodiments, the diffuser homogenizes the light that does not hit the sidewalls of the rippled mixer. In some embodiments, the scatter angle of the diffuser is small compared to the numerical aperture of the flux coupled out of the mixer. In certain of such embodiments, the diffuser does not significantly increase the numerical aperture of the output light. As used herein, the term "diffuser" is a broad term used in its ordinary sense, and includes, without limitation, randomly textured surfaces and structured textured surfaces, such as lens arrays, holographic diffusers, and bulk scatter in a thin volume. In some embodiments, bulk scatter can be applied throughout the volume of the mixer or a portion thereof.

In various embodiments, a rippled mixer having a solid configuration, such as the mixer 120 or the mixer 130, comprises a rigid material or a flexible material. In some embodiments, the mixer comprises optical grade acrylic. In further embodiments, the mixer comprises elongate ridges and valleys that extend along and run parallel to the full length of the mixer. In some embodiments, the ridges and the valleys have a substantially constant height of about 0.015 millimeters, about 0.017 millimeters, about 0.020 millimeters, or about 0.025 millimeters. In some embodiments, the height is greater than about 0.015 millimeters, greater than about 0.017 millimeters, greater than about 0.020 millimeters, or greater than about 0.025 millimeters. In other embodiments, the height is less than about 0.025 millimeters, less than about 0.020 millimeters, less than about 0.017 millimeters, or less than about 0.015 millimeters. In certain embodiments, the mixer comprises an input face and an output face that each has a diameter of about 3.0 millimeters. In other embodiments, the diameter is greater than about 3.0 millimeters. In further embodiments, the mixer has a length of about 9.0 millimeters, about 25.0 millimeters, or about 100 millimeters. In some embodiments, the mixer has a length greater than about 9.0 millimeters, greater than about 25.0 millimeters, or greater than about 100 millimeters. Other values are also possible.

In certain embodiments, a rippled mixer, such as the mixer 120, comprises an optical fiber. In some embodiments, the fiber has a diameter (or a cross-sectional width) of at least 3.0 millimeters. In some embodiments, the fiber comprises a core. In certain embodiments, the core has a diameter (or a cross-sectional width) of at least 3.0 millimeters.

The above findings are presented herein primarily for illustrative purposes and should not be construed as limiting. As described above, in some instances circular mixers with elongate ridges and valleys can dramatically improve performance of the mixers. In some instances, such rippled circular mixers create illuminance distributions having uniformity comparable to or even better than that of square mixing rods having comparable dimensions. For example, in various embodiments, rippled circular mixers and square mixing rods having hollow configurations both provide substantially uniform illuminance distributions when the input light distribution has a numerical aperture of at least about 0.24 and when the length-to-width ratio of the mixer is at least about 12:1, when the numerical aperture is about at least 0.45 and the length-to-width ratio is at least about 6:1, and when the numerical aperture is at least about 0.7 and the length-to-width ratio is at least about 3:1. For various embodiments comprising a solid light conduit having an index of refraction of about 1.5, the same holds true when the numerical aperture is at least about 0.24 and the length-to-width ratio is at least about 18:1, when the numerical aperture is at least about 0.45 and the length-to-width ratio is at least about 9:1, when the numerical aperture is at least about 0.7 and the length-to-width ratio is at least about 4.5:1, and when the numerical aperture is at least about 1.0 and the length-to-width ratio is at least about 3:1.

In some embodiments, a rippled circular mixer having a solid configuration provides a substantially uniform illuminance distribution at its output face when its input face has a numerical aperture of about 0.5 and when the mixer has a length-to-width ratio of about 10:1. In some embodiments, similar results can be achieved when the numerical aperture is about 1.0 and the length-to-width ratio is about 3:1. In many embodiments, substantially uniform illuminance distributions can be achieved as the numerical aperture of a mixing rod is increased and the length-to-width ratio thereof is reduced.

Shorter mixers are also able to provide excellent uniformity, but the general trend is that shorter lengths become increasingly sensitive to the light distribution at the input face 21. Nevertheless, the ability of rippled, circular mixers to produce a uniform, circular beam when the length-to-width ratio of the mixers is less than about 6:1 is a particularly advantageous result. Shorter mixers allow systems that are more compact, lighter, and potentially less expensive. Furthermore, in some instances, circular mixers have kaleidoscope illuminance distributions that are more uniform than those produced by square mixing rods.

As with the circular mixers 20 described above, the performance of mixers having square cross-sections can be improved by adding rippled sidewalls. Certain improvements effected by the addition of elongate ridges and valleys to the sidewalls of the square mixing rods are shown in the following specific examples, which are meant to be illustrative and in no way limiting.

Figure 11:
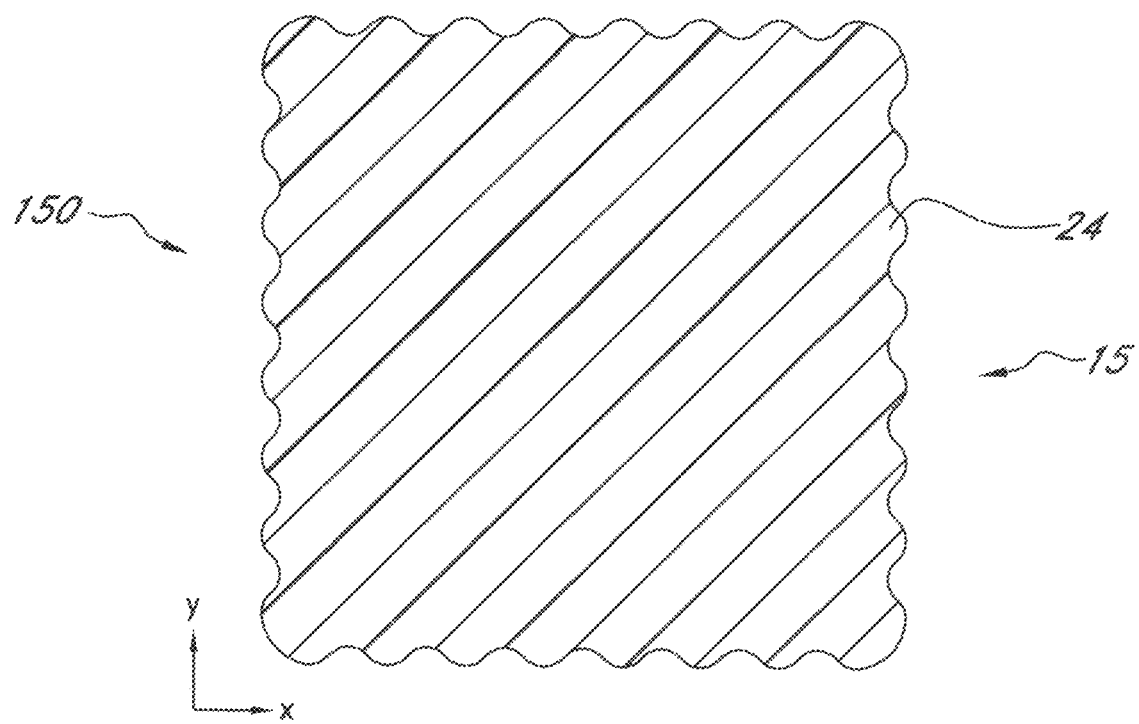
FIG. 11 is a cross-sectional view of a square mixer that has rippled sidewalls having ridges and valleys.

FIG. 11 schematically illustrates the cross-section of one embodiment of a rippled square mixer 150. In the illustrated embodiment, the mixer 150 comprises four rippled sidewalls 15. In certain embodiments, one or more of the rippled sidewalls 15 are substantially planar. In some embodiments, the one or more rippled sidewalls 15 form a right rectangular prism or a right square prism. In many embodiments, light propagating within the mixer 150 is reflected more times than it would be within a mixer that has the same dimensions as the mixer 150 but does not have rippled sidewalls. In certain embodiments, the mixer 150 outputs a substantially rectangular or substantially square beam at the output face 22.

In some embodiments, the one or more sidewalls 15 comprise a plurality of elongate ridges 24 and valleys 25. In some embodiments, the ridges 24 and the valleys 25 extend along the length of the mixer 150. In the illustrated embodiment, the cross-sectional shape and area of the mixer 150 is constant along the entire length of the mixer 150. The height and width of the mixer 150 are each about 4 millimeters. The mixer 150 comprises thirty-two rounded ridges 24 around its perimeter that run parallel to the length of the mixer 150. The vertices of the ridges 24 are spaced from each other by approximately 0.5 millimeters and have a constant height of about 120 microns along the length of the mixer 150. Other sizes, dimensions, and configurations of the mixer 150 are possible.

Each of FIGS. 12A-12F corresponds with an arrangement such as that schematically depicted in FIG. 2, wherein the reflector 12 is an elliptical collector, the light source 10 is located at one focus of the reflector 12, and the center of the input face 21 of a mixer is located at the other focus of the reflector 12, and wherein two distinct mixers are used separately for purposes of comparison, as detailed below.

Figure 12A:
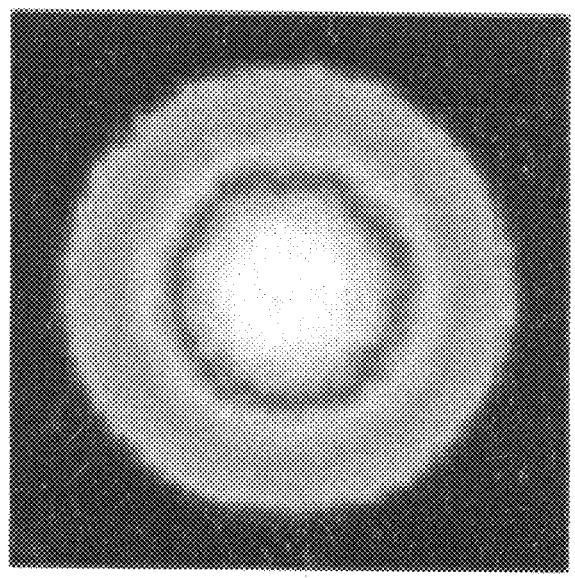
FIG. 12A is a plot of the illuminance distribution at an input face of one embodiment of a square mixer.

FIG. 12A is a plot of the illuminance distribution at the input face 21 of a mixer in such an arrangement. As with the plot shown in FIG. 5A, the illuminance is highest at the center of the input face 21, and drops off toward the edges thereof.

Figure 12B:
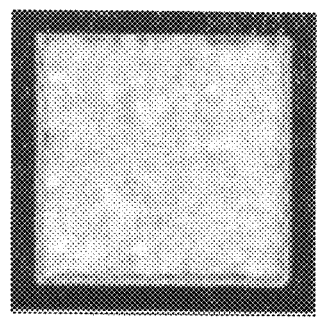
FIG. 12B is a plot of the illuminance distribution at an output face of one embodiment of a square mixer without rippled sidewalls.
Figure 12C:
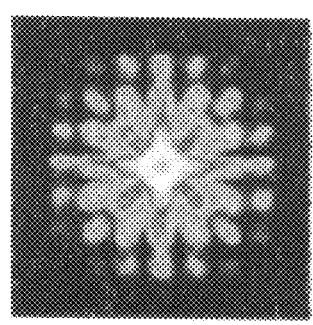
FIG. 12C is a plot of the illuminance distribution obtained by performing a virtual defocus of the light exiting the mixing rod back to the input face of the square mixer without rippled sidewalls.

FIGS. 12B and 12C correspond with a smooth mixing rod (not shown) having a square cross-section orthogonal to the optical axis or longitudinal (z) direction. The smooth square mixing rod is a solid rod having an index of refraction of about 1.5 and a length-to-width ratio of about 10:1. FIG. 12B is a plot illustrating the illuminance distribution at the output face 22 of the smooth square mixing rod. As shown, the illuminance distribution is substantially uniform. FIG. 12C is a plot representing the kaleidoscope illuminance distribution obtained by defocusing the light exiting the mixing rod back to the input face 21 of the mixing rod. As shown in FIG. 12C, the kaleidoscope illuminance distribution is highly non-uniform and contains multiple bright and dark regions produced by multiple images of the light source 10.

Figure 12D:
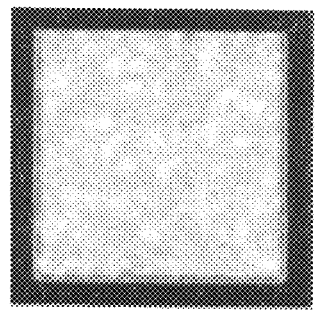
FIG. 12D is a plot of the illuminance distribution at an output face of one embodiment of a square mixer with rippled sidewalls.
Figure 12E:
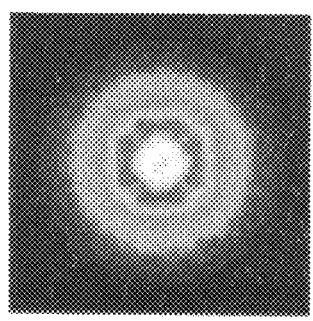
FIG. 12E is a plot of the illuminance distribution obtained by performing a virtual defocus of the light exiting the mixing rod back to the input face of the square mixer with rippled sidewalls.

FIGS. 12D and 12E correspond with one embodiment of a rippled mixer similar to the rippled mixer 150. The rippled mixer comprises a solid rod having an index of refraction of about 1.5 and a length-to-width ratio of about 10:1. The cross-sectional shape and area of the mixer is constant along the entire length thereof. The height and width of the mixer are each about 4 millimeters. The mixer comprises 128 rounded ridges 24 around its perimeter (thirty-two ridges per side) that run parallel to the length of the mixer. The vertices of the ridges 24 are spaced from each other by approximately 0.125 millimeters and have a constant height of about 30 microns along the length of the mixer. The only difference between the smooth square mixing rod associated with FIGS. 12B and 12C and the rippled square mixer associated with FIGS. 12D and 12E is the ridges 24 and the valleys 25 disposed around the rippled mixer.

FIG. 12D is a plot illustrating the illuminance distribution at the output face 22 of the rippled mixer. As shown, the illuminance distribution is substantially uniform. This is a particularly advantageous and unexpected result. Whereas smooth square mixing rods are known to produce uniform illuminance distributions when the mixing rods are sufficiently long, the common practice has been to avoid rounding the corners of the mixing rods. In general, smooth square mixing rods with rounded corners do not perform as well as smooth square mixing rods with sharp corners. However, the addition of ridges to square mixing rods—even rounded ridges—yields illuminance distributions with uniformities comparable to those obtained with smooth square mixing rods that have sharp corners. Furthermore, various examples described below illustrate that rippled sidewalls can actually provide illuminance distributions having uniformities superior to those provided by smooth square mixing rods.

For example, adding ridges to square mixing rods can improve the uniformity of kaleidoscope illuminance distributions. FIG. 12E is a plot representing the kaleidoscope illuminance distribution obtained by defocusing the light exiting the rippled square mixer back to the input surface of the mixer. The kaleidoscope illuminance distribution is much more uniform than that shown in FIG. 12C, which was obtained with a smooth square mixing rod. In FIG. 12E, the images of the light source 10 are rotationally smeared.

Figure 12F:
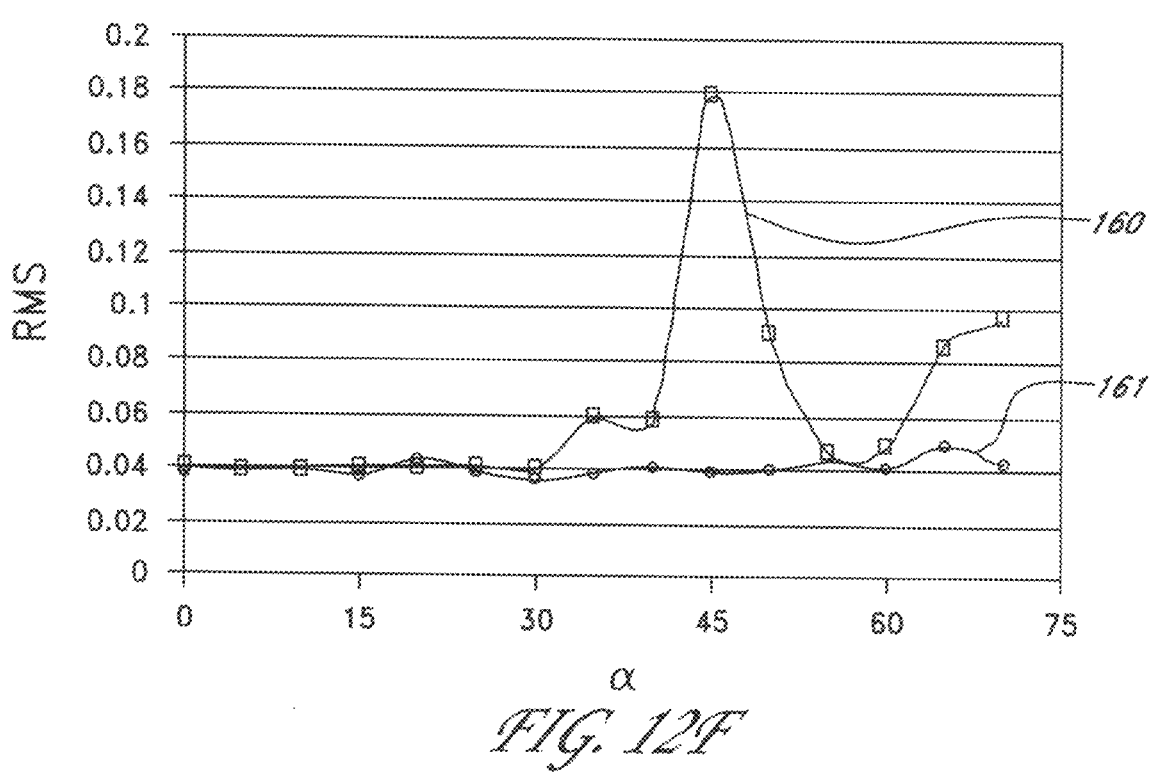
FIG. 12F is a plot of the standard deviation of the illuminance distribution at the output face as a function of the angle $\alpha$ of the ridges for square mixers having faceted and rounded rippled sidewalls.

FIG. 12F is a plot of the standard deviation, $\sigma$, of the illuminance distribution at the output face 22 of the rippled square mixer as a function of the angle $\alpha$. For purposes of comparison, the plot comprises a curve 160 representing data obtained when the rippled mixer comprises ridges 24 having sharp vertices formed by planar facets, such as the ridges 24 depicted in FIG. 7A, and a curve 161 representing data obtained when the rippled mixer comprises ridges 24 having rounded vertices formed by curved surfaces, such as the ridges 24 depicted in FIGS. 7B and 11. When the angle α is 0 degrees, the rippled mixers correspond with a smooth square mixing rod. Consequently, standard deviation values lower than that at which α equals 0 degrees represent illuminance distributions having better uniformity than that produced by a smooth square mixing rod. Conversely, higher standard deviation values represent less uniform illuminance distributions than that produced by a smooth square mixing rod.

As shown by the curve 160, the performance of the mixer comprising ridges 24 having sharp vertices formed by planar facets varies significantly with different values of α, and generally provides less uniform distributions than does a smooth square mixing rod. As with the circular mixer 130 comprising ridges 24 with sharp vertices above, the square mixer with sharp vertices creates the least uniform illuminance distribution at an angle α of about 45 degrees. As shown by the curve 161, the mixer having ridges 24 with rounded vertices yields far more consistent results with changing values of α, and, at an angle α of about 30 degrees, actually provides more uniform distributions than does a smooth square mixing rod.

Figure 13B:
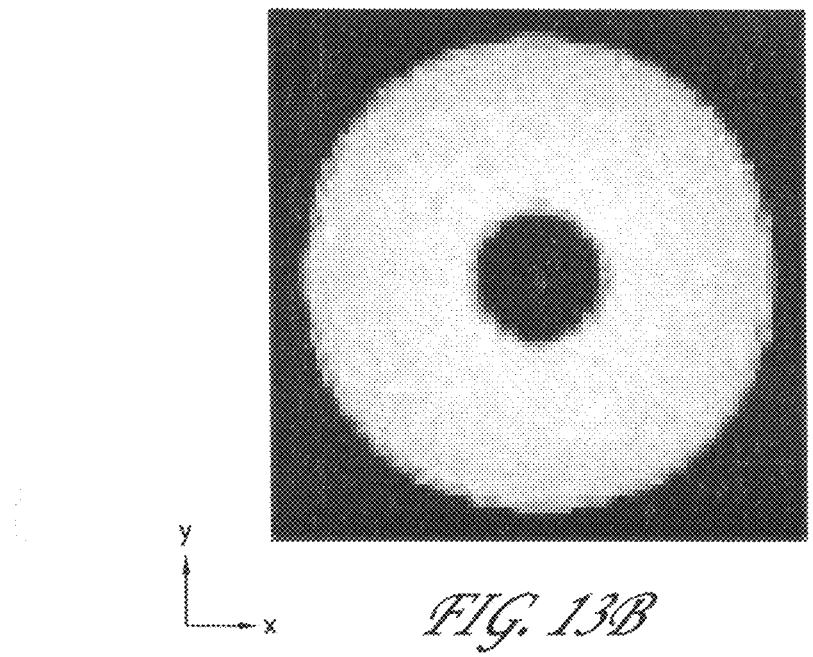
FIG. 13B is a plot of the intensity distribution of the light source of FIG. 13A which has a central dark region.

FIG. 13A schematically illustrates one embodiment of a mixer 170 coupled with the light source 10, which is similar to the arrangement described above with respect to FIG. 8A. In the illustrated embodiment, the mixer 170 comprises a hollow square tube having a substantially reflective coating or film covering its interior surface. The mixer 170 has a height of about 2 millimeters, a width of about 2 millimeters, and a length-to-width ratio of about 6:1. In one embodiment, the mixer 170 comprises ridges 24 having sharp vertices formed by planar facets, and in another embodiment, the mixer 170 comprises ridges 24 having rounded vertices formed by curved surfaces. For the two embodiments just described, the mixer 170 comprises 128 rounded ridges 24 around its perimeter (thirty-two ridges per side) that run parallel to the length of the mixer. The vertices of the ridges 24 are spaced from each other by approximately 0.0625 millimeters and have a constant height along the length of the mixer. The light source 10 is approximately at the center of the input face 21 of the mixer 170 and has diameter that is one fifth the width of the input face. FIG. 13B is a plot of the intensity distribution of the light source 10 of the illustrated embodiment. The light source 10 comprises a Lambertian source similar to that described above with respect to FIG. 8C.

Figure 13C:
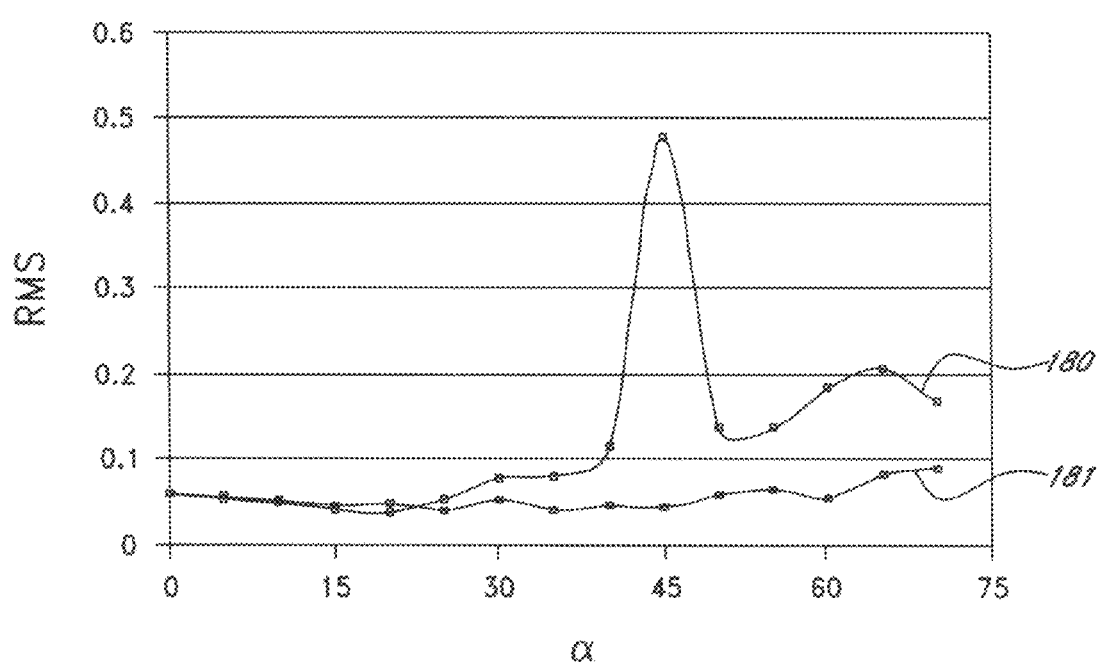
FIG. 13C is a plot of the standard deviation of the illuminance distribution at an output face as a function of the angle $\alpha$ of the ridges for mixers such as shown in FIG. 13A having faceted and rounded rippled sidewalls.

FIG. 13C is a plot of the standard deviation, σ, of the illuminance distribution at the output face 22 of the mixer 170 of FIG. 13A as a function of the angle α, and is similar to the plot shown in FIG. 12F. The plot comprises a curve 180 representing data obtained when the mixer 170 comprises ridges 24 having sharp vertices formed by planar faces and a curve 181 representing data obtained when the mixer 170 comprises ridges 24 having rounded vertices formed by curved surfaces. When the angle α is 0 degrees, the mixers 170 correspond with a smooth square mixing rod. Accordingly, standard deviation values lower than that at which α equals 0 degrees represent illuminance distributions having improved uniformity over those produced by a smooth square mixing rod. Conversely, higher standard deviation values represent less uniform illuminance distributions.

As demonstrated by the curve 180, illuminance distributions obtained from the mixer 170 comprising ridges 24 having sharp vertices formed by planar facets vary widely with varying values of α, and are generally less uniform than those obtained from a smooth square mixing rod. Planar facets with an angle α between 10 and 25 degrees can provide reasonable uniformity for this example. As with the circular mixer 130 comprising ridges 24 with sharp vertices and the square mixer 150 comprising ridges 24 with sharp vertices discussed above, the square mixer 170 comprising ridges 24 with sharp vertices creates the least uniform illuminance distribution at an angle α of about 45 degrees.

As demonstrated by the curve 181, the square mixer 170 comprising ridges 24 having rounded vertices yields far more consistent results with changing values of α than does the square mixer 170 comprising ridges 24 with sharp vertices. Also, the square mixer 170 comprising ridges 24 with rounded vertices yields a more uniform illuminance distribution, as compared with a smooth square mixing rod, over a wider range of angles than does the square mixer 150 comprising ridges 24 with rounded vertices described above (with respect to FIG. 12F).

Rippled square mixers such as those just described generally have more uniform kaleidoscope illuminance distributions than do non-rippled square mixing rods. Rippled sidewalls tend to rotationally smear images of the non-uniform illuminance distribution of the light source, resulting in a less regular pattern of bright and dark regions. Furthermore, in some cases, rippled sidewalls comprising ridges with rounded vertices improve kaleidoscope illuminance distribution uniformity to a greater extent than do rippled sidewalls comprising ridges with sharp vertices. In certain instances, mixers comprising rippled sidewalls can be shorter than smooth mixers due to the improved kaleidoscope illuminance distributions that result.

While the above examples have focused on mixers comprising circular and square cross-sections and further comprising rippled sidewalls, it is noted that numerous other mixer configurations can benefit from rippled sidewalls. Some examples include mixers having rectangular, pentagonal, trapezoidal, cross-shaped cross-sections, although the possible embodiments should not be limited to these. In many instances, mixer configurations having round (e.g., non-faceted) cross-sections particularly benefit from rippled sidewalls, since mixers of this variety often produce highly non-uniform illumination distributions.

Figure 14A:
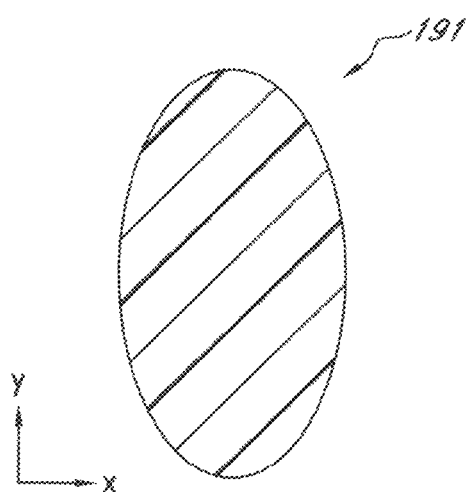
FIG. 14A is a cross-sectional view of one embodiment of an elliptically shaped mixer without rippled sidewalls.
Figure 14B:
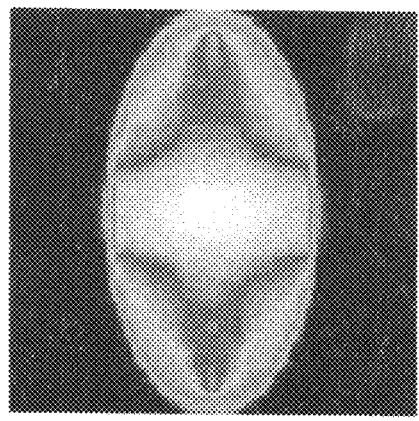
FIG. 14B is a plot of the illuminance distribution at an output face of the elliptical mixer of FIG. 14A.
Figure 14C:
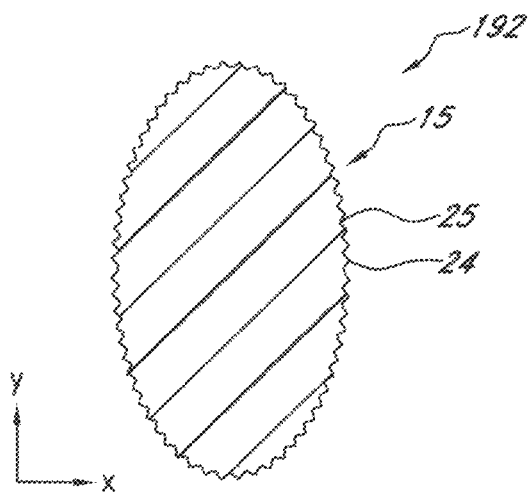
FIG. 14C is a cross-sectional view of one embodiment of an elliptically shaped mixer comprising a rippled sidewall.
Figure 14D:
FIG. 14D is a plot of the illuminance distribution at an output face of the elliptical mixer of FIG. 14C.

For example, FIGS. 14A-14D demonstrate the improvement in illuminance distribution resulting from adding rippled sidewalls to a smooth mixer having an oval-shaped cross-section. FIG. 14A schematically depicts the cross-section of a smooth mixer 191 without rippled sidewalls, and FIG. 14B is a plot of the illuminance distribution at an output face of the mixer 191. FIG. 14C schematically depicts the cross-section of a rippled mixer 192 comprising a rippled sidewall 15 having ridges 24 and valleys 25, and FIG. 14D is a plot of the illuminance distribution at an output face of the rippled mixer 192. As shown, the rippled mixer 192 provides a more uniform illuminance distribution than does the smooth mixer 191. In further embodiments, the mixer 192 comprises a substantially elliptical cross-section.

Figure 15:
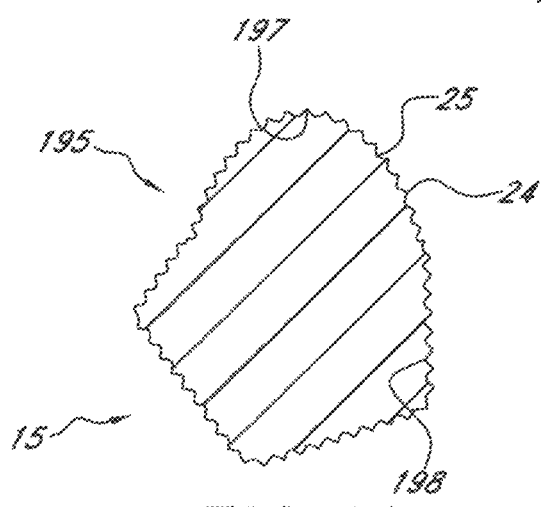
FIG. 15 is a cross-sectional view of one embodiment of an irregularly shaped mixer that has rippled sidewalls.

FIG. 15 schematically depicts the cross-section of one embodiment of a rippled mixer 195 comprising rippled sidewalls 15 having ridges 24 and valleys 25. The mixer 20 comprises a first portion 197 that is substantially oval-shaped and a second portion 198 that is substantially pentagonal. Four sides of the pentagon are planar and the fifth side of the pentagon is replaced with the oval portion 197. Accordingly, the mixer 195 is a composite of faceted and rounded sides and shapes. The rippled sidewalls 15 improve the illuminance distribution of the composite mixer 195. Many composite mixer configurations can have improved illuminance distributions through the inclusion therein of rippled sidewalls 15.

Figure 16A:
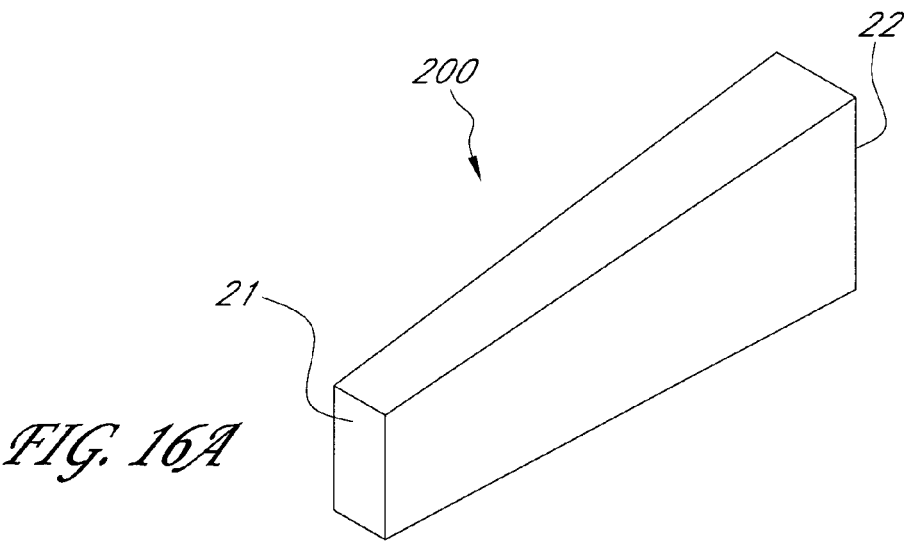
FIG. 16A is a perspective view of one embodiment of an angle-to-area converting mixer.

FIG. 16A schematically illustrates one embodiment of a mixer 200 having smooth sidewalls and comprising an input face 21 and an output face 22 that have different areas.

Accordingly, the cross-sectional area changes along the length of the mixer 200. In some embodiments, the shape of the cross-section of the mixer 200 also changes along the length of the mixer 200. In the illustrated embodiment, the input face 21 and the output face 22 are each rectangular, and the area at the input face 21 is smaller than the area at the output face 22. In certain arrangements, the mixer 200 provides an angle-to-area conversion of the distribution of light entering the input face 21. For example, in some instances, a change in the cross-sectional area along the length of the mixer 200 causes the angular distribution at the output face 22 to be narrower or wider than the angular distribution at the input face 21. In certain embodiments, for example, etendue is conserved. Thus, the numerical aperture at the input face 21 may be larger than the numerical aperture at the output 22 end because the area at the input face is smaller than the area at the output face. In many instances, however, the mixer 200 does not provide uniform illuminance distributions at the output face 22. This is especially true when the length of the mixer 200 is relatively short.

Figure 16B:
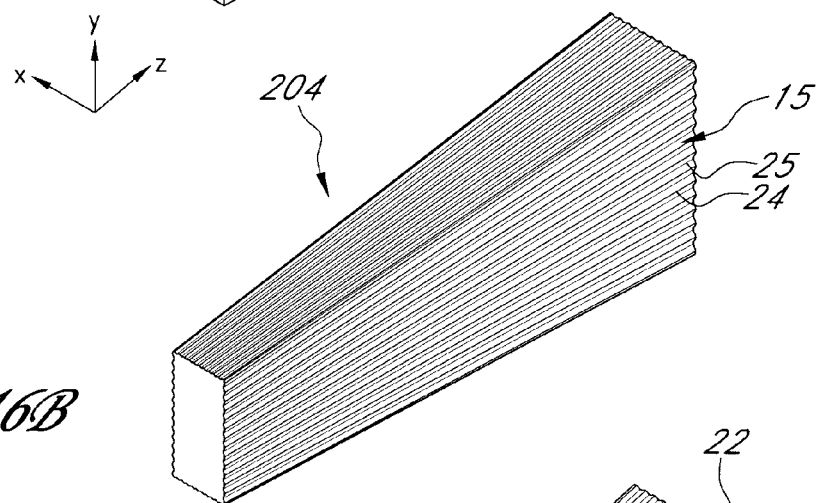
FIG. 16B is a perspective view of one embodiment of an angle-to-area converting mixer that has rippled sidewalls.

FIG. 16B schematically illustrates a mixer 204 similar to the angle-to-area converting mixer 200 that further comprises rippled sidewalls 15 having ridges 24 and valleys 25. In certain embodiments, the ridges 24 and the valleys 25 have a constant height and run parallel to the length of the mixer 204. In many embodiments, the illuminance distribution of the rippled mixer 204 is more uniform than that of the mixer 200. As describe above, both the areas and the size of the angular spread of light at the input and output are different. In certain preferred embodiments, for example, etendue is generally conserved. Thus, the small area of the input face is associated with a larger numerical aperture while the large area at the output face is associated with a small numerical aperture. Because of the inverse relationship between angle and area, these structures may be referred to herein as angle-to-area converters.

Figure 16C:
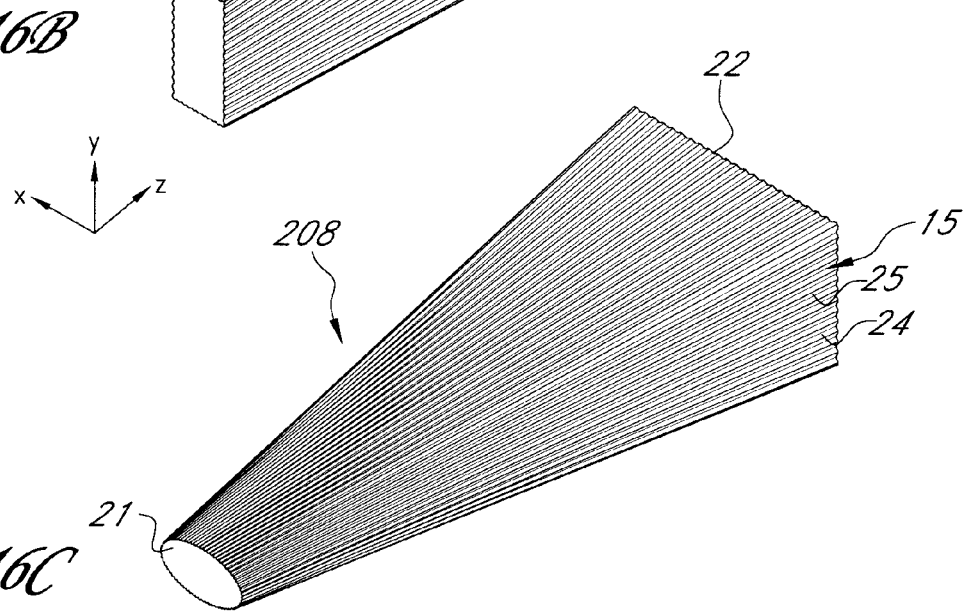
FIG. 16C is a perspective view of one embodiment of an angle-to-area converting rippled mixer that has an elliptically shaped input face and a rectangular output face.

FIG. 16C schematically illustrates a mixer 208 comprising an input face 21 and an output face 22 that have different shapes and sizes. The input face 21 is oval-shaped, and the output face 22 is rectangular and has a larger area than the input face 22. The mixer includes a central region between the input face 21 and the output face 22 that transforms from an oval cross-section toward the input face to a rectangular cross-section toward the output face. In some embodiments, the mixer 208 provides input light with an angle-to-area conversion. In certain embodiments, for example, etendue is conserved. The mixer 208 comprises rippled sidewalls 15 having ridges 24 and valleys 25 that improve the illuminance distribution at the output face 22. Numerous other arrangements are possible for the input face 21, the output face 22, the central region therebetween, and/or the rippled sidewalls 15.

In certain advantageous embodiments, rippled angle-to-area converting mixers, such as the mixers 204, 208 just described, not only permit angle-to-area conversion of input light, but also homogenize the input light, as further discussed below. In some configurations, rippled sidewalls are advantageously included in angle-to-area converting mixers that are used to produce white light from RGB LED arrays. In certain arrangements, the rippled sidewalls reduce sensitivity of the mixers to alignment with the light source at the input face. The rippled sidewalls can also reduce the length required for the mixers to produce a substantially uniform illuminance distribution, as illustrated by certain embodiments described herein.

Figure 17A:
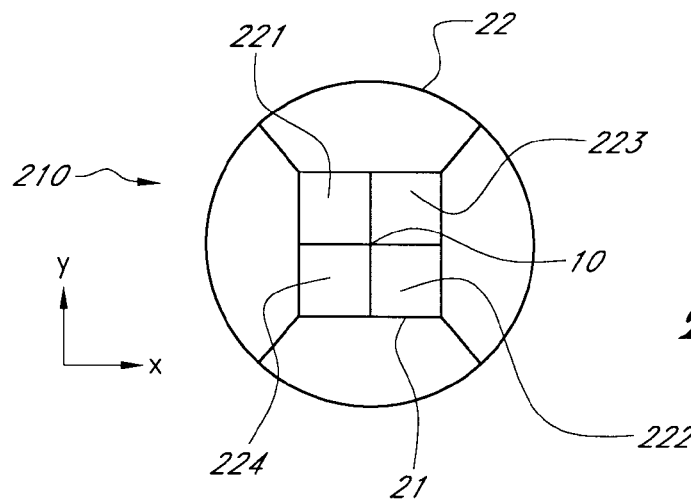
FIG. 17A is a front plan view of one embodiment of an angle-to-area converting mixer without rippled sidewalls coupled at an input end with an array of light emitting diodes.

FIG. 17A schematically depicts one embodiment of an angle-to-area converting mixer 210 coupled with the light source 10. As noted above, the light source 10 can comprise a wide variety of light producing devices. In the illustrated embodiment, the light source 10 comprises an RGB LED array having four sources 221-224 disposed in two columns and two rows. In some arrangements, two of the sources 221, 222 are green LEDs, one source 223 is a red LED, and the other source 224 is a blue LED. In some embodiments, the array comprises one, two, three, four, five, or six rows of LEDs, and in further embodiments, the array comprises one, two three, four, five, or six columns of LEDs. Other numbers and combinations of sources are possible for the LED array. Accordingly, in some embodiments, the array comprises a plurality of rows and/or a plurality of columns of light emitting diodes. In some embodiments, the LED array comprises one or more phosphor LEDs. In certain embodiments, the sources 221-224 are substantially aligned in a plane. In some embodiments, the sources 221-224 are disposed on a common substrate and, in further embodiments, are situated in proximity (e.g., adjacent) to each other. In various other embodiments, the light source 10 comprises any number of LEDs and/or any other suitable light-producing devices.

In certain embodiments, the mixer 210 comprises an input face 21 and an output face 22. In the illustrated embodiment, the input face 21 is substantially square and the output face 22 is substantially circular and has an area larger than the input face 21. Accordingly, the mixer 210 can be symmetrical about two perpendicular axes, such as the x and y axes defined in FIG. 17A. Such arrangements can be particularly suitable for planar RGB LED arrays. The mixer 210 can also be symmetrical about one axis only, and in other arrangements, the mixer 210 is asymmetrical.

In various arrangements, the input face 21 is substantially square and has a width between about 1.0 millimeters to about 12 millimeters, between about 0.5 millimeters to about 1.5 millimeters, between about 1.0 millimeters to about 2.0 millimeters, between about 2.0 millimeters to about 3.0 millimeters, or between about 3.0 millimeters to about 4.0 millimeters. In other arrangements, the width is less than about 2.5 millimeters, less than about 2.0 millimeters, less than about 1.5 millimeters, less than about 1.0 millimeters, less than about 0.5 millimeters, or less than about 0.25 millimeters. In other arrangements, the width is greater than about 0.25 millimeters, greater than about 0.5 millimeters, greater than about 1.0 millimeters, greater than about 2.0 millimeters, or greater than about 3.0 millimeters. In some arrangements, the width is about 0.5 millimeters, about 1.0 millimeters, about 1.5 millimeters, about 2.0 millimeters, about 2.1 millimeters, about 2.2 millimeters, about 2.5 millimeters, or about 3.0 millimeters.

In other arrangements, the input face 21 is substantially square and has a width of from about 1.0 centimeters to about 10 centimeters, from about 1.0 centimeters to about 5.0 centimeters, or from about 5.0 centimeters to about 10.0 centimeters. In other arrangements, the width is less than about 10.0 centimeters, less than about 5.0 centimeters, or less than about 1.0 centimeters. In still other arrangements, the width is greater than about 1.0 centimeters, greater than about 5.0 centimeters, or greater than about 10.0 centimeters. In some arrangements, the width is about 1.0 centimeters, about 1.5 centimeters, about 2.0 centimeters, about 2.5 centimeters, about 3.0 centimeters, about 5.0 centimeters, or about 10.0 centimeters. Other sizes and configurations for the input face 21 are possible.

In certain embodiments, the output face 22 is substantially circular and has a diameter of from about 0.5 millimeters to about 3.0 millimeters, from about 1.0 millimeter to about 5.0 millimeters, from about 2.0 millimeters to about 7.0 millimeters, from about 2.5 millimeters to about 6.0 millimeters, or from about 3.0 millimeters to about 5.0 millimeters. In other arrangements, the diameter is less than about 7.0 millimeters, less than about 5.0 millimeters, less than about 2.0 millimeters, less than about 1.0 millimeters, and less than about 0.5 millimeters. In other arrangements, the diameter is greater than about 0.5 millimeters, greater than about 1.0 millimeters, greater than about 2.0 millimeters, greater than about 2.5 millimeters, or greater than about 3.0 millimeters. In some arrangements, the diameter is about 0.7 millimeters, 1.0 millimeters, 2.0 millimeters, 3.0 millimeters, about 4.0 millimeters, about 4.5 millimeters, about 4.7 millimeters, about 5.0 millimeters, or about 5.5 millimeters.

In other embodiments, the output face 22 has a diameter of from about 1.0 centimeters to about 10.0 centimeters, from about 2.5 centimeters to about 6.0 centimeters, or from about 3.0 centimeters to about 5.0 centimeters. In other arrangements, the diameter is less than about 10.0 centimeters, less than about 5.0 centimeters, or less than about 1.0 centimeters, and in other arrangements, the diameter is greater than about 1.0 centimeters, greater than about 5.0 centimeters, or greater than about 10.0 centimeters. In some arrangements, the diameter is about 3.0 centimeters, about 4.0 centimeters, about 4.5 centimeters, about 5.0 centimeters, about 5.5 centimeters, or about 6.0 centimeters. Other sizes and configurations for the output face 22 are possible.

Figure 17B:
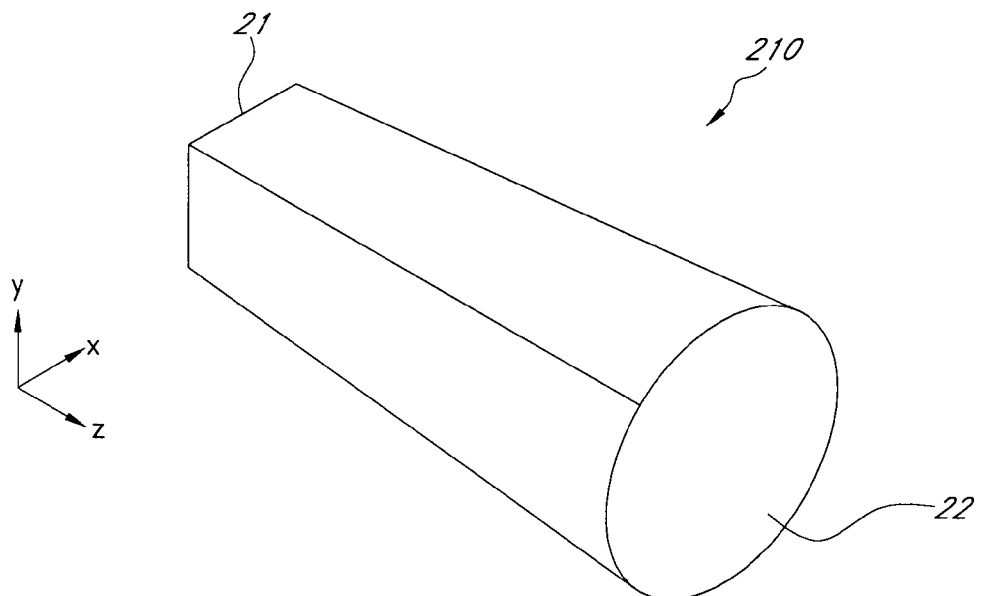
FIG. 17B is a perspective view of the mixer of FIG. 17A.

As schematically illustrated in FIG. 17B, the mixer 210 comprises an exterior surface that slopes outwardly from the input face 21 to the output face 22, smoothly joining the two faces 21, 22. The mixer 210 includes a central region between the input face 21 and the output face 22 that transforms from a square cross-section toward the input face to a circular cross-section toward the output face. The area of the cross-section also increases from the input face 21 through the central region to the output face 22.

In some arrangements, the mixer 210 comprises a solid piece of substantially transmissive material. In various embodiments, the index of refraction of the material is between about 1.3 and about 2.2, between about 1.4 and about 1.6, or between about 1.45 and about 1.55. In some embodiments, the index of refraction is greater than about 1.3, greater than about 1.4, or greater than about 1.45. In other embodiments, the index of refraction is less than about 2.2, less than about 1.7, less than about 1.6, or less than about 1.55. In some embodiments, the index of refraction is about 1.40, about 1.45, about 1.50, about 1.55, or about 1.6. In other arrangements, the mixer 210 comprises a hollow tube with a substantially reflective interior and/or exterior surface.

In various embodiments, the length of the mixer 210, as measured along the z axis defined in FIG. 17B, is from about 0.1 centimeters to about 10.0 centimeters, from about 0.2 centimeters to about 3.5 centimeters, from about 1.0 centimeters to about 5.0 centimeters, or from about 1.5 centimeters to about 3.0 centimeters. In some embodiments, the length is less than about 10.0 centimeters, less than about 5.0 centimeters, less than about 3.0 centimeters, less than about 1.0 centimeters, or less than about 0.5 centimeters. In other embodiments, the length is greater than about 0.5 centimeters, greater than about 1.0 centimeter, greater than about 2.0 centimeters, greater than about 5.0 centimeters, or greater than about 10.0 centimeters. In some embodiments, the length is about 1.0 centimeters, about 1.5 centimeters, or about 2.0 centimeters. Other lengths are possible.

Figure 17E:
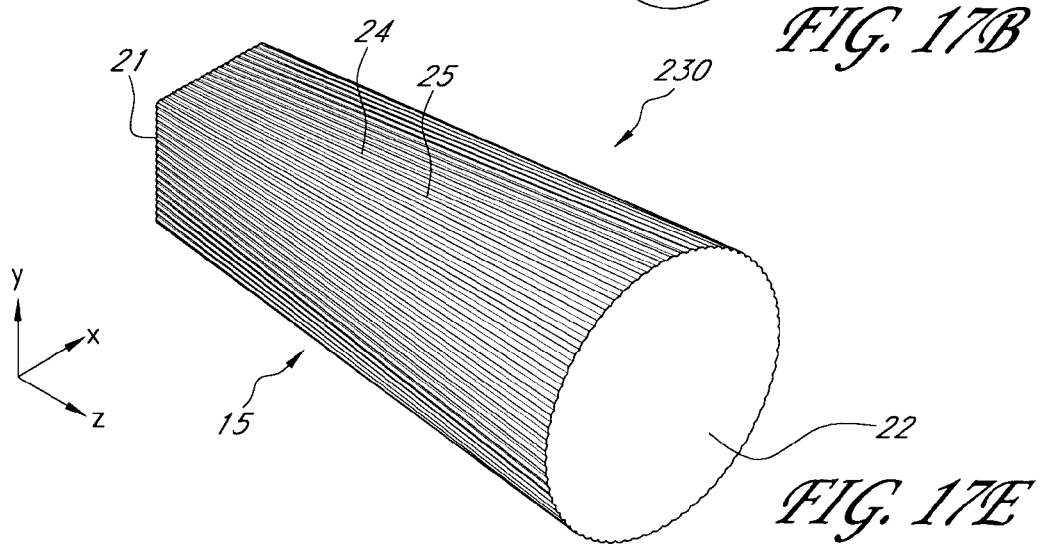
FIG. 17E is a perspective view of one embodiment of an angle-to-area converting mixer similar to that shown in FIG. 17A but with rippled sidewalls.
Figure 17C:
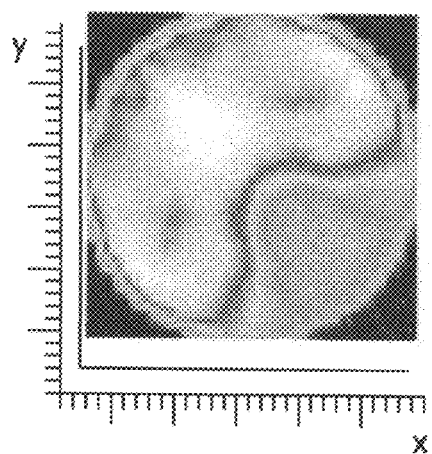
FIG. 17C is a plot of the illuminance distribution at an output face of the mixer of FIGS. 17A and 17B when only one of the light emitting diodes is illuminated.
Figure 17D:
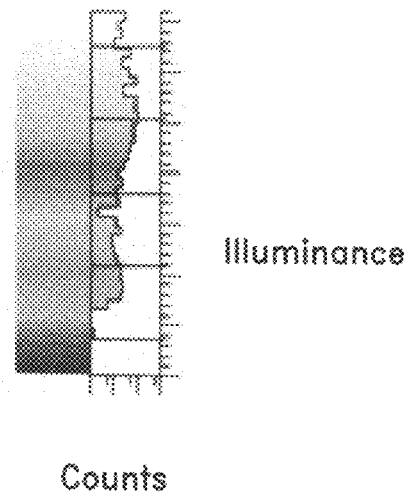
FIG. 17D is a histogram of the illuminance values displayed in the plot of FIG. 17C.

In some respects, the plots shown in FIGS. 17C and 17D are similar to those described above with respect to FIGS. 5A and 5B, respectively. The plots illustrate the illuminance distribution at the output face 22 of the mixer 210 when only one of the sources 221-224 is illuminated. FIGS. 17C and 17D represent plots obtained from a mixer 210 comprising an input face 21 having a width of about 2.1 millimeters, an output face 22 having a diameter of about 4.7 millimeters, and a length of about 15 millimeters. The mixer 210 comprises a solid material having an index of refraction of about 1.5. As shown in FIG. 17C, the illuminance distribution at the output face is highly non-uniform. A region of high intensity is located in the top left quadrant of the output face 22, which is correlated with the location of the illuminated LED at the input face 21. A region of lower intensity is located in the bottom right quadrant. In FIG. 17D, the histogram comprises a large range of illuminance values, also indicating poor uniformity.

FIG. 17E schematically illustrates one embodiment of a rippled angle-to-area converting mixer 230 that is coupled at an input face 21 with the sources 221-224 (not shown) described above. In certain embodiments, the mixer 230 resembles the mixer 210 in various respects. In some embodiments, the width of the input face, the diameter of an output face 22, the length of the mixer 230, and the index of refraction of the mixer 230 are equal to any of the respective values or ranges of values set forth above with respect to certain embodiments of the mixer 210. In certain embodiments, etendue is conserved.

In some embodiments, the rippled mixer 230 comprises rippled sidewalls 15 having ridges 24 and valleys 25. In some embodiments, the ridges 24 have rounded vertices, and in other embodiments, the ridges have sharp vertices. In various arrangements, the mixer 20 comprises between about 15 and about 25, between about 35 and about 45, or between about 70 and about 90 ridges 24. In other arrangements, the mixer 230 comprises greater than about 15, greater than about 30, greater than about 70, greater than about 100, greater than about 500, greater than about 1000, or greater than about 5000 ridges 24. In some arrangements, the mixer 230 comprises about 20, about 40, or about 80 ridges 24.

In some embodiments, the ridges 24 have a constant height along the length of the mixer 230. In certain embodiments, the height is from about 5.0 microns to about 50 microns. In some embodiments the height is less than about 50 microns, less than about 40 microns, less than about 30 microns, less than about 20 microns, less than about 10 microns, or less than about 5.0 microns. In other embodiments, the height is greater than about 30 microns, greater than about 40 microns, or greater than about 50 microns. Other heights are possible. In some embodiments, the height is from about 10 to about 100 times larger than the wavelength or wavelengths for which mixing is desired.

In other embodiments, the ridges 24 have a constant angle α along the length of the mixer 230. In various arrangements, the angle α of the ridges 24 is between about 20 degrees and about 40 degrees, between about 33 degrees and about 37 degrees, between about 53 degrees and about 73 degrees, or between about 60 degrees and about 66 degrees along the length of the mixer 20. In some embodiments, the angle α is about 26 degrees, about 33 degrees, about 35 degrees, or about 63 degrees. Other angles are possible.

Figure 17F:
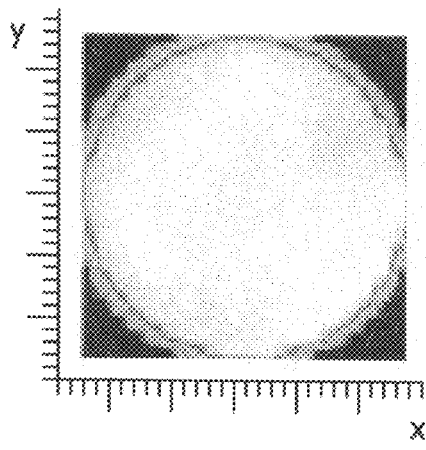
Figure 17G:
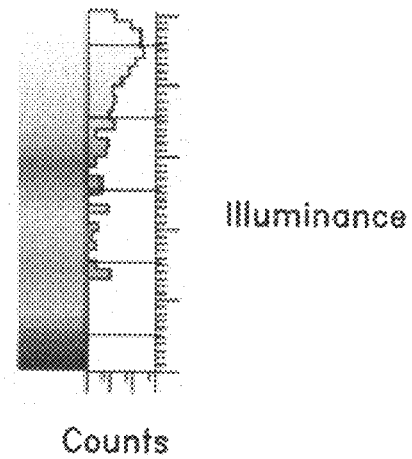
FIG. 17G is a histogram of the illuminance values displayed in the plot of FIG. 17F.

In some respects, the plots shown in FIGS. 17F and 17G are similar to those described above with respect to FIGS. 17C and 17D, respectively. The plots illustrate the illuminance distribution at the output face 22 of the rippled mixer 230 when only one of the sources 221-224 is illuminated. FIGS. 17F and 17G represent plots obtained from one embodiment of the mixer 230 comprising an input face 21 having a width of about 2.1 millimeters, an output face 22 having a diameter of about 4.7 millimeters, and a length of about 15 millimeters. The mixer 230 comprises 80 ridges 24 around its perimeter that run along the length of the mixer 230 and have a constant height of about 0.077 millimeters. The angle α of the ridges 24 varies along the length of the mixer 230. The mixer 230 comprises a solid material having an index of refraction of about 1.5. The embodiment just described is illustrative and should not be interpreted as limiting. Other configurations are possible. In certain embodiments, the angle α of the ridges 24 is constant along the length of the mixer 230 and the height of the ridges 24 varies along the length of the mixer 230.

As shown in FIG. 17F, the illuminance distribution at the output face of the mixer 230 is highly uniform. Similarly, FIG. 17G shows a concentrated range of illuminance values, which also indicates a high degree of uniformity.

In certain embodiments, each of the sources 221-224 produces similar results when separately illuminated. Accordingly, in some embodiments, the mixer 230 produces highly uniform white light when all of the sources 221-224 are illuminated simultaneously. Advantageously, the circular output face 22 can produce a highly uniform circular beam that can be used in applications such as illuminating a circular bundle of optical fibers. Additional applications include flashlights and other portable lights, spot lights, and projection systems with circular pupils. Other applications are also possible.

In certain embodiments, the mixer 230 has many advantages over the smooth mixer 210. In some instances, the smooth mixer 210 is capable of producing uniform white light, but only when it is relatively long. The mixer 230 is effective at shorter lengths. Accordingly, the mixer 230 can comprise less material than the mixer 210, and can thus be more lightweight and more compact.

In addition, in certain embodiments, the mixer 230 is relatively insensitive to alignment of the light source 10 with the input face 21, which permits more robust performance of the mixer 230. For example, the mixer 230 can be easier to manufacture and have greater longevity since it will work well even if the sources 221-224 are moved out of alignment due to manufacturing constraints, manufacturing defects, user error, or other factors. Furthermore, some arrangements are configured such that fewer than four LEDs are illuminated to produce white light. Accordingly, one or more of the LEDs can serve as a backup in case one of the other LEDs fails. In some embodiments, more than four LEDs are used, and in further embodiments, some of the LEDs serve as dedicated backups. In still other embodiments, the mixer 230 comprises four or more LEDs, with one or more of the LEDs configured to produce wavelengths in the visible spectrum and one or more LEDs configured to produce other wavelengths, such as infrared or ultraviolet. In certain of such embodiments, a plurality of the LEDs produce white light, and one or more of the remaining LEDs produce a pattern imperceptible to the unaided human eye. In some embodiments a phosphor is used to convert the invisible light another wavelength such as a visible wavelength. In other embodiments, the light from the invisible light emitter may be infrared or ultraviolet and may be detected with an IR or UV detector. In certain embodiments, the one or more of the LEDs are pulsed. In some embodiments, the LEDs are pulsed simultaneously, and can be used in such applications as emergency vehicle lights or a camera flash. In some embodiments, the pulse rates vary among the LEDs.

In addition, insensitivity to light source alignment permits certain embodiments of the mixer 230 to be used effectively with various light source arrangements and coupling methods. As discussed above, in some embodiments the mixer 230 comprises a planar RGB LED array that is positioned adjacent to the input face 21 and that completely fills the area thereof. In various other embodiments, the array covers a smaller area than the input face 21 or comprises fewer LEDs. In certain embodiments, underfilling the input face 21 has little effect on the uniformity of the illuminance distribution at the output face 22 of the mixer 230. In still other embodiments, light sources other than LEDs are coupled with the input face 21. In some arrangements, the light source 10 is coupled with the input face 21 via a reflector, such as the reflector 12 described above. Any other suitable method or device can be used to couple the light source 10 with the mixer 230.

In certain embodiments, the mixer 230 provides substantially uniform distributions when the light source 10 is centered with respect to the input face 21. In other embodiments, the mixer 230 comprises ridges 24 with relatively large angles α, and can achieve comparable levels of uniformity as arrangements wherein the light source 10 is centered. Accordingly, in some embodiments, ridges 24 having larger angles α can be used to compensate for an off-centered light source.

FIG. 18A schematically illustrates one embodiment of an angle-to-area converting mixer 240 comprising sidewalls 15 having ridges 24 and valleys 25. The mixer 240 resembles the mixer 230 shown in FIG. 17E in many respects, but can differ in manners such as those now described. In certain embodiments, the mixer 240 comprises a rectangular input face 21. The mixer 210 includes a central region between the input face 21 and the output face 22 that transforms from a rectangular cross-section toward the input face to a circular cross-section toward the output face. The area of the cross-sections also increase from the input face 21 through the central region to the output face 22. In the embodiment shown in FIG. 17E, the shape of the cross-section midway between the input face 21 and the output face 22 includes portions of the circular cross-section and portions of the rectangular cross-section. Cross-sections closer to the input face include more of the rectangular cross-section portions and cross-sections closer to the output face include more of the circular cross-section portions.

In certain embodiments, the width of the input face 21, as measured along the x axis (defined in FIG. 18A) is about 4.3 millimeters. In various embodiments, the height of the input face 21, as measured along the y axis (defined in FIG. 18A) is about 1.0 millimeters. In some embodiments, the ridges 24 have a height of 0.012 millimeters to 0.028 millimeters. Other configurations are possible.

As schematically illustrated in FIG. 18B, the mixer 240 can be coupled with an RGB LED array having four sources 221-224. In the illustrated embodiment, the sources 221-224 are aligned in a single column along the input face 21. Accordingly, in some embodiments, the plurality of LEDs are arranged in a linear array. In various other embodiments, the array comprises more or fewer LEDs, and can be arranged in multiple columns and rows.

In some embodiments, the mixer 240 comprises a solid, substantially transmissive material having an index of about 1.5. The mixer 240 has a length of about 15 millimeters, an output face 22 having a diameter of about 4.7 millimeters, and an input face 21 having a width of about 1.0 millimeter and a height of about 4.2 millimeters. The mixer 240 comprises 80 ridges 24 along the full length thereof, each having a constant height of about 0.024 millimeters. When the sources 221-224 are all illuminated, the mixer 240 produces white light that is superior to that produced by a mixer without rippled sidewalls of comparable composition and dimensions.

As noted above, numerous configurations are possible for the ridges 24 and the valleys 25. Accordingly, the configurations discussed above are nonexclusive. The various ridge and valley configurations, including those described elsewhere herein, as well as others yet to be devised, can be incorporated in these and other embodiments.

Figure 19A:
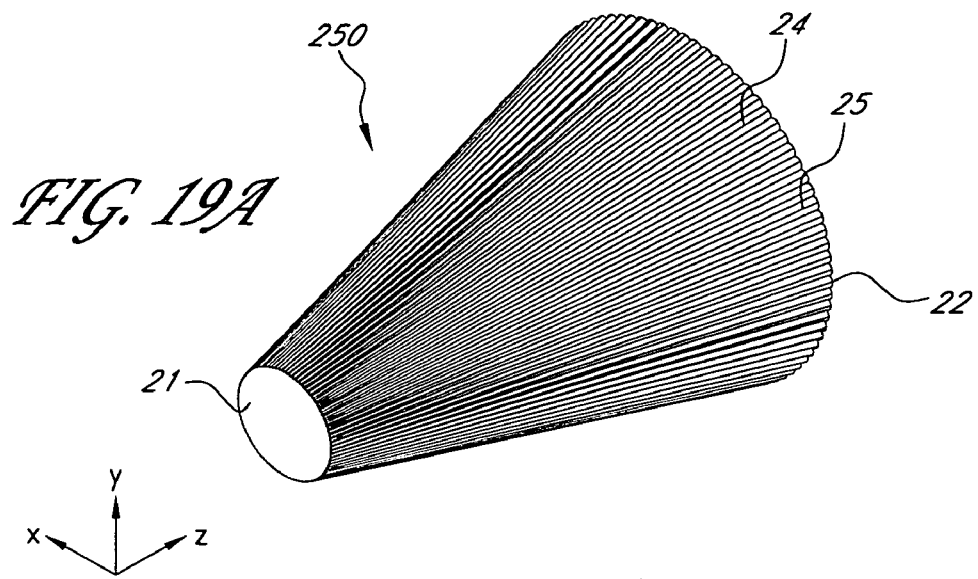
FIG. 19A is a perspective view of one embodiment of a rippled angle-to-area converting mixer having a circular input face and a circular output face and comprising a rippled sidewall.

FIG. 19A schematically illustrates one embodiment of a rippled angle-to-area converting mixer 250 comprising a circular input face 21 and a circular output face 22. In the illustrated embodiment, the mixer 250 comprises ridges 24 and valleys 25 that have a constant height and extend along the full length of the mixer. The mixer is conical in shape, and includes a central region between the input face 21 and the output face 22. Cross-sections through the central region are also circular. The cross-sections increase in size (e.g., area, diameter, etc.) from the input face 21 to the output face 22.

In some embodiments, the input face 21 of the mixer 250 has a diameter of about 3.0 millimeters, the output face 22 has a diameter of about 6.0 millimeters, and the mixer 250 has a length of about 18.0 millimeters. In some embodiments, the ridges 24 and the valleys 25 vary in height and/or width along the length of the mixer 250.

Figure 19B:
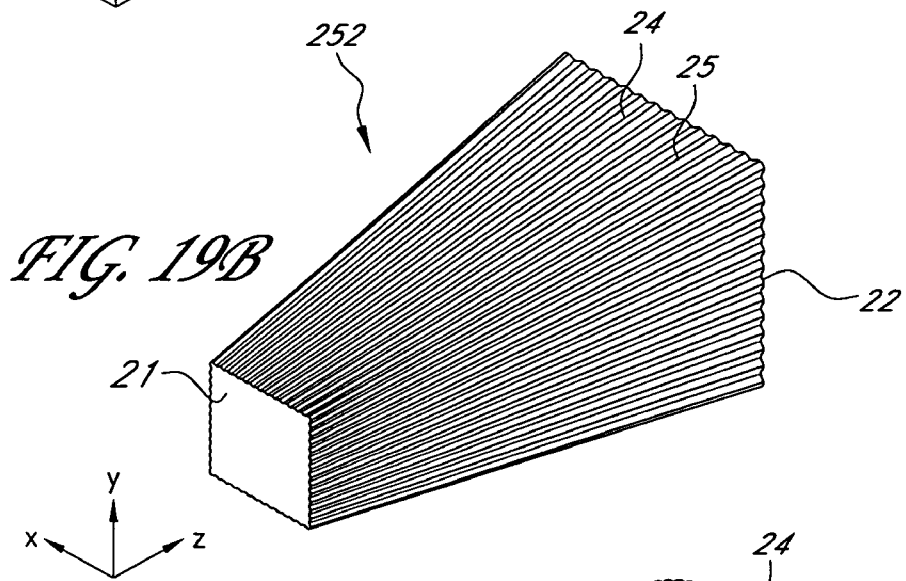
FIG. 19B is a perspective view of one embodiment of a rippled angle-to-area converting mixer having a square input face and a square output face and rippled sidewalls.

FIG. 19B schematically illustrates one embodiment of a rippled angle-to-area converting mixer 252 comprising a square input face 21 and a square output face 22. In the illustrated embodiment, mixer 210 includes a central region between the input face 21 and the output face 22. Cross-sections through the central region are also square. The cross-sections increase in size (e.g., area, width, etc.) from the input face 21 to the output face 22. The circular input face 21 of the mixer 250 has a diameter that is approximately equal to the width of the square input face 21 of the mixer 252, and the circular output face 22 of the mixer 250 has a diameter that is approximately equal to the diagonal measurement of the square output face 22 of the mixer 252. The mixer 252 comprises ridges 24 and valleys 25 that have a constant angle α and extend along the full length of the mixer.

In some embodiments, the input face 21 of the mixer 252 has a width of about 3.0 millimeters, the output face 22 has a width of about 4.2 millimeters, and the mixer 252 has a length of about 18.0 millimeters. In some embodiments, the ridges 24 and the valleys 25 vary in height and/or width along the length of the mixer 252.

Figure 19C:
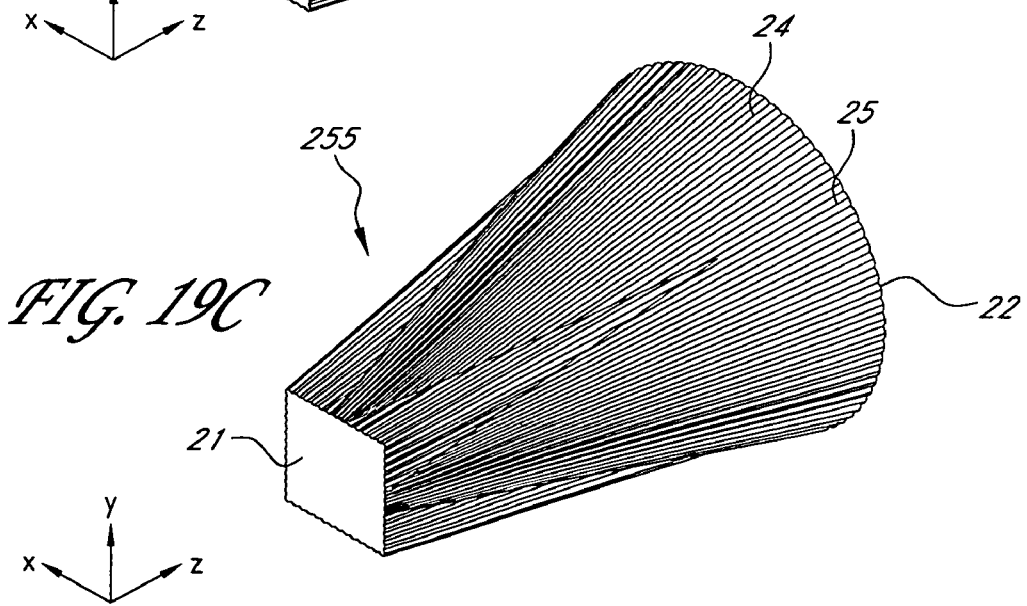
FIG. 19C is a perspective view of one embodiment of a composite angle-to-area converting mixer having a square input face, a circular output face, and rippled sidewalls, and that is formed by combining portions of the rippled mixers of FIGS. 19A and 19B.

FIG. 19C schematically illustrates one embodiment of a composite rippled mixer 255 that results when portions of the illustrated embodiments of the mixer 250 and the mixer 252 are combined. The composite mixer 255 comprises a square input face 21 that is identical to the input face 22 of the mixer 252, and comprises a circular output face 22 that is identical to the output face 22 of the mixer 250. The mixer 210 includes a central region between the input face 21 and the output face 22 that transforms from a square cross-section toward the input face to a circular cross-section toward the output face. The area of the cross-sections also increase from the input face 21 through the central region to the output face 22. In the embodiment shown in FIG. 19C, the shape of the cross-section midway between the input face 21 and the output face 22 includes portions of the square cross-section and portions of the circular cross-section. Cross-sections closer to the input face include more of the square cross-section portions and cross-sections closer to the output face include more of the circular cross-section portions. The mixer 255 also comprises ridges 24 and valleys 25 that represent a combination of portions of the respective ridges 24 and valleys 25 of the constituent mixers 250, 252.

In some embodiments, each constituent mixer 250, 252 comprises the same number of ridges 24 and valleys 25. Accordingly, in some embodiments, the ridges 24 and the valleys 25 of the composite mixer 255 are continuous and extend along the full length of the mixer. In some embodiments, the height of the ridges 24 and the valleys 25 of the composite mixer 255 are constant along the length of the mixer, and in other embodiments, the height changes along the length of the mixer. Similarly, the width of the ridges 24 and the valleys 25 can also remain constant or change along the length of the mixer 255.

In other embodiments, each constituent mixer 250, 252 comprises a different number of ridges 24 and valleys 25. Accordingly, the composite mixer 255 can comprise a different number of ridges at the input face 21 and at the output face 22. In certain of such embodiments, neither set of ridges 24 and valleys 25 from the constituent mixers 250, 252 extends along the full length of the mixer. Consequently, in some instances, the height of the ridges 24 and of the valleys 25 of the composite mixer 255 changes along the length of the mixer. Similarly, the width of the ridges 24 and the valleys 25 can also change along the length of the mixer.

In certain embodiments, such as the embodiment illustrated in FIG. 19C, Boolean operations can be used to combine portions of the constituent mixers 250, 252 into the composite mixer 255. Other operations can also be used to combine portions of the constituent mixers 255. In some embodiments, portions of more than two constituent mixers 250, 252 are combined to form the composite mixer 255.

Figure 20A:
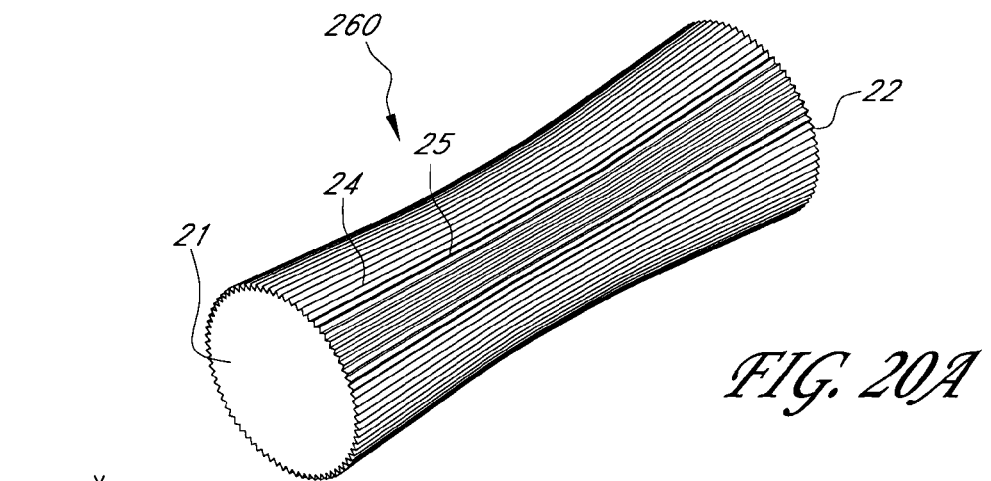
FIG. 20A is a perspective view of one embodiment of a rippled mixer having circular input and output faces and a narrow region therebetween.

FIG. 20A schematically illustrates one embodiment of a rippled mixer 260 comprising ridges 24 and valleys 25. The mixer 260 resembles the mixer 120 described above with respect to FIGS. 3 and 4, except that the mixer 260 narrows toward the center thereof. A circular input face 21 and a circular output face 22 of the mixer 20 are substantially equally sized.

Figure 20B:
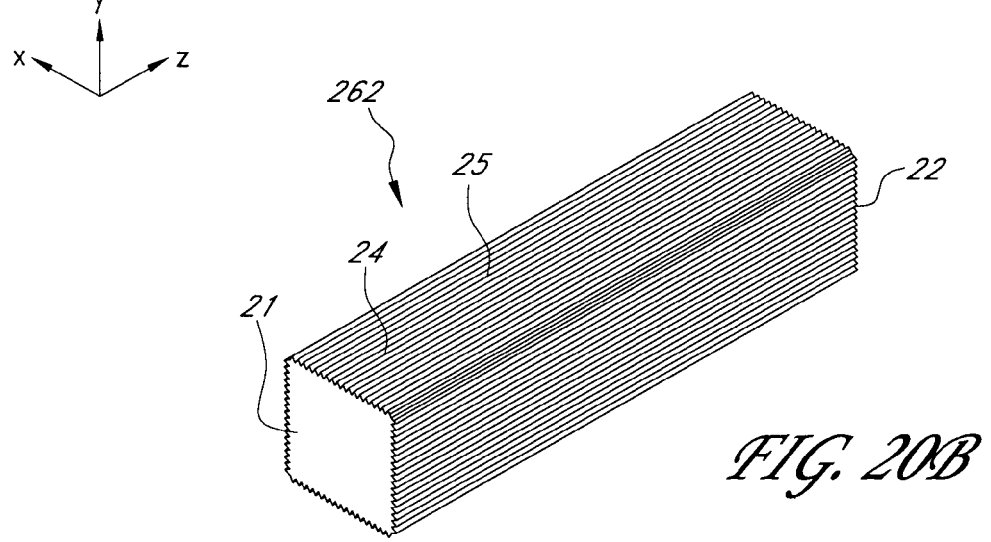
FIG. 20B is a perspective view of one embodiment of a rippled mixer having square input and output faces.

FIG. 20B schematically illustrates one embodiment of a rippled mixer 162 comprising ridges 24 and valleys 25. The mixer 262 resembles the square mixers 150, 170 described above in some respects. In certain embodiments, square input face 21 and a square output face 22 are substantially equally sized, and have a diagonal that is equal to the diameter of the circular input face 21 and the circular output face 22 of the mixer 260.

Figure 20C:
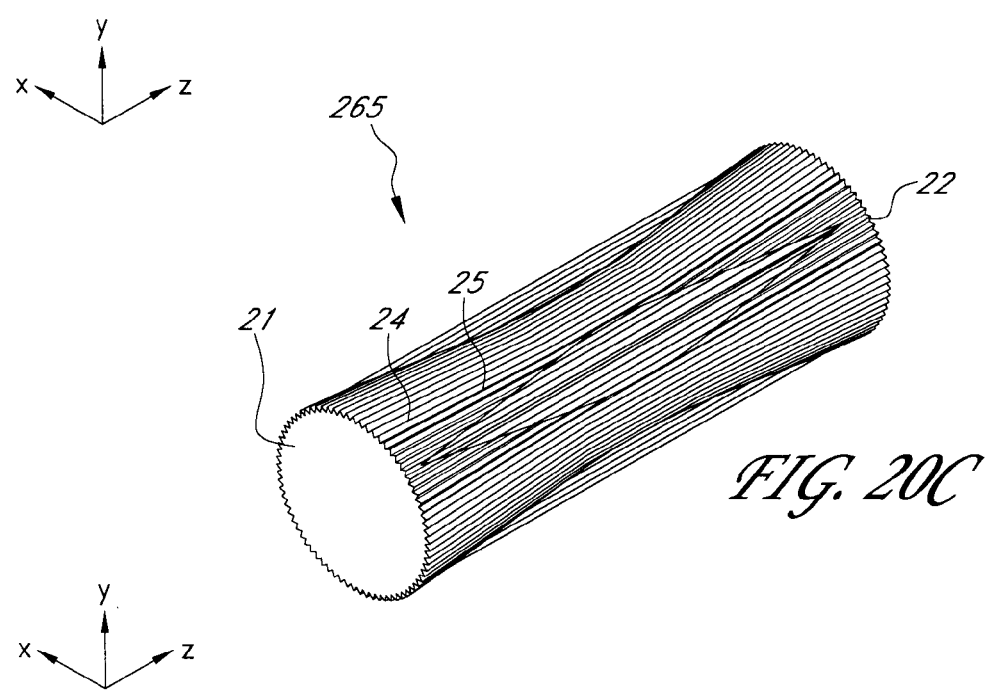
FIG. 20C is a perspective view of one embodiment of a rippled mixer that is formed by combining the rippled mixers of FIGS. 20A and 20B.

FIG. 20C schematically illustrates one embodiment of a composite rippled mixer 265 that results when portions of the mixer 260 and of the mixer 262 are combined. The composite mixer 265 comprises a circular input face 21 and a circular output face 22 that are identical to those of the mixer 260. In the embodiment shown in FIG. 20C, the shape of the cross-section midway between the input face 21 and the output face 22 includes portions of the square cross-section and portions of the circular cross-section. For example, the four corners of the square cross-section of the mixer shown in FIG. 20B are included midway between the input and output faces 21, 22. Also at the midway location are curved side portions corresponding to portions of the narrowed circular cross-section of the mixer shown in FIG. 20A. In the embodiment shown in FIG. 20C, cross-sections closer to the input face and output faces include more of the circular cross-section portions and less of the square portions. The mixer 265 comprises ridges 24 and valleys 25 that represent the combination of portions of the respective ridges 24 and valleys 25 of the constituent mixers 260, 262. In the illustrated embodiment, portions of the constituent mixers 260, 262 are combined via Boolean operations. In some embodiments, the constituent mixers 260, 262 are combined via the "union" Boolean operation, such as when the composite mixer 265 comprises the larger profile of the constituent mixers 260, 262 for each cross section along the length of the mixer 265. In other embodiments, the constituent mixers 260, 262 are combined via the "intersection" Boolean operation.

Figure 21A:
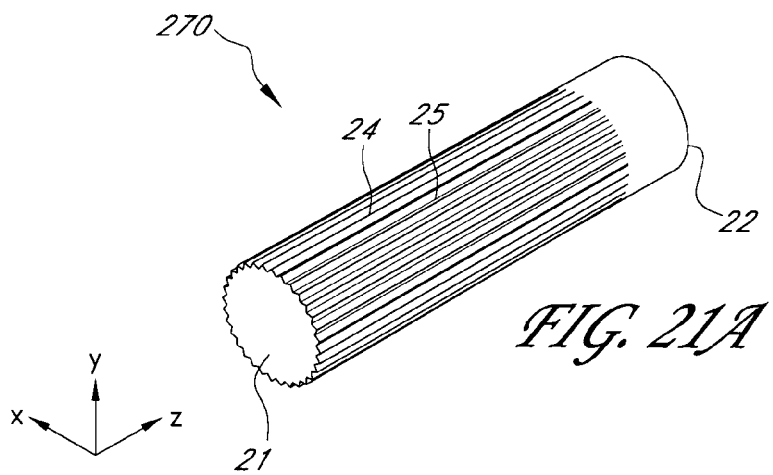
FIG. 21A is a perspective view of one embodiment of a mixer that comprises an input face, an output face, and ridges that decrease in height (as measured from the valleys) from the input face to the output face.
Figure 21B:
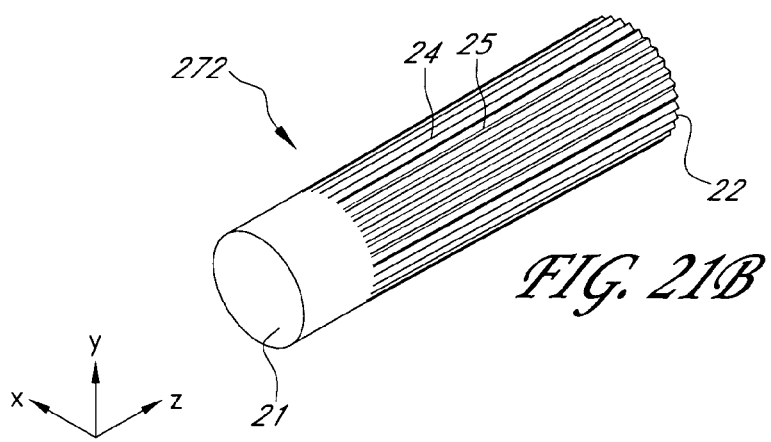
FIG. 21B is a perspective view of one embodiment of a mixer that comprises an input face, an output face, and ridges that increase in height from the input face to the output face.

FIG. 21A schematically illustrates one embodiment of a rippled mixer 270 comprising ridges 24 and valleys 25 that decrease in height from an input face 21 to an output face 22. In some embodiments, the ridges 24 and the valleys 25 do not extend along the full length of the mixer 270. For example, in some embodiments, a portion of the mixer 270 near the output face 22 is smooth. FIG. 21B schematically illustrates one embodiment of a rippled mixer 272 comprising ridges 24 and valleys 25 that increase in height from an input face 21 to an output face 22. In some embodiments, the ridges 24 and the valleys 25 do not extend along the full length of the mixer 272. For example, in some embodiments, a portion of the mixer 272 near the input face 22 is smooth. In various embodiments, the ridges 24 and the valleys 25 have an average length of between about 50 percent and about 100 percent of the length of the mixers 270, 272. In some embodiments, the ridges 24 and the valleys 25 have an average length of between about 0.1 centimeter and about 10 centimeters. Other ranges and values are possible.

In some embodiments, the increase or decrease in height of the ridges 24 and the valleys 25 of the mixers 270, 272 is linear (e.g., as viewed from a plane parallel to that of the yz plane defined in FIGS. 21A and 21B, wherein the top and/or bottom of either of the mixers 270, 272 defines a straight line). In other embodiments, the increase or decrease in the height of the ridges 24 and valleys 25 is nonlinear.

Figure 21C:
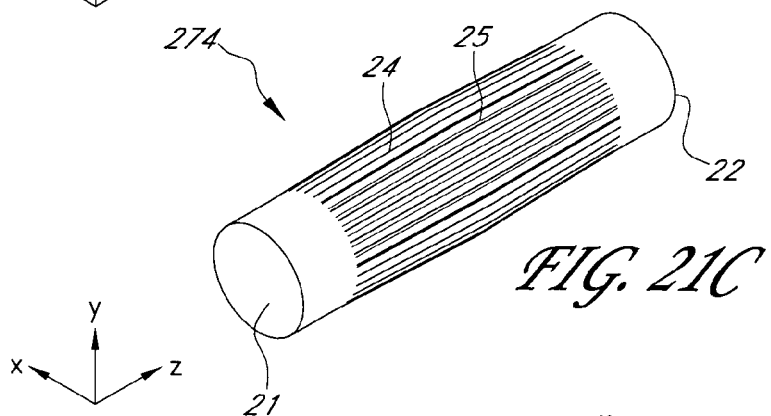
FIG. 21C is a perspective view of one embodiment of a mixer that comprises an input face, an output face, and ridges that increase in height from the input face and the output face to the center of the mixer.
Figure 21D:
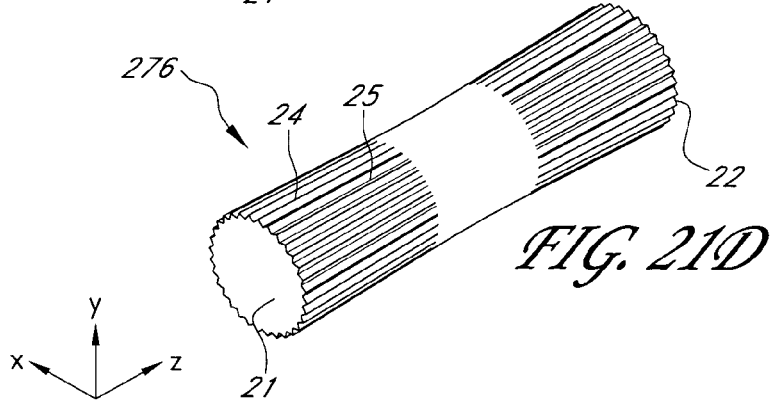
FIG. 21D is a perspective view of one embodiment of a mixer that comprises an input face, an output face, and ridges that decrease in height from the input face and the output face to the center of the mixer.

FIG. 21C schematically illustrates one embodiment of a rippled mixer 274 comprising ridges 24 and valleys 25 that increase in height from both an input face 21 and an output face 22 toward the center of the mixer 274. FIG. 21D schematically illustrates one embodiment of a rippled mixer 276 comprising ridges 24 and valleys 25 that decrease in height from both an input face 21 and an output face 22 toward the center of the mixer 276. In various other embodiments, the ridges 24 and the valleys 25 increase and decrease in height toward a portion of the mixers 274, 276 other than the center thereof. In some embodiments, the ridges 24 and the valleys 25 extend along less than the full length of the mixers 274, 276. In various embodiments, the ridges 24 and the valleys 25 have an average length of between about 50 percent and about 100 percent of the length of the mixers 274, 276. In some embodiments, the ridges 24 and the valleys 25 have an average length of between about 0.1 centimeter and about 10 centimeters. Other ranges and values are possible.

In some embodiments, the ridges 24 and the valleys 25 increase and decrease in height multiple times between the input face 21 and the output face 22. In some embodiments, the ridges 24 and the valleys 25 increase and decrease in height in a regular pattern along the length of the mixers 274, 276. For example, in some embodiments, the ridges 24 and the valleys 25 undulate along the length of the mixers 274, 276 in a sinusoidal pattern. As discussed further below, in some embodiments, ridges 24 and valleys 25 that increase and/or decrease in height along a length of a mixer can scatter light incident thereon.

In some embodiments, the width of the ridges 24 and/or the valleys 25 varies in manners similar to those just described. In other embodiments, both the width and the height of the ridges 24 and the valleys 25 vary along the length of the mixers 270, 272, 274, 276.

In certain embodiments, each of the mixers 270, 272, 274, 276 depicted in FIGS. 21A-21D provides a more uniform illuminance distribution at the output face 22 than does a smooth circular mixing rod of equal length and comprising input and output faces of like area. In some instances, such as for mixers that have a constant cross-sectional profile along the full length thereof, ridges and valleys that have constant widths and constant heights are preferred. In many instances, such mixers perform as well as or better than alternative embodiments that comprise ridges and valleys having varying widths and heights. Furthermore, mixers having constant ridge and valley widths and heights can be easier to manufacture.

In some arrangements, the height and/or width of the ridges 24 and the valleys 25 can be varied to accommodate an unbalanced or off-centered illuminance distribution at the input face 21 and/or to create a desired illuminance distribution at the output face 22. In some cases the ripples are different on different sides of the mixer. Such variation may also be useful in dealing with unbalanced or off-centered light sources and illuminance distributions. In some instances, the performance for such arrangements can be determined using illumination simulations with commercially available software tools, such as LightTools®, available from Optical Research Associates of Pasadena, Calif.

With reference again to FIGS. 7A and 7B, two cross-sectional profiles of ridges and valleys are schematically illustrated. In FIG. 7A, each faceted ridge 24 comprises two substantially planar faces 26. In FIG. 7B, the rounded ridges 24 and rounded valleys 25 have smoothed vertices. In various embodiments, mixers comprise any alteration and/or combination of faceted and rounded profiles, such as the examples now described.

FIGS. 22A-22I schematically illustrate the cross-sectional profiles of illustrative embodiments of rippled sidewalls.

FIG. 22A schematically illustrates one embodiment of a rippled sidewall 15 comprising ridges 24 that have rounded vertices and valleys 25 that have sharp vertices.

FIG. 22B schematically illustrates one embodiment of a rippled sidewall 15 comprising ridges 24 that have sharp vertices and valleys 25 that have rounded vertices.

FIG. 22C schematically illustrates one embodiment of a rippled sidewall 15 comprising ridges 24 and valleys 25 that are highly rounded, as indicated by dashed circles 280 which have a diameter that is a substantial portion of the spacing between the ridges or valleys. For example, the diameter may be between about 30 to 40% of the spacing between the ridge or valleys. The diameter may be larger than 40 or 50% in some embodiments as well.

FIG. 22D schematically illustrates one embodiment of a rippled sidewall 15 comprising ridges 24 and valleys 25 having vertices that are connected by splines. In some embodiments, the profile is sinusoidal. In other embodiments, the profile is composed of parabolic arcs with ridges 24 and valleys 25 having opposite concavities. In still other embodiments, the profile is composed of a faceted profile, such as the profile illustrated in FIG. 7A, that is smoothed into a rounded shape by using a cubic spline. Other spline profiles are also possible.

FIG. 22E schematically illustrates one embodiment of a rippled sidewall 15 comprising ridges 24 that have variable heights dH and/or variable angles α. In some embodiments, one or more of the ridges 24 comprise substantially planar sloping surfaces 26 that meet at a vertex. In other embodiments, one or more of the ridges 24 comprise rounded vertices.

FIG. 22F schematically illustrates one embodiment of a rippled sidewall 15 comprising ridges 24 that have angles α that vary irregularly or randomly.

FIG. 22G schematically illustrates one embodiment of a rippled sidewall 15 comprising ridges 24 that are separated by a large gap 282. The result is a duty cycle that is different from 50%.

FIG. 22H schematically illustrates one embodiment of a rippled sidewall 15 comprising ridges 24 and valleys 25 with sharp vertices connected by planar sloping surfaces as well as ridges 24 and valleys 25 with rounded vertices connected by curved sloping surfaces. In some embodiments, the ridges 24 and the valleys 25 with sharp vertices and the ridges 24 and the valleys 25 with rounded vertices comprise various heights dH and widths w. In the embodiment shown, different ridges 24 and valleys 25 have different heights and widths.

FIG. 22I schematically illustrates one embodiment of a rippled sidewall 15 comprising ridges 24 and valleys 25 that are rippled. In some embodiments, ridges 24 such as those illustrated in FIG. 22I comprise one periodic structure with another structure having a smaller period superposed thereon.

Figure 23A:
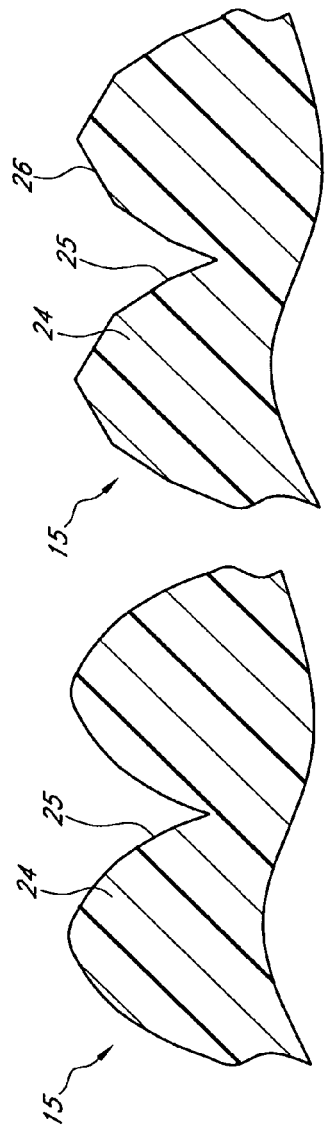
FIG. 23A is a cross-sectional view of one embodiment of a rippled sidewall comprising ridges with rounded vertices and valleys with sharp vertices and curved surfaces therebetween.

FIG. 23A schematically illustrates the cross-sectional profile of one embodiment of a rippled sidewall 15 comprising ridges 24 with rounded vertices and valleys 25 with sharp vertices and curved surfaces therebetween. As discussed above with respect to FIGS. 9, 12F, and 13C, in some instances, mixers that comprise ridges 24 with rounded vertices provide more uniform illuminance distributions than do similarly configured mixers that comprise ridges 24 with sharp vertices. However, in some instances, it is preferable to use ridges 24 with sharp or angled vertices with mixers. For example, mixers comprising angled ridges 24 can be easier to manufacture. Accordingly, in some arrangements, the ridges 24 comprise multiple facets in order to approximate a rounded profile.

Figure 23B:
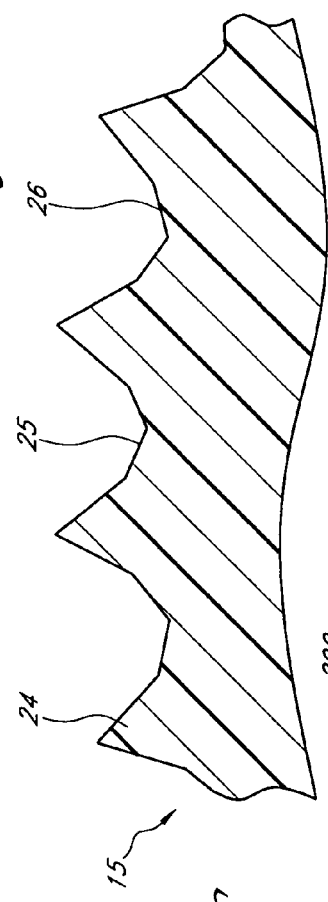
FIG. 23B is a cross-sectional view of one embodiment of a rippled sidewall comprising ridges and valleys with sharp vertices and planar faceted surfaces therebetween that approximate the rippled sidewall of FIG. 23A.

FIG. 23B schematically illustrates the cross-sectional profile of one embodiment of a rippled sidewall 15 comprising ridges 24 and valleys 25 with sharp vertices and planar surfaces therebetween that approximate the rippled sidewall 15 depicted in FIG. 23A. Because these sloping surfaces comprise a plurality of planar portions, these sloping surfaces therefore said to be faceted. Each ridge 24 and valley 25 comprises six substantially planar faces or facets 26 (three for each sloping surface), although more or fewer faces or facets could be used.

Figure 23C:
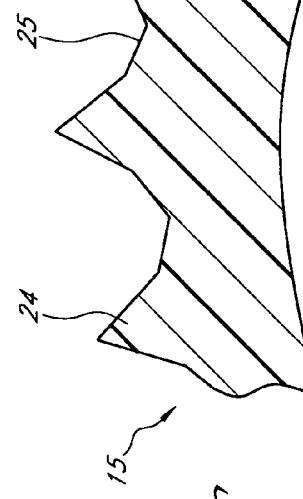
FIG. 23C is a cross-sectional view of one embodiment of a rippled sidewall comprising ridges and valleys having sharp vertices and planar faceted surfaces therebetween that approximate rounded valleys.

FIG. 23C schematically illustrates the cross-sectional profile of one embodiment of a rippled sidewall 15 comprising ridges 24 and valleys 25 having sharp vertices and faceted sloping surfaces therebetween that approximate rounded valleys. Each ridge 24 and each valley 25 comprises four substantially planar faces 26 (two on each sloping surface), although more or fewer faces could be used.

While in many instances it is desirable to have an illuminance distribution that uniformly covers the output face of a mixer, in some instances, is desirable to have a "peaked" illuminance distribution that has illuminance values that are high at the center of the output face and drop toward the edges thereof. In other instances, it is desirable to have a "dipped" illuminance distribution that has illuminance values that are low in the center of the output face and rise toward the edges thereof. In some instances, light source alignment with the mixer affects the illuminance distribution at the output face of the mixer. In certain arrangements, off-centering the light source helps to create a dipped illuminance distribution.

Rippled sidewalls can be configured to produce any one of, or any combination of, substantially uniform, substantially peaked, or substantially dipped illuminance distributions. For example, with reference again to FIGS. 9, 10E, 12F, and 13C, in some embodiments, ridges with sharp vertices having planar surfaces that define an angle α of 45 degrees produce highly non-uniform illuminance distributions that, in many instances, are peaked. This is especially true with certain circular arrangements, as illustrated by the point 144 in FIG. 9 and the plot in FIG. 10E. Accordingly, in some embodiments, rippled sidewalls comprise sharp ridges having an angle α of 45 degrees in combination with other ridge forms to control the illuminance distribution at the output face of a mixer.

Figure 24:
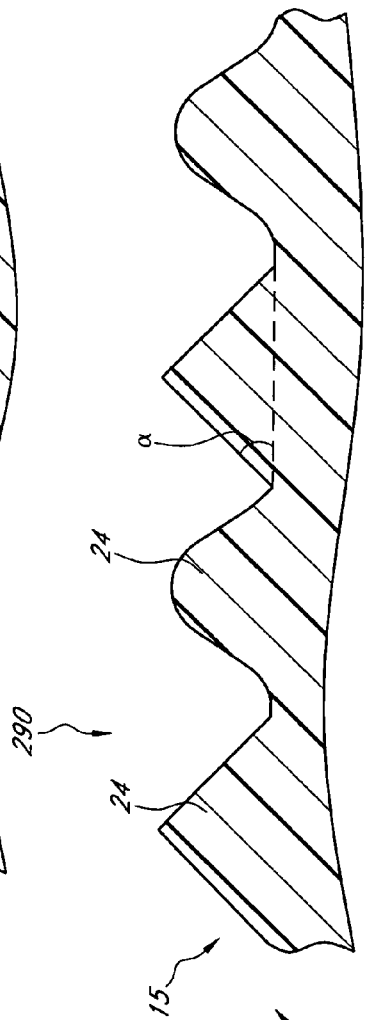
FIG. 24 is a cross-sectional view of a rippled sidewall comprising alternating rounded ridges and sharp ridges having an angle $\alpha$ of about 45 degrees.

FIG. 24 schematically illustrates a cross-sectional view of a portion of one embodiment of a mixer 290 comprising a rippled sidewall 15 having sharp ridges 24 that define an angle α of about 45 degrees and that are disposed between ridges 24 that have rounded vertices. In various embodiments, the mixer 290 produces a highly peaked or mildly peaked illuminance distribution, depending on the angle α used for the sharp ridges 24.

In certain embodiments, such as those depicted in FIGS. 3, 8A, and 13A, ridges run substantially parallel to the length of the mixer. In other embodiments, the ridges are angled with respect to the length of the mixer. For example, FIG. 25A schematically illustrates one embodiment of a mixer 300 comprising a rippled sidewall 15 having elongate ridges 24 and valleys 25 that are oriented at an angle with respect to the length of the mixer. As shown, the mixer 300 runs substantially parallel with the z axis, as defined by a dashed line in FIG. 25A, and the ridges 24 and the valleys 25 are oriented at a positive angle β with respect to the z axis. In various embodiments, the angle β is less than about 40 degrees, less than about 30 degrees, less than about 20 degrees, less than about 10 degrees, less than about 5 degrees, or less than about 3 degrees. In various other embodiments, the angle β is between about 5 degrees and about 40 degrees, between about 7.5 degrees and about 30 degrees, or between about 10 degrees and about 30 degrees. Values outside these ranges are also possible. In some embodiments, the angle β becomes smaller as the number of ridges 24 and valleys 25 increases. FIG. 25B schematically illustrates one embodiment of a mixer 305 comprising a rippled sidewall 15 having ridges 24 and valleys 25 that have a small angle β. The angled ridges 24 and valleys 25 appear to twist about the circular mixer.

FIG. 25C schematically illustrates one embodiment of a mixer 310 comprising a rippled sidewall 15 having ridges 24 and valleys 25 that are oriented at a negative angle γ with respect to the z axis, as defined by a dashed line in FIG. 25C. The absolute value of the angle γ can equal any of the values described above with respect to the angle β. FIG. 25D schematically illustrates one embodiment of a mixer 315 comprising rippled sidewall 15 having ridges 24 that have a small angle γ.

FIG. 25E schematically illustrates one embodiment of a composite mixer 320 comprising a rippled sidewall 15 having ridges 24 and valleys 25 such as those of the mixer 305 superposed on the ridges 24 and the valleys 25 of the mixer 315 (or vice versa). Accordingly, the composite mixer 320 of FIG. 25E has two sets of ridges 24 and valleys 25. In some arrangements, small values of the angles β and γ are preferred in order to avoid etendue increases. In various embodiments, the ridges 24 and the valleys 25 are oriented at angles β and γ, and the value of the angle β plus the absolute value of the angle γ is less than about 80 degrees, less than about 60 degrees, less than about 40 degrees, less than about 20 degrees, less than about 10 degrees, or less than about 6 degrees. In various other embodiments, the angle β is between about 5 degrees and about 80 degrees, between about 5 degrees and about 45 degrees, or between about 10 degrees and about 30 degrees. Additionally, in various other embodiments, the angle γ is between about 5 degrees and about 80 degrees, between about 5 degrees and about 45 degrees, or between about 10 degrees and about 30 degrees. Other values outside these ranges are possible.

Figure 26A:
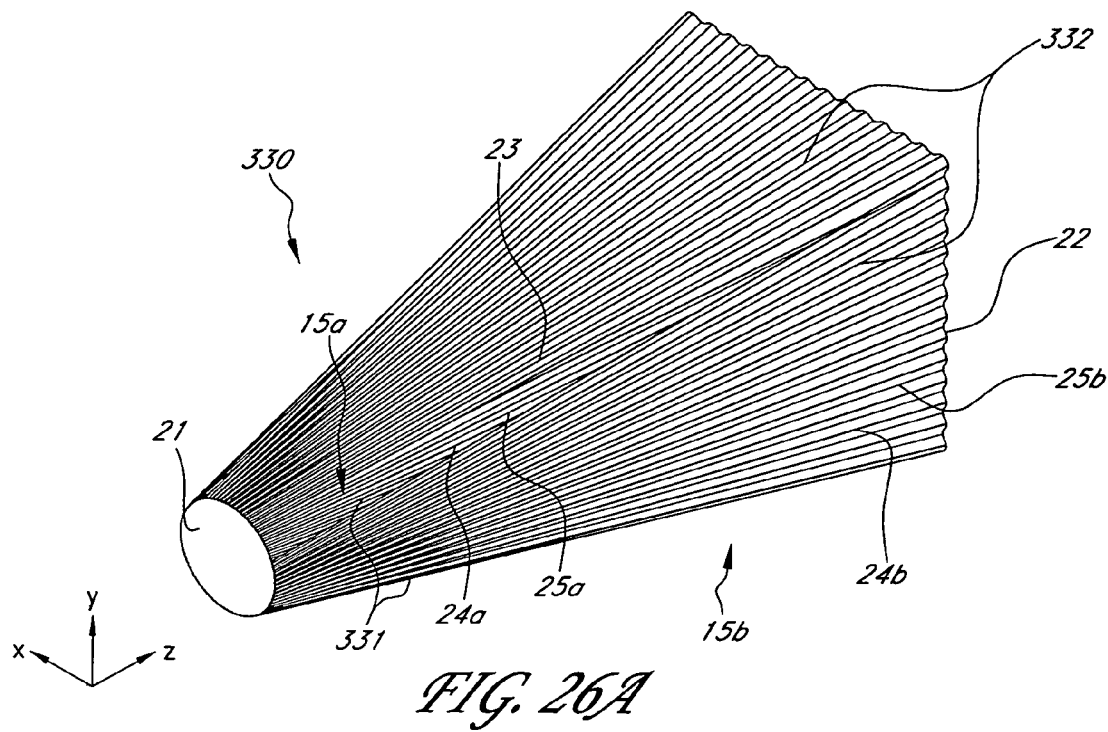
FIG. 26A is a perspective view of one embodiment of a composite rippled mixer that is formed by combining a portion of a circular angular-to-area converting mixer that has ridges and valleys that are rotated by an angle, $\beta$, with respect to the length of the circular mixer with a portion of a square angle-to-area converting mixer that has ridges and valleys that are rotated by an angle, $\gamma$, with respect to the length of the square mixer.
Figure 26B:
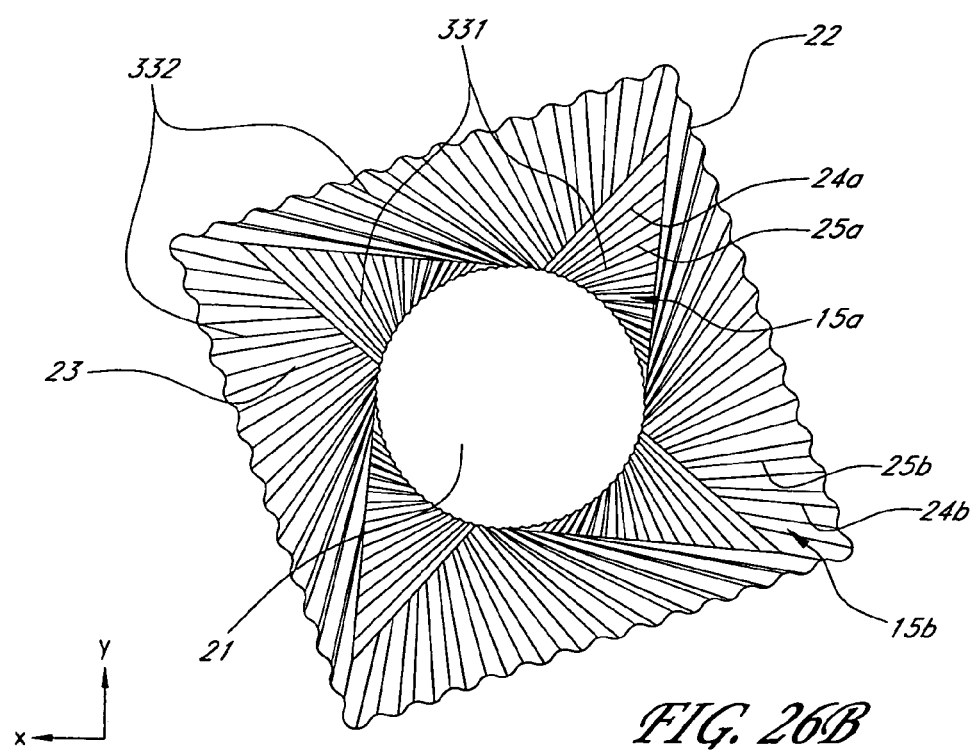
FIG. 26B is a plan view of the mixer of FIG. 26A.

FIGS. 26A and 26B schematically illustrate one embodiment of a composite mixer 330 that results from the combination of portions of two angle-to-area converting mixers. In certain embodiments, the composite mixer 330 is similar to the mixer 255 described above with respect to FIG. 19C, but varies in manners such as those now described. In some embodiments, the composite mixer 330 has a circular input face 21, a square output face 22, and a central region 23 extending therebetween. The central region 23 can comprise a first portion 331 and a second portion 332.

In certain embodiments, the circular input face 21 and the first portion 331 correspond with a constituent mixer that is a circular and angle-to-area converting, such as the mixer 250 described above with respect to FIG. 19A. However, unlike the mixer 250, the circular constituent mixer comprises a rippled sidewall 15a having ridges 24a and valleys 25a that are oriented at an angle β of 20 degrees with respect to the z axis. In some embodiments, the square output face 22 and the second portion 332 correspond with a constituent mixer that is a square and angle-to-area converting, such as the mixer 252 described above with respect to FIG. 19B. However, unlike the mixer 252, the square constituent mixer 20 comprises one or more rippled sidewalls 15b having ridges 24b and valleys 25b that are oriented at an angle γ of −20 degrees with respect to the z axis. Accordingly, in some embodiments, the composite mixer 20 comprises two sets of rippled sidewalls 15a,b with respective ridges 24a,b and valleys 25a,b that run in opposite directions along a length of the mixer. For example, the first set of ridges and valleys 24a, 25a are oriented at an angle β of 20 degrees with respect to the z axis and the second set of ridges and valleys 24b, 25b are oriented at an angle γ of −20. Other angles are possible.

In some embodiments, Boolean operations are used to combine portions of the constituent mixers into the composite mixer 330. In other embodiments, processes other than Boolean operations are used to form the composite mixer 330. In further embodiments, portions of more than two mixers can be combined into the composite mixer 330. Additionally, various embodiments of the composite mixer 330 comprise combinations of mixers that have ridges and valleys that parallel the length of the mixers, that have one or more positive angles β, and/or that have one or more negative angles γ.

Figure 27:
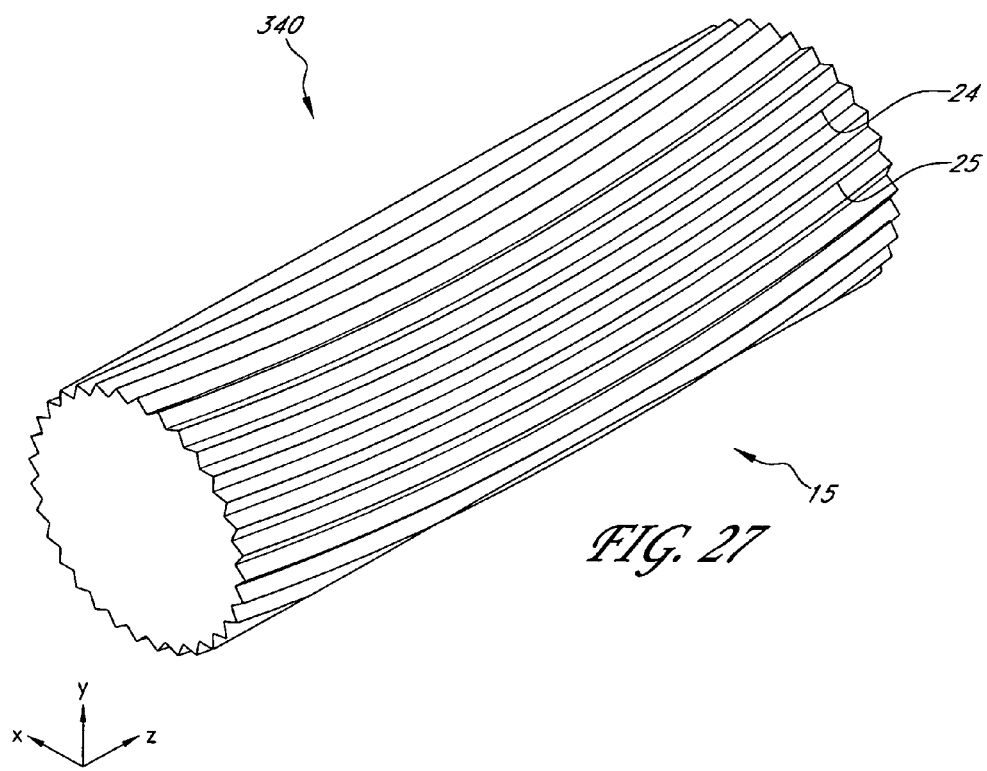
FIG. 27 is a perspective view of one embodiment of a mixer comprising ridges and valleys that curve with respect to the length of the mixer.

FIG. 27 schematically illustrates one embodiment of a mixer 340 comprising a rippled sidewall 15 having elongate ridges 24 and valleys 25 that curve with respect to the length of the mixer. Accordingly, in some embodiments, the value of the angle β and/or the angle γ changes over length of the mixer 340. In the illustrated embodiment, the ridges 24 and the valleys 25 are oriented at a positive angle β at an input face 21 of the mixer 20, and are oriented at a negative angle γ at an output face 22 of the mixer 20. The values of β and/or the angle γ decrease away from the input and output faces 21, 22 where these angles are highest. The elongate ridges 24 and valleys 25 may have different shapes, caused for example, by different changes in the values of β and/or the angle γ with respect to the length of the mixer.

Figure 28:
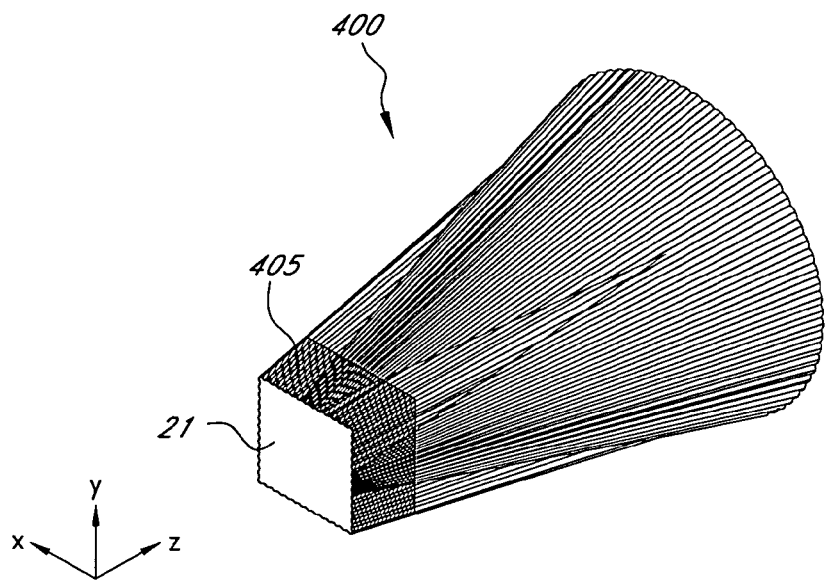
FIG. 28 is a perspective view of one embodiment of a solid mixer that comprises a reflective coating at an input end.

FIG. 28 schematically illustrates one embodiment of a rippled angle-to-area converting mixer 400 comprising a solid, optically transmissive material. The mixer 400 comprises an input face 21 with which an LED array or other light source can be coupled. In certain embodiments, the mixer 400 comprises a coating 405 at an input end thereof. The coating 405 can comprise any suitable reflective material, such as metal. In some arrangements, the coating 405 comprises a film, and in others, the coating 405 comprises paint.

In certain embodiments, the reflective coating 405 may be useful, for example, when an LED array is coupled with the mixer 400 in such a manner that reduces the amount of light that is total internally reflected at the sidewalls at the input end. For example, in some embodiments, the LED array may be situated adjacent the input face 21 such that there is no air gap therebetween, and thus no reduction of the angle of input light at an air/transmissive material interface as a result of refraction. More light rays are incident at higher angles, e.g. more normal to, the sidewalls. These lights rays are less likely to be total internally reflected. The coating 405 can be used to reflect these rays. Thus, the coating 405 can reflect light into the mixer 400 that would otherwise escape the mixer. The coating 405 can be applied to any mixer configuration.

In still other embodiments, the angle α can vary along the length so that loss of light caused by flux that does not totally internally reflect at the mixer surfaces is minimized. For example, in some embodiments, faceted ridges and/or faceted valleys characterized by an angle α of about 45 degrees near the input end of the mixer are followed by rounded ridges and/or rounded valleys characterized by an angle α of about 30 degrees over portions of the mixer where the cross-sectional area of the mixer 400 is larger (e.g., near the output end of the mixer 400).

Figure 29A:
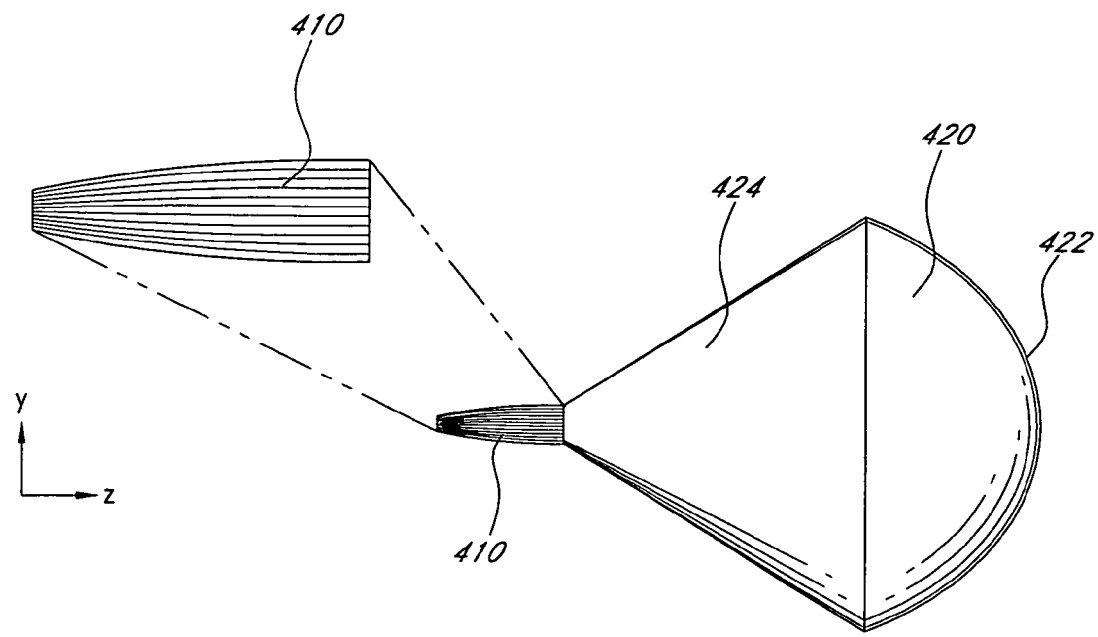
FIG. 29A is a side elevation view of one embodiment of a mixer comprising ridges and valleys coupled with one embodiment of a projection lens.

FIG. 29A schematically illustrates one embodiment of a rippled mixer 410 coupled with a projection lens 420. The mixer 410 can comprise any suitable rippled sidewall configuration such as those disclosed herein. In various embodiments, the projection lens 420 is shaped and sized to collimate light exiting the mixer 410. In certain embodiments, the light exiting the projection lens 420 forms a highly collimated, highly uniform "spot" with a sharp cutoff. In certain embodiments, the "spot" size is larger than the beam exiting the mixer 410. In other embodiments, the light is not collimated by the projection lens 420. For example, the lens 420 may focus the beam (e.g., spot lighting) or may spread the beam (e.g., flood lighting).

In some embodiments, the mixer 410 and the projection lens 420 comprise separate pieces. In other embodiments, the mixer 410 and the projection lens 420 are integrally formed of a unitary piece of material. In the shown embodiment, the mixer 410 and/or the projection lens 420 may comprise portions of substantially optically transmissive material, such as glass or plastic that are shaped to provide ribs to the mixer and a curved front surface to the projection lens. The projection lens also includes a tapered region 424 that couples to the mixer 410. In certain embodiments, the tapered region 424 comprises a rippled sidewall 15 having ridges 24 and valleys 25.

In certain embodiments, light propagates through the mixer 410, through the tapered region 424, and out a curved output face 422 of the projection lens. Certain embodiments that comprise a unitary piece of material can be particularly useful in, for example, flashlights and other portable lights, uplights, downlights, spot lights, architectural lights, or other types of lights. Some advantageous embodiments can be integrated into optical systems that comprise more than just the illuminator, such as, for example, machine vision, lithography, dental curing, fiber illuminator, or other systems. In such systems, the desired illuminance distribution may also be produced at an internal surface of the system. Other applications are also possible.

In certain embodiments, the mixer 410 is similar to the mixers 230, 240 described above. Advantageously, in some embodiments; the cross-sectional area of the mixer 410 increases along the length thereof such that the angular output of the mixer 410 matches the numerical aperture of the projection lens 420.

Figure 29B:
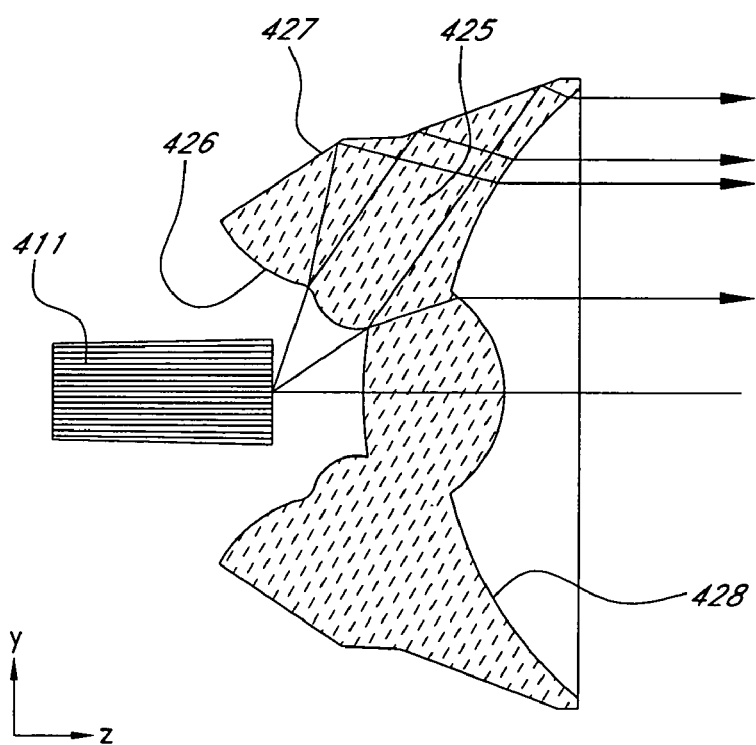
FIG. 29B is a cross-sectional view of one embodiment of a mixer comprising ridges and valleys coupled with one embodiment of a total internal reflection (TIR) collimator.

FIG. 29B schematically illustrates a cross-sectional view of one embodiment of a rippled mixer 411 coupled with a total internal reflection (TIR) collimator 425. The mixer 411 can comprise any suitable rippled sidewall configuration such as those disclosed herein. The TIR collimator 425 can comprise any suitable configuration, such as those known in the art as well as those yet to be devised. Some TIR collimators are described in U.S. Pat. Nos. 2,215,900 and 2,254,961. In certain embodiments, the TIR collimator 425 comprises an input surface 426, an outer surface 427, and an output surface 428. In some embodiments, light propagates through the mixer 411 and through the input surface 426 of the TIR collimator 425, is reflected at the outer surface 427 via total internal reflection, and propagates through the output surface 428. Some of the light propagates through the center of the TIR collimator without being totally internally reflected. In many embodiments, the light exiting the output surface 428 is collimated.

Figure 30A:
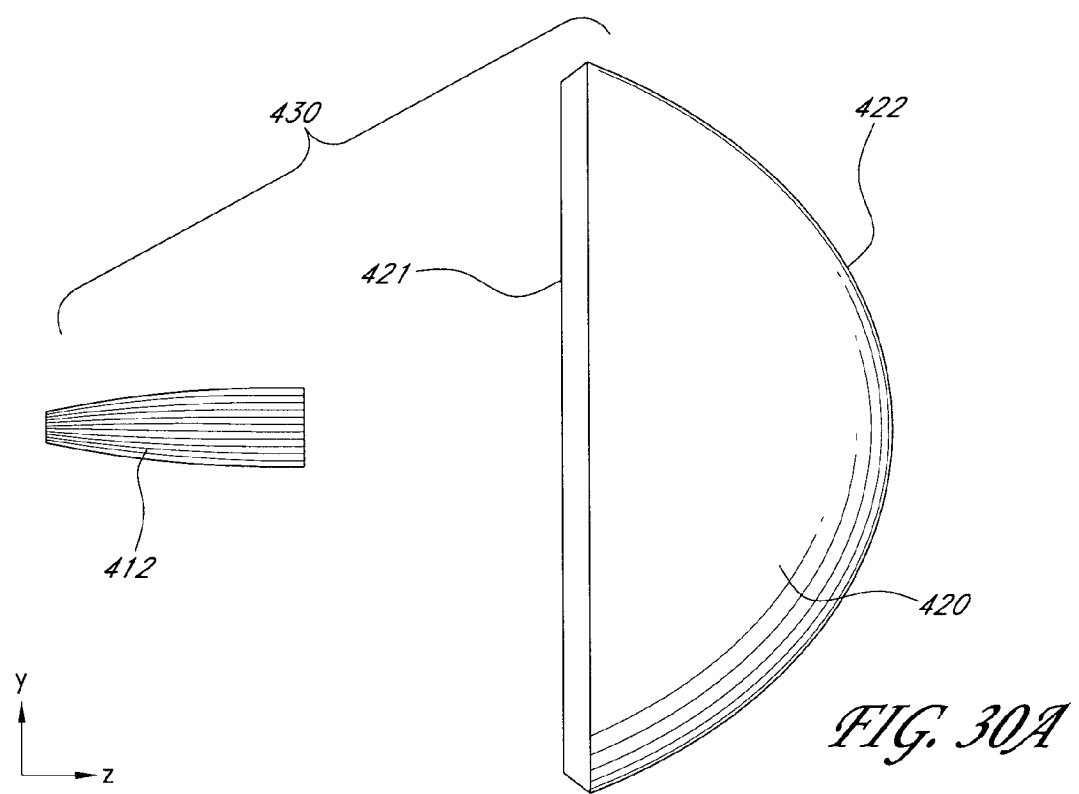
FIG. 30A is a side elevation view of one embodiment of an optical system comprising a rippled mixer and a projection lens.

FIG. 30A schematically illustrates one embodiment of a zoom system 430 comprising a rippled mixer 412 coupled with the projection lens 420. The mixer 412 can comprise any suitable configuration, such as those disclosed herein. In certain embodiments, the projection lens 420 comprises an input face 421 and an output face 422. In some arrangements, the projection lens 420 is moved along the z axis, as defined in FIG. 30A, in order to alter the beam pattern exiting the output face 422. In other embodiments, the mixer 412 is moved along the z axis to achieve the same effect. The result may be to increase or decrease the size of the beam, for example, from "spot" mode, wherein the beam pattern is highly collimated, to "flood" mode, wherein the beam pattern covers a larger area. In certain embodiments, the "spot" size of the light exiting the projection lens 420 is larger than an output face of the mixer 412 or larger than a beam exiting the output face of the mixer 412. In some embodiments, the projection lens 420 and/or the mixer 412 is moved via a translator, such as a manually operated translator, a stepper motor, or a piezo translation device.

Figure 30B:
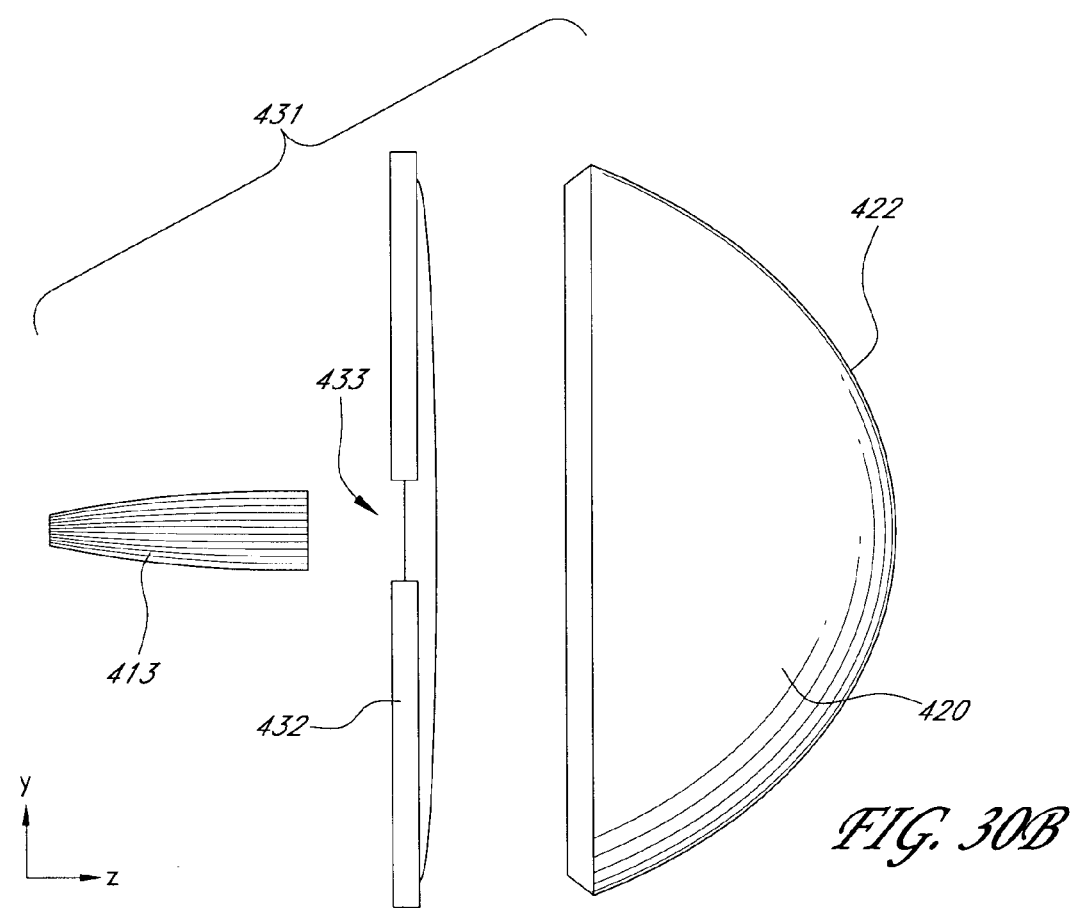
FIG. 30B is a side elevation view of one embodiment of a zoom system formed from the optical system shown in FIG. 30A and a diffuser having a hole therein between the rippled mixer and the projection lens.

FIG. 30B schematically illustrates one embodiment of a zoom system 431 that is similar to the system 430 in some respects. In certain embodiments, the zoom system 431 comprises a rippled mixer 413, the projection lens 420, and a diffuser 432. The mixer 413 can comprise any suitable configuration, such as those disclosed herein. In some embodiments, the diffuser 432 has a hole 433 therethrough and is positioned between the mixer 413 and the projection lens 420. In some arrangements, the diffuser 432 is moved along the z axis, as defined in FIG. 30B, in order to alter the beam pattern exiting the output face 422 of the projection lens 420. The diffuser 432 can be moved via a translator. In certain embodiments, the hole 433 causes the beam pattern to be highly collimated, and in other embodiments, the diffuser 435 causes the beam pattern to "flood" a larger area. In certain embodiments, the "spot" size of the light exiting the projection lens 420 is larger than an output face of the mixer 413 or larger than a beam exiting the output face of the mixer 413. Other variations of the zoom system 431 are possible. See, e.g., U.S. patent application Ser. No. 11/210,275, entitled "Lighting Systems for Producing Different Beam Patterns" filed Aug. 23, 2005 and published as U.S. Patent Application Publication No. 2006/0039160 on Feb. 23, 2006, the entire contents of which are hereby incorporated by reference herein and made a part of this specification.

Figure 30C:
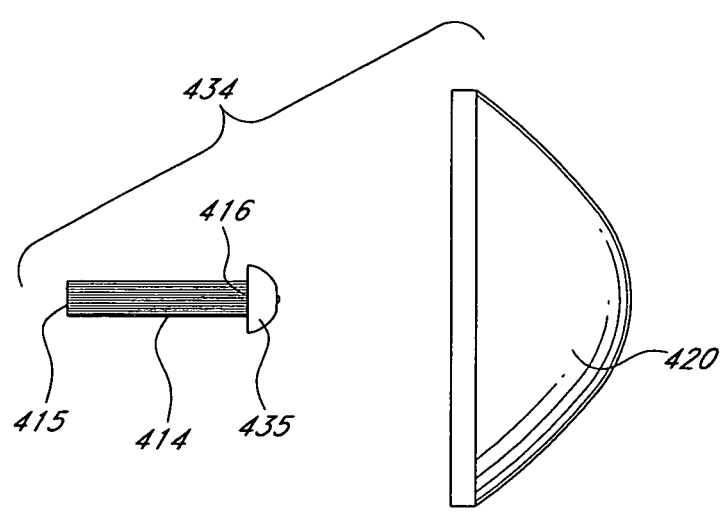
FIG. 30C is a side elevation view of one embodiment of an optical system comprising a rippled mixer, an output lens, and a projection lens.

FIG. 30C schematically illustrates one embodiment of a zoom system 434 that is similar to the system 430 in some respects. In certain embodiments, the zoom system 434 comprises a rippled mixer 414, an output lens 435, and the projection lens 420. The mixer 414 can comprise any suitable configuration, such as those disclosed herein, and can comprise an input face 415 and an output face 416. In some embodiments, the output lens 435 is a hemispherical lens. Other lens configurations are also possible. In some embodiments, the projection lens 420 is a Fresnel lens, an aspherical condensing lens, a catadioptric collimator (such as, for example, the TIR collimator 425), or any other suitable device, such as, for example, one or more of the devices disclosed in U.S. patent application Ser. No. 10/658,613, entitled "Internally Reflective Ellipsoidal Collector with Projection Lens," filed Sep. 8, 2003 and issued as U.S. Pat. No. 6,819,505 on Nov. 16, 2004, the entire contents of which are hereby incorporated by reference herein and made a part of this specification.

In certain embodiments, the output lens 435 is in proximity to the output face 416 of the mixer 414. In some embodiments, a surface of the output lens 435 is adjacent the output face 416. In many embodiments, the projection lens 420 is moved along the z axis, as defined in FIG. 30C, in order to alter the beam pattern exiting the output face 422 of the projection lens 420. In other embodiments, the mixer 414 and the output lens 435 are moved along the z axis to achieve the same effect. The result may be to increase or decrease the size of the beam, for example, from "spot" mode to "flood" mode.

Figure 30D:
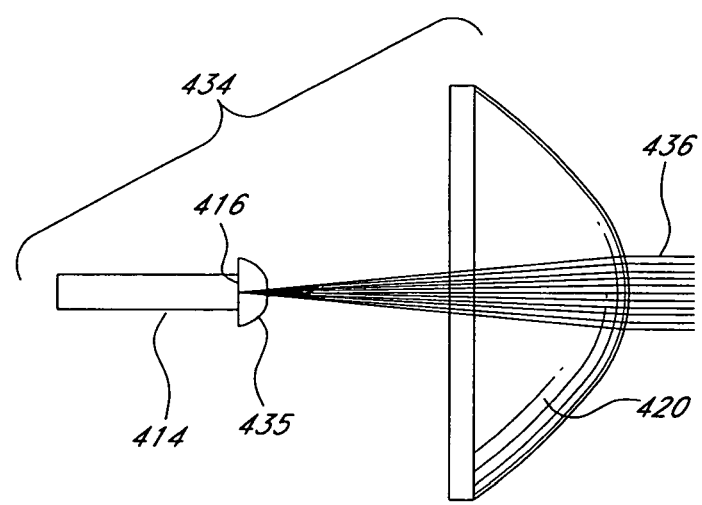
FIG. 30D is a side elevation view of one embodiment of the optical system of FIG. 30C with the projection lens spaced away from the output lens to create a "spot" beam pattern.
Figure 30E:
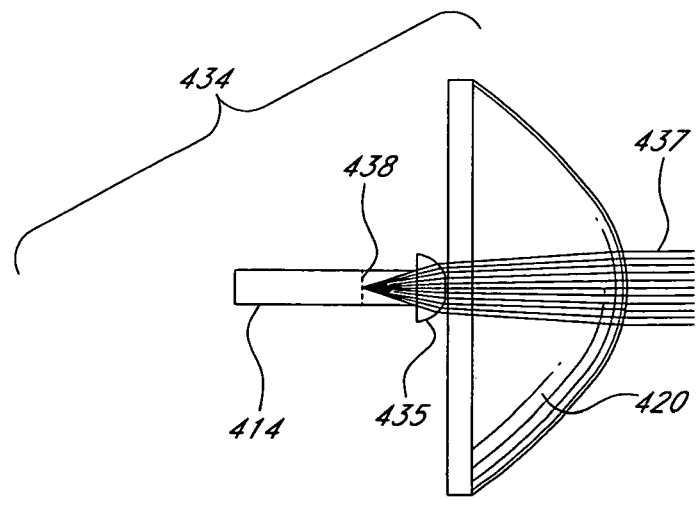
FIG. 30E is a side elevation view of one embodiment of the optical system of FIG. 30C with the projection lens in proximity to the output lens to create a "flood" beam pattern.

FIG. 30D is a cross-sectional view schematically illustrating one embodiment of the zoom system 434 wherein the projection lens 420 is spaced away from the output lens 435. A series of lines 436 is provided to illustrate different paths that light could take, demonstrating that, in the shown embodiment, the output face 416 of the mixer 414 is imaged a distance from the output lens (for example, much longer than the focal length of the lens) by the zoom system 434. In certain embodiments, the illustrated orientation of the projection lens 420 with respect to the mixer 414 and the output lens 435 results in a highly collimated, highly uniform "spot" with a sharp cutoff FIG. 30E is a cross-sectional view schematically illustrating one embodiment of the zoom system 434 wherein the projection lens 420 is in close proximity to the output lens 435. A series of lines 437 is provided to illustrate different paths that light could take, demonstrating that, in the shown embodiment, the zoom system 434 produces a blurred image of a plane 438 within the mixer 414. In certain embodiments, the illustrated orientation of the projection lens 420 with respect to the mixer 414 and the output lens 435 results in a larger beam pattern than that resulting from the orientation shown in FIG. 30D. In some embodiments, the length of the mixer is such that the mixer 414 provides a substantially uniform illuminance distribution at the plane 438. Accordingly, in some embodiments, an increase in the length of the mixer 414 permits the projection lens 420 to be positioned near the mixer 414 and still produce a substantially uniform beam pattern. In certain embodiments, projection optics (e.g., output lenses and projection lenses) having longer back focal lengths provide larger changes in the size of the beam pattern than do projection optics having shorter back focal lengths, as compared over the same range of movement of the optics along the z axis.

In many embodiments, the system 434 has advantages over systems that do not comprise both an output lens and a projection lens, such as the system 430. In some embodiments, the output lens 435 reduces Fresnel losses of light exiting the mixer 414. In further embodiments, the output lens 435 reduces the size of the system 434, such as by making the system shorter as measured along the z-axis. In certain embodiments, the output lens 435 reduces the angle of light exiting the output face 416 of the mixer 414. Accordingly, in some embodiments, light can be introduced to the mixer 414 at higher angles than is desirable for systems lacking an output lens, which can result in better mixing of the light. Additionally, in some embodiments, the output lens 435 increases the apparent size of the mixing rod. In certain embodiments, the output lens 435 is hemispherical and increases the apparent size by a factor about equal to the index of refraction of the output lens 435.

Figure 31:
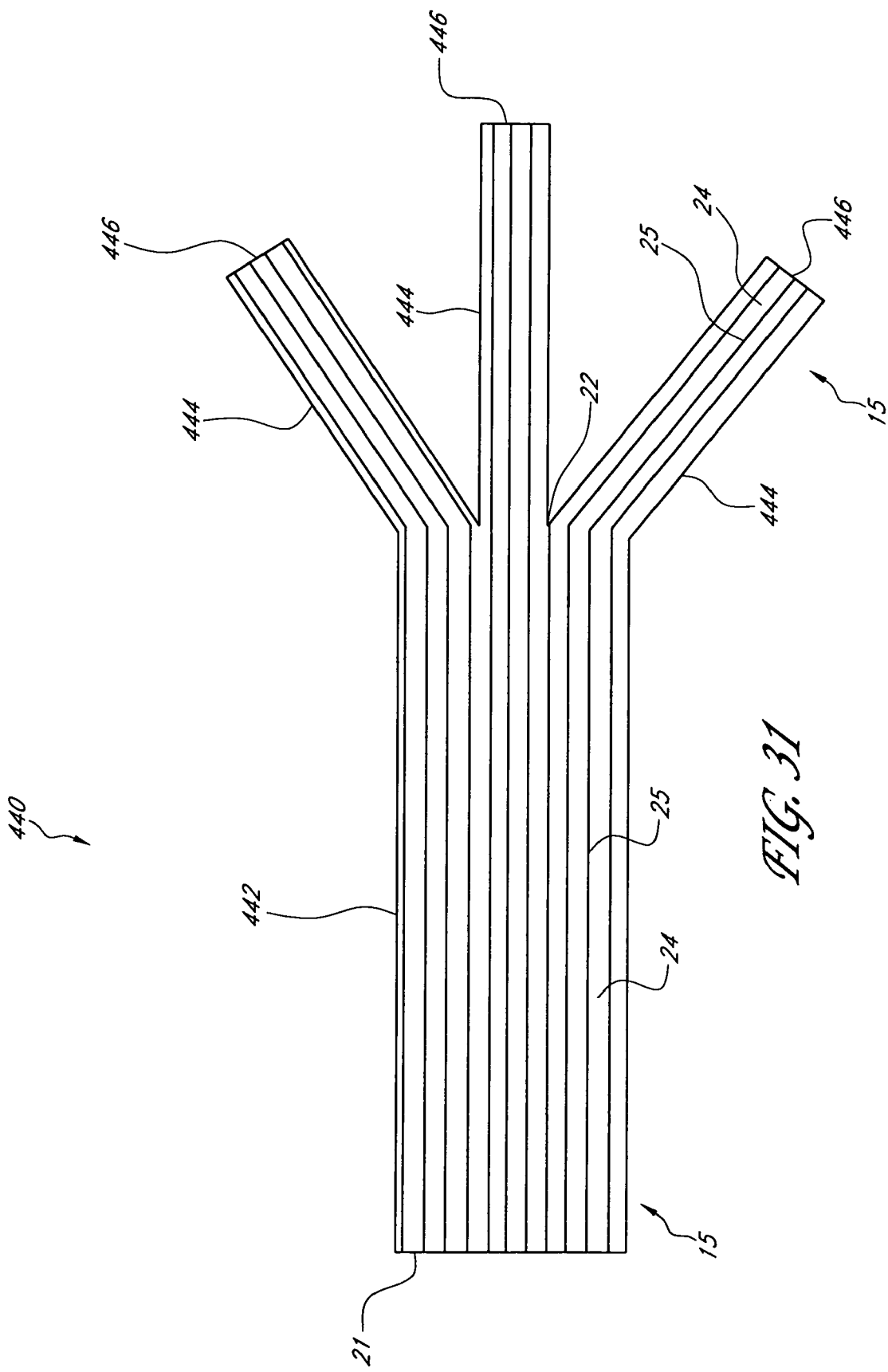
FIG. 31 is a schematic illustration of one embodiment of a fiber illuminator that comprises ridges and valleys.

FIG. 31 schematically illustrates one embodiment of a fiber illuminator 440 comprising a mixer portion 442 and a plurality of illumination branches 444. The mixer portion 442 can comprise an input face 21 and an output face 22, and each illumination branch can extend from the output face to an output end 446. The mixer portion 442 can comprise a variety of suitable mixer configuration such as described herein. Accordingly, in some embodiments, the mixer portion 442 comprises a hollow tube, and in other embodiments, the mixer portion 442 comprises a solid piece of optically transmissive material. In some arrangements, each illumination branch 444 is integrally formed with an output end of the mixer portion 442. The fiber illuminator 440 can comprise any number of illumination branches 444. In some embodiments, the output end 446 of each illumination branch 444 is configured to couple with an optical fiber.

The fiber illuminator 440 can comprise one or more rippled sidewalls 15 having ridges 24 and valleys 25. In some embodiments, the ridges 24 and the valleys 25 extend from the input face 21 to the output face 22. In other embodiments, the ridges 24 and the valleys 25 extend from the output face 22 to the output ends 446. In still other embodiments, the ridges 24 and the valleys 25 extend from the input face 21 to the output ends 446. In some arrangements, the ridges 24 and the valleys 25 assume the same configuration on the mixer portion 442 and on the illumination branches 444. In other arrangements, the ridges 24 and the valleys 25 vary between the mixer portion 442 and any of the illumination branches 444.

The fiber illuminator 440 can be used to substantially uniformly illuminate a bundle of optical fibers in a manner superior to conventional methods for doing so. Often, a bundle of fibers is placed at the output end of a mixing rod in order to illuminate the fibers. Consequently, light is lost to the regions between the fibers. In certain embodiments, the fiber illuminator 440 decreases these losses by coupling light into each fiber via the illumination branches 444. Furthermore, in some embodiments, the one or more rippled sidewalls 15 having ridges 24 and valleys 25 ensure that the light is substantially uniformly distributed into the different fibers. The one or more rippled sidewalls 15 can also allow the mixer portion 442 to be more compact, since the length thereof can be reduced without substantially altering the mixing capacities of the mixer portion 442. In some embodiments, the fiber illuminator 440 operates in reverse, such that light enters the output face 22 of the mixer portion 442 from one or more of the plurality of illumination branches 444.

FIG. 32A illustrates one embodiment of a smooth mixer 460 comprising an input face 21 and an output face 22. In the illustrated embodiment, the input face 21 and the output face 22 comprise squares having approximately equal areas. In certain embodiments, the mixer 460 comprises a smooth square mixing rod having one or more bends 462 along the length thereof in one or more planes. In some embodiments, the mixer 460 comprises one or more bends 462 parallel to the yz plane and/or the xz plane, as defined in FIG. 32A. In the illustrated embodiment, the mixer 460 comprises two gradual, oppositely-directed bends 462 parallel to the yz plane and two gradual, oppositely-directed bends 462 along the xz plane. In other embodiments, the bends are in different directions. Nevertheless, in many embodiments, the illuminance distribution obtained at the output face 22 of the mixer 460 is less uniform than the distribution obtained at the output face of a square mixing rod that has the same length as the mixer 460 but is not bent.

Figure 32B:
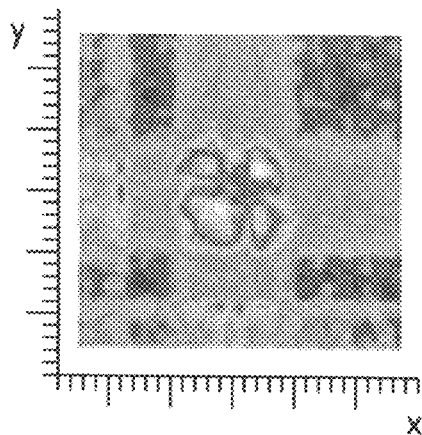
FIG. 32B is a plot of the illuminance distribution at an output face of the mixer of FIG. 32A that results when a relatively small light source is coupled with an input face of the mixer.
Figure 32C:
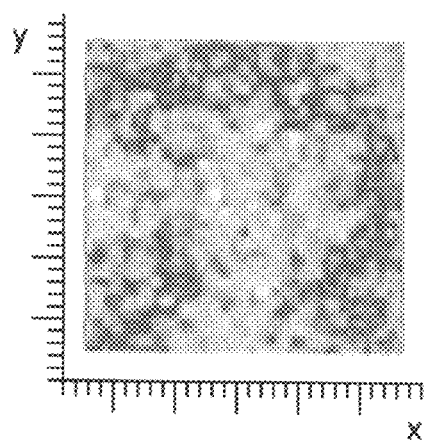
FIG. 32C is a plot of the illuminance distribution at the output face of the mixer of FIG. 32A that results when a relatively large light source is coupled with the input face of the mixer.

FIGS. 32B and 32C are spatial plots representing the illuminance distribution at the output face 22 of one embodiment of the mixer 460. FIG. 32B illustrates the illuminance distribution when a source is very small in comparison with the input face 21, and thus does not fill the input face 21 with light. As shown in FIG. 32B, the illuminance distribution can be highly non-uniform.

FIG. 32C illustrates the illuminance distribution when a source is large in comparison with the input face 21, and substantially fills the input face 21 with light. As shown in FIG. 32C, the illuminance distribution from the larger source can be non-uniform. However, in some embodiments, the distribution is much more uniform than that obtained from the smaller source (e.g., in comparison with FIG. 32B).

FIG. 32D illustrates one embodiment of a rippled mixer 470 comprising an input face 21 and an output face 22. In the illustrated embodiment, the input face 21 and the output face 22 comprise squares having approximately equal areas. In certain embodiments, the mixer 470 further comprises one or more rippled sidewalls 15 having ridges 24 and valleys 25. The rippled sidewalls 15 can comprise any suitable configurations. In certain embodiments, the mixer 470 comprises one or more bends 472 along the length thereof. In some embodiments, the mixer 470 comprises one or more bends 472 along the yz plane and/or the xz plane, as defined in FIG. 32D. In the illustrated embodiment, the mixer 470 comprises two gradual, oppositely-directed bends 472 along the yz plane and two gradual, oppositely-directed bends 472 along the xz plane. In some embodiments, the ridges 24 and the valleys 25 also comprise bends 472 along the length of the mixer 470, and can comprise the same contour as the mixer 470. In the illustrated embodiments, the only difference between the mixer 460 and the mixer 470 is the ribbed sidewalls 15 of the mixer 470. In many embodiments, the illuminance distribution obtained at the output face 22 of the mixer 470 is more uniform than the distribution obtained at the output face 22 of the mixer 460.

Figure 32E:
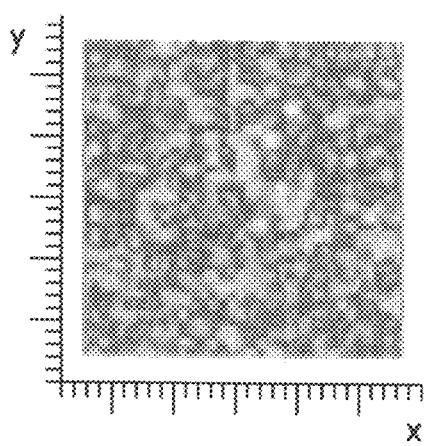
FIG. 32E is a plot of the illuminance distribution at an output face of the mixer of FIG. 32D that results when a relatively small light source is coupled with an input face of the mixer.
Figure 32F:
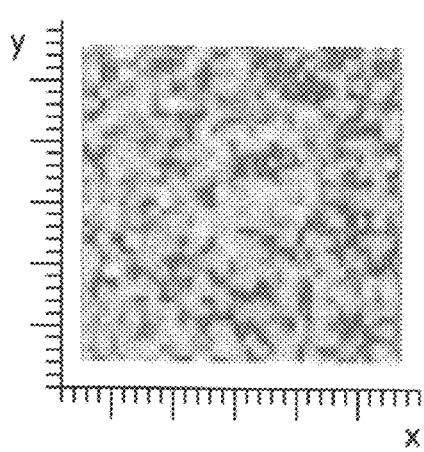
FIG. 32F is a plot of the illuminance distribution at the output face of the mixer of FIG. 32D that results when a relatively large light source is coupled with the input face of the mixer.

FIGS. 32E and 32F are spatial plots representing the illuminance distribution at the output face 22 of one embodiment of the mixer 470. FIG. 32E illustrates the illuminance distribution when a source is very small in comparison with the input face 21, and thus does not fill the input face 21 with light. As shown in FIG. 32E, the illuminance distribution can be much more uniform than that obtained from the smooth mixer 460 having either a smaller or larger source at the input face 21 (e.g., in comparison with FIGS. 32B and 32C).

FIG. 32F illustrates the illuminance distribution when a source is large in comparison with the input face 21, and substantially fills the input face 21 with light. As shown in FIG. 32F, the illuminance distribution from the larger source can be much more uniform than that obtained from the smooth mixer 460 having either a smaller or larger source at the input face 21 (i.e., in comparison with FIGS. 32B and 32C), and can be more uniform than, or about as uniform as, that obtained from a smaller source at the input face 21 (e.g., in comparison with FIG. 32E).

Accordingly, in some embodiments, the mixer 470 comprising one or more rippled sidewalls 15 can comprise one or more bends 472 along a length thereof without significantly degrading the uniformity of the illuminance distribution at the output face 22. This result can be particularly advantageous since the one or more bends 472 can aid in the mixing of light that enters the input face 21 at high angles and/or low angles. For example, such bends can be used to affect light emitted normal from the light source that would otherwise pass straight through a mixer that is not bent. The same result can also be achieved with certain embodiments of a circular mixer comprising one or more bends along a length thereof and rippled sidewalls or mixers having other shapes.

FIG. 33A illustrates one embodiment of a rippled mixer 480 coupled with a nonimaging optical element 481 at an input face 21 of the mixer 480. In certain embodiments, a light source 10 is coupled to an input face 482 of the nonimaging optical element 481. In further embodiments, the mixer 480 is coupled with a nonimaging optical element 483 at an output face 22 of the mixer 480. The nonimaging optical element 483 can comprise an output face 484.

In various embodiments, the mixer 480 comprises one or more rippled sidewalls 15 having ridges 24 and valleys 25. The mixer 480 can comprise any suitable configurations such as those disclosed herein. In further embodiments, one or more of the nonimaging optical elements 481, 483 comprise rippled sidewalls having ridges and valleys (not shown). Such non-imaging optical elements may comprise, for example, compound parabolic collectors (CPC) or reflector with elongate ridges 24 and valleys 25.

FIG. 33B illustrates one embodiment of a rippled mixer 490 coupled with the nonimaging optical elements 481, 483 described above. In certain embodiments, the mixer 490 comprises one or more bends 492 along the length thereof along one or more planes. In some embodiments, the mixer 490 comprises one or more bends 492 along the yz plane and/or the xz plane, as defined in FIG. 33B. As described above, the bends may be in different directions as well. In the illustrated embodiment, the mixer 490 comprises two gradual, oppositely-directed bends 492 along the yz plane. In various embodiments, the mixer 490 comprises one or more rippled sidewalls 15 having ridges 24 and valleys 25. In some embodiments, the ridges 24 and the valleys 25 also comprise bends 492 along the length of the mixer 490, and can comprise the same or different bends as the mixer 470.

FIG. 33C illustrates one embodiment of a rippled mixer 500 comprising one or more rippled sidewalls 15. The mixer 500 is coupled with the nonimaging optical elements 481, 483 described above. The rippled mixer 500 resembles the rippled mixer 490 in many respects, but can differ in manners such as now described. In some embodiments, the mixer 500 comprises four gradual bends 502 along the yz plane. In the illustrated embodiment, the bends 502 alternate directions to form an undulating structure. In further embodiments, any number of bends 502 along any combination of planes is possible.

In many embodiments, the illuminance distribution at the output face 22 of any of the mixers 480, 490, 500 described above and/or the output face 484 of the nonimaging optical element 483 is much more uniform than the distribution that could be obtained with a mixer of identical geometry and dimensions, but having smooth sidewalls. In further embodiments, the illuminance distribution at the output faces 22, 484 is more uniform for configurations wherein one or more of the nonimaging optical elements 481, 483 comprise rippled sidewalls than for configurations wherein one or more of the nonimaging optical elements 481, 483 have smooth sidewalls.

FIG. 34A schematically illustrates one embodiment of a curved mixer 510. In certain embodiments, the mixer 510 comprises an input face 21 and an output face 22. In further embodiments, the mixer 510 comprises one or more rippled sidewalls 15 having ridges 24 and valleys 25. The rippled sidewalls can comprise any suitable configuration such as described herein. In some embodiments, the ridges 24 and the valleys 25 vary in depth along the length and/or around the circumference of the mixer 510.

FIG. 34B schematically illustrates another embodiment of a curved mixer 520. In certain embodiments, the mixer 520 comprises an input face 21 and an output face 22. In some embodiments, the mixer 520 tapers inward from the input face 21 toward a smaller cross sectional area of a center section 522, and tapers outward from the smaller cross sectional area of the center section 522 to the output face 22. In further embodiments, the mixer 520 comprises one or more rippled sidewalls 15 having ridges 24 and valleys 25. The rippled sidewalls can comprise any suitable configuration such as those disclosed herein. In some embodiments, the ridges 24 and the valleys 25 vary in depth along the length and/or around the circumference of the curved mixer 520.

In many embodiments, the curved mixers 510, 520 advantageously redirect light propagating in one direction (e.g., perpendicular to the input face 21) toward another direction (e.g., perpendicular to the output face 22). In some embodiments, the mixers 510, 520 having rippled sidewalls 15 produces an illuminance distribution at the output face 22 that is more uniform than that which can be produced by certain embodiments having smooth sidewalls.

Figure 35:
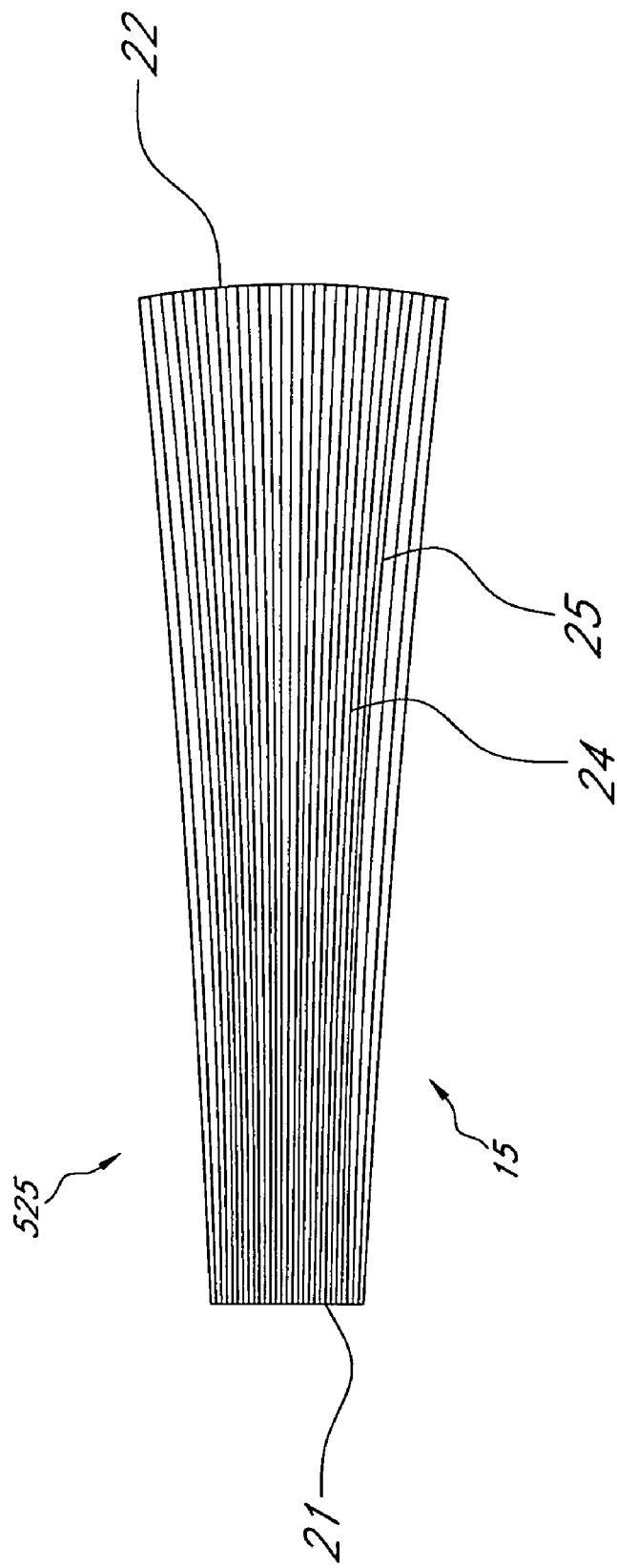
FIG. 35 is a side elevation view of one embodiment of a mixer that comprises rippled sidewalls and a curved output face.

FIG. 35 schematically illustrates one embodiment of a mixer 525. In certain embodiments, the mixer 525 comprises an input face 21 and an output face 22. In some embodiments, the mixer 525 tapers gradually from the input face 21 to the output face 22. In some embodiments, the taper is linear. In other embodiments, the taper is more gradual near the input face 21 than it is near the output face 22. In some embodiments the output face is curved with respect to a plane perpendicular to the length of the mixer 525. Such curvature may provide optical power such that the output face 22 forms a lens. In some embodiments, the mixer 525 comprises a gradual taper from the input face 21 toward the output face 22 and further comprises a curved output face 22 that acts as a field lens.

In some embodiments, the mixer 525 comprises one or more rippled sidewalls 15 having ridges 24 and valleys 25. The rippled sidewalls can comprise any suitable configuration such as those disclosed herein. In some embodiments, the ridges 24 and the valleys 25 vary in depth along the length and/or around the perimeter of the mixer 525.

In certain embodiments, the rippled sidewalls 15 provide a substantially uniform illuminance distribution at the output face 22 of the mixer 525. In further embodiments, the curvature of the output face 22 provides an improved angular distribution as compared with a rippled mixer having a planar output face. In some embodiments, the angular distribution is substantially uniform.

Many methods are possible for forming certain embodiments of rippled sidewalls having ridges and valleys such as those disclosed herein. In various embodiments, the ridges and the valleys are formed by injection molding or embossing. In other embodiments, the ridges and the valleys are formed by extrusion. In certain of such embodiments, a long extruded piece of material is cut into smaller pieces to form mixers.

In some embodiments, as schematically depicted in FIG. 36A, a film 530 comprising ridges 24 and valleys 25 is applied to a solid rod 535. In certain embodiments the film 530 comprises a flexible material capable of conforming to the shape of a curved surface. In other embodiments, the film 530 can be substantially rigid. In many embodiments, the film 530 comprises the ridges 24 and the valleys 25 on one side thereof, and a substantially smooth surface on an opposite side. In further embodiments, the rod 535 comprises a substantially smooth exterior surface. In some embodiments, the substantially smooth surfaces of the film 530 and the rod 535 face each other, as illustrated, and in other embodiments, the ridges 24 and the valleys 25 face the substantially smooth exterior surface of the rod 535. In many embodiments, the film 530 and the rod 535 comprise substantially the same index of refraction and, in further embodiments, are joined by an index matching adhesive or other material.

In some embodiments, as schematically illustrated in FIG. 36B, an insert 540 comprising ridges 24 and valleys 25 is placed in a hollow tube 545. In certain embodiments, the insert 540 comprises a substantially transparent solid material, such as plastic or glass. In some embodiments, the insert 540 is substantially rigid, and in others, the insert 540 is flexible. In some embodiments, the ridges 24 and the valleys 25 are formed on an interior surface of the insert 540, and in other embodiments, the ridges 24 and the valleys 25 are formed on an exterior surface of the insert 540. In many embodiments, the tube 545 is reflective. In some embodiments light is refracted by the ridges 24 and valleys 25 and sloping sidewalls therebetween that are disposed on the rippled surface of the insert 540. The effect is the same as if the light is reflected from a rippled reflective sidewall. Many of the refracted rays are redirected at a different azimuthal direction toward the output end thereby mixing the light at the output end.

In certain embodiments, the film 530 or the insert 540 comprises between about 20 and about 5000, between about 1000 and about 5000, or between about 2000 and about 4000 ridges 24 and valleys 25. In other embodiments, the film 530 or the insert 540 comprises greater than about 15, greater than about 20, greater than about 50, greater than about 100, greater than about 200, greater than about 500, greater than about 1000, greater than about 2000, greater than about 3000, greater than about 4000, or greater than about 5000 ridges 24 and valleys 25. In still other embodiments, the film 530 or the insert 540 comprises fewer than about 5000, fewer than about 4000, fewer than about 3000, fewer than about 2000, fewer than bout 1000, fewer than about 500, fewer than about 200, fewer than about 100, fewer than about 50, or fewer than about 20 ridges 24 and valleys 25.

Some advantageous embodiments comprise relatively large numbers of ridges 24 and valleys 25. In some embodiments, as the number of ridges 24 and valleys 25 increases, the size of the ridges 24 and the valleys 25 becomes smaller relative the surface shape of the mixer to which the ridges 24 and the valleys 25 are applied. This result can be particularly advantageous, such as, for example, in systems for which substantially circular or substantially square beam patterns are desirable.

In certain embodiments, relatively small ridges 24 and valleys 25 result in diffraction effects. In some embodiments, the diffraction effects are beneficial to creating substantially uniform illuminance distributions. In other embodiments, the diffraction effects limit the uniformity of illuminance distributions. In some embodiments, ridges 24 and valleys 25 that are relatively small and that produce diffractive effects can produce illuminance distributions similar to larger ridges 24 and valleys 25 and/or other macroscopic features of a mixer.

As schematically illustrated in FIG. 37, in some embodiments, a mixer 550 comprises a rod 552 and a hologram 554. In some embodiments the rod 552 comprises a solid, substantially optically transmissive material. In other embodiments, the rod 552 comprises a hollow tube. In some embodiments, the hologram 554 comprises a flexible sheet of material and is placed on an exterior surface of the rod 552, and in other embodiments, is placed on an interior surface of the rod 552. In some embodiments, the hologram 554 is fabricated directly on a surface of the rod 552. In certain embodiments the hologram comprises a transmissive optical element and is included as an insert in a reflective tube such as shown in FIG. 35B. In various embodiments, the hologram 554 is configured to produce illuminance distributions such as for example those produced by rippled sidewall configurations disclosed herein. The hologram may be optically generated, e.g., via optical interference within the tube, or computer generated using, for example, processes well known in the art.

With reference again to FIGS. 3 and 4, in some embodiments, the mixer 120 (or another type of mixer such as discloses elsewhere herein) comprises a solid light conduit. Accordingly, in some arrangements, the mixer 120 comprises a substantially optically transmissive material, such as glass or plastic or some other polymeric material. Other materials may also be used. In many embodiments, the mixer 120 comprises a substantially constant index of refraction along a cross-section thereof. In many embodiments, the substantially optically transmissive material has negligible absorption for wavelengths that are desired at the output end 22. In some embodiments, the mixer 120 is configured to shield the output 22 from undesired flux entering the input end 21, such as infrared radiation or ultraviolet radiation, and to transmit desired flux, such as visible light. In some embodiments, the substantially optically transmissive material is configured to absorb radiation having undesired wavelengths, and in further embodiments, is configured to re-radiate the absorbed radiation at one or more desired wavelengths. In such embodiments, the substantially optical transmissive material may comprise a material that passes certain (e.g. visible) wavelength and absorbs other (e.g., visible) wavelengths. In such embodiments, for example, the wavelength spectrum at the output may be a particular color different from the input. For example, white light could be input into the mixer while the light output from the mixer could be red, blue, green or another color. The optically transmissive material may fluoresce so as to re-radiate light. In some embodiments the optically transmissive material is doped with constituents that case absorption and/or fluorescence.

FIG. 38A schematically illustrates a front plan view of one embodiment of a circular mixer 560 that comprises a substantially optically transmissive outer layer 561 over a core 562. In various embodiments, the core 562 comprises a vacuum, one or more gases, or a substantially optically transmissive material. Other materials are also possible. In certain embodiments, the outer layer 561 comprises indices of refraction that vary between lower and higher values around the perimeter of the mixer 560, as indicated by lighter and darker shading, respectively. In some embodiments, the gradation from lower to higher indices of refraction, or from higher to lower indices of refraction, is gradual. In many embodiments, index variation along the longitudinal direction is nominal. In certain embodiments, the index of refraction variations comprise high and low refractive index portions that extend longitudinally along the length of the mixer 560 in a fashion similar to the elongate ridges and valleys in embodiments described above. The index of refraction variations refract light within the mixer in a similar manner as the elongate ridges and valleys described above.

In some embodiments, the indices of refraction vary in a random or irregular manner around the perimeter of the mixer 560. In other embodiments, the indices of refraction vary in a regular pattern around the perimeter of the mixer 560, and in some embodiments, vary sinusoidally. In certain embodiments, the mixer 560 comprises a smooth outer surface. In various embodiments, the outer layer 561 comprises a uniform thickness or a variable thickness around the perimeter of the mixer 560. In further embodiments, the mixer 560 comprises a cladding over the outer layer 561. Other configurations are also possible.

In many embodiments, the mixer 560 produces illuminance distribution patterns at an output face (not shown) that are more uniform than those produced by a mixing rod that comprises the same size and shape but does not comprise an outer layer with varying indices of refraction. In many embodiments, the mixer 560 produces illuminance distribution patterns that are more uniform than those produced by smooth circular mixers comprising the same size and shape.

FIG. 38B schematically illustrates a front plan view of one embodiment of a square mixer 565 that comprises a substantially optically transmissive outer layer 566, such as the outer layer 561 described above, over a core 567, such as the core 562 described above.

Figure 39B:
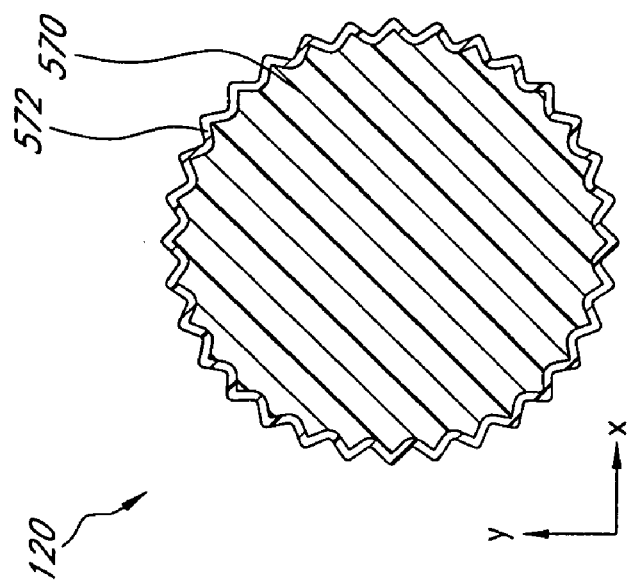
FIG. 39B is a cross-sectional view of one embodiment of a mixer comprising a core and clad comprising a substantially constant thickness relative to a surface of the core.
Figure 39A:
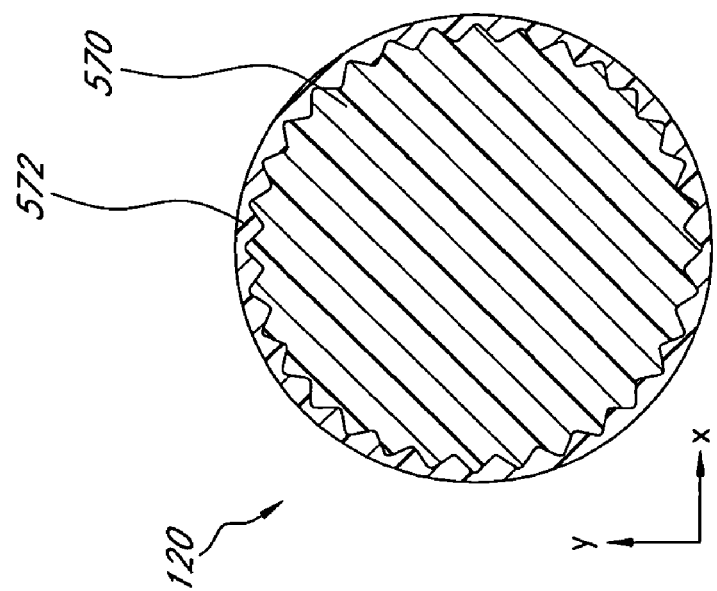
FIG. 39A is a cross-sectional view of one embodiment of a mixer comprising a core and clad that varies in thickness relative to a surface of the core.

With reference to FIGS. 4, 39A, and 39B, in some embodiments, the mixer 120 (or any other suitable mixer such as those disclosed herein) comprises a core 570. In further embodiments, the mixer 120 comprises a cladding 572 for protecting the surface of the core 570, for assisting in confining light within the mixer, or for other suitable purposes. As illustrated in FIG. 39A, in some embodiments, the cladding 572 comprises a thickness that varies relative to the surface of the core 570. In the embodiment shown in FIG. 39A therefore, the exterior surface of the cladding 572 is smooth. As illustrated in FIG. 39B, in other embodiments, the cladding 572 comprises a substantially constant thickness relative to the surface of the core 570. In this embodiment, as shown, the exterior surface of the cladding 572 may likewise be rippled. Other configurations are also possible. In some embodiments, the cladding 572 comprises a material that has a lower index of refraction than that of the material of the core 570. In certain of such embodiments, the cladding 572 does not significantly alter the illuminance distribution at the output end 22 of the mixer 120, as compared with a mixer 120 that does not comprise the cladding 572. In certain of such embodiments, such as, for example, when the cladding 572 is sufficiently thin, the cladding 572 does not significantly alter the illuminance distribution at the output end 22 of the mixer 120, as compared with a mixer 120 that does not comprise the cladding 572. In other embodiments, a material that has an index of refraction substantially equal to or higher than that of the material of the core 570 is disposed about the core.

FIG. 40 schematically illustrates a partial perspective view of one embodiment of a rippled sidewall 15 comprising a plurality of elongate ridges 24 and valleys 25. In the illustrated embodiment, the ridges 24 and the valleys 25 extend parallel to the z axis, as defined in FIG. 40. In certain embodiments, a method for determining spreading from the ridges 24 and the valleys 25 comprises illuminating the rippled sidewall 15 with a beam 580 of collimated light to produce an illuminance distribution 582. In some embodiments, the beam 580 is introduced in a plane of incidence that runs substantially parallel to the ridges 24 and substantially perpendicular to the sidewall 15 (e.g., parallel to the yz plane defined in FIG. 40). In further embodiments, the plane of incidence runs parallel to the ridges 24 and perpendicular to a plane that is substantially tangent to the sidewall 15.

In some embodiments, at least a portion of the sidewall 15 does not comprise ridges 24 and valleys 25. In some embodiments, the portion of the sidewall 15 is substantially planar and comprises a substantially specularly reflective material. For the case of specular reflection from a planar section, the illuminance distribution 582 is merely a spot.

In other embodiments, the rippled sidewall 15 comprises ridges 24 and valleys 25. As noted, numerous cross-sectional profiles are possible for the ridges 24 and the valleys 25. In certain embodiments, the rippled sidewall 15 comprises a substantially specularly reflective material. In many of such embodiments, light reflected from the sidewall 15 is distributed in a semicircular arc, as schematically illustrated by lines 583 in FIG. 40. In some embodiments, substantially uniform illuminance distributions are preferred. In other embodiments, non-uniform and/or patterned illuminance distributions are preferred. In certain embodiments, the method for determining spreading comprises comparing the illuminance distributions 582 obtained from two or more rippled sidewalls 15 having different ripple profiles.

The incident beam 580 can be oriented at an angle $\delta$ with respect to a plane (e.g., the xz plane defined in FIG. 40) running substantially parallel to the sidewall 15. In various embodiments, the distributions produced by two or more angles $\delta$ are compared.

Figure 41A:
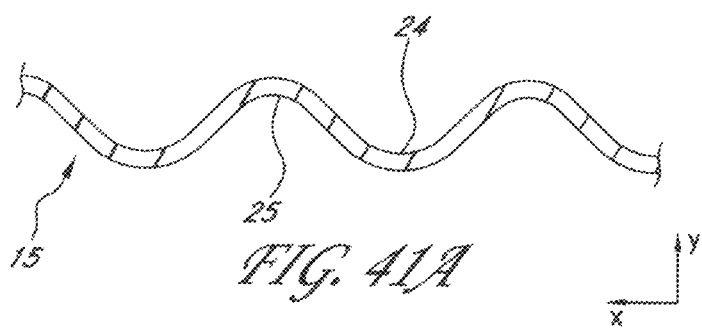
FIG. 41A is a partial cross-sectional view of one embodiment of a sidewall comprising ridges and valleys having highly rounded vertices with sloping surfaces therebetween.
Figure 41B:
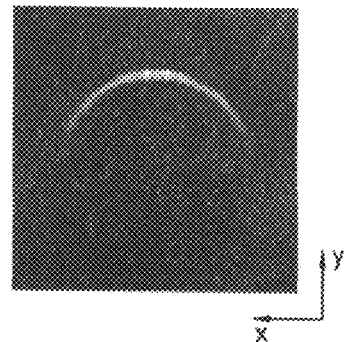
FIG. 41B is a plot of the illuminance distribution obtained by reflecting a beam of collimated light from the sidewall of FIG. 41A.

FIG. 41A schematically illustrates a partial cross-section of one embodiment of a sidewall 15 comprising ridges 24 and valleys 25. The ridges 24 and the valleys 25 comprise highly rounded vertices with sloping surfaces therebetween. FIG. 41B is a plot of the illuminance distribution obtained by reflecting a beam of collimated light from the sidewall 15 in a manner such as described above, wherein the beam 580 is in a plane parallel to the yz plane defined in FIG. 40, and is oriented at an angle $\delta$ with respect to the xz plane. As shown, the illuminance is concentrated toward the top of the semicircular distribution.

Figure 41C:
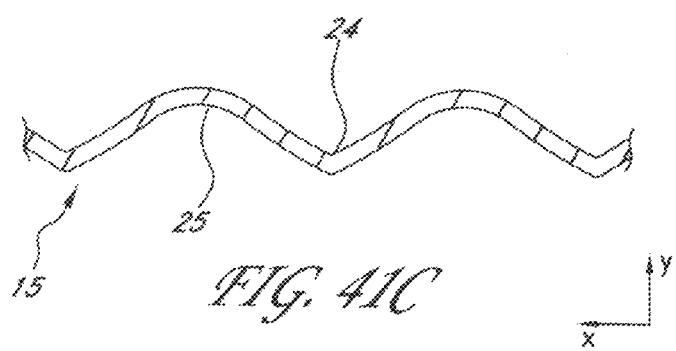
FIG. 41C is a partial cross-sectional view of one embodiment of a sidewall comprising ridges having pointed vertices, valleys having rounded vertices, and sloping surfaces therebetween.
Figure 41D:
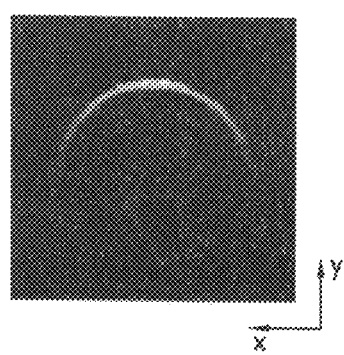
FIG. 41D is a plot of the illuminance distribution obtained by reflecting a beam of collimated light from the sidewall of FIG. 41C.

FIG. 41C schematically illustrates a partial cross-section of another embodiment of a sidewall 15 comprising ridges 24 and valleys 25. In the illustrated embodiment, the ridges 24 comprise pointed vertices, the valleys 25 comprise rounded vertices, and the sidewall 15 comprises curved sloping surfaces between the ridges 24 and the valleys 25. FIG. 41D is a plot of the illuminance distribution obtained by reflecting a beam of collimated light from the sidewall 15 in a manner such as described above with respect to FIG. 41B. As shown, the illuminance is more uniformly distributed along the semicircular distribution.

Figure 41E:
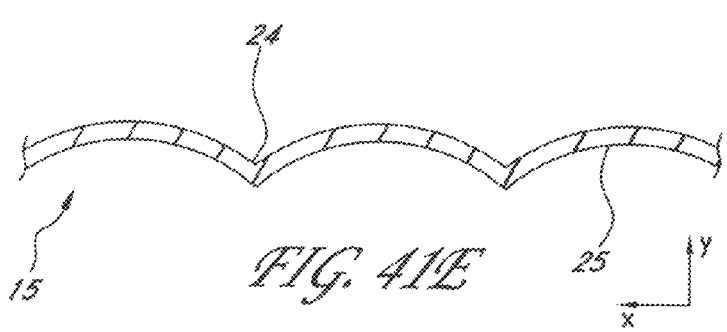
FIG. 41E is a partial cross-sectional view of one embodiment of a sidewall comprising ridges having vertices that are more pointed than those shown in FIG. 41C, valleys having vertices that are more gently rounded than those shown in FIG. 41C, and sloping surfaces therebetween.
Figure 41F:
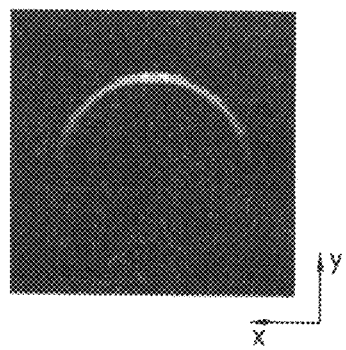

FIG. 41E schematically illustrates a partial cross-section of yet another embodiment of a sidewall 15 comprising ridges 24 and valleys 25. In the illustrated embodiment, the ridges 24 comprise more highly pointed vertices, the valleys 25 comprise more gently rounded vertices, and the sidewall 15 comprises curved sloping surfaces between the ridges 24 and the valleys 25. FIG. 41F is a plot of the illuminance distribution obtained by reflecting a beam of collimated light from the sidewall 15 in a manner such as described above with respect to FIG. 41B. As shown, the illuminance is even more uniformly distributed along the semicircular distribution.

In certain embodiments, the sidewalls include scatter features (e.g., surface roughness) that scatter light incident thereon. These scatter features may be included on the ridges, valleys, and/or sloping sidewalls therebetween. In various embodiments, these scatter features increase the uniformity of the output of the mixer. In some embodiments, the scatter features may increase the thickness of an illuminance distribution such as the illuminance distributions shown in FIGS. 41B, 41D, and 41F.

In certain embodiments, the ridges 24 and the valleys 25 vary in height along a length of a mixer so as to introduce scatter effects. In some embodiments, the variations in height comprise multiple undulations along the length of the mixer. The undulations can, for example, have regular, irregular, or random intervals or periods, or any combination thereof.

With reference again to FIG. 40, in some embodiments, the ridges 24 and the valleys 25 have surface portions that extend at an angle ε with respect to a plane running substantially tangent to and/or parallel with a plane comprising the ridges 24 and the valleys 25 (e.g., the xz plane). In some embodiments, the angle ε is constant along the length of the mixer. In other embodiments, the angle ε varies along the length of the mixer, such as, for example, when the ridges 24 and the valleys 25 vary (e.g., undulate) along the length of the mixer. In various embodiments, it is preferable that the ridges 24 and the valleys 25 have a maximum absolute value of ε that is no greater than about 7 degrees, no greater than about 5 degrees, no greater than about 3 degrees, or no greater than about 1 degree along the length of the mixer.

In many embodiments, light propagating through a rippled mixer having ridges and valleys is scattered by the surface portions inclined at an angle ε, which may vary. Such scatter may further mix light propagating through the mixer. In some embodiments, this scattering improves the uniformity of the illuminance distribution at the output face of the mixer. In some embodiments, the scatter features may increase the thickness of an illuminance distribution such as those shown in FIGS. 41B, 41D, and 41F. In some embodiments, the scattering increases the angle at which light exits the output face of the mixer. In further embodiments wherein the ridges and the valleys comprise variable, undulating heights, the angle at which some of the light is oriented with respect to the optical axis of the mixer can cumulatively increase with successive reflections. Accordingly, in some embodiments, relatively smaller angles ε are preferred.

In certain embodiments, scattering such as just described can be produced by a diffuser or a hologram (e.g., a holographic diffuser). In some embodiments, a rippled mixer comprises ridges and valleys that have a constant height along the length of the mixer (e.g., the mixers 120, 130, 170). In certain embodiments, a reflective hologram or diffuser is wrapped around a solid mixer or a transmissive optical element is disposed inside a hollow mixer in a manner such as schematically depicted in FIG. 37. Alternatively, surface features that form the diffuser or hologram may be included in and/or on the sidewall. In some embodiments this diffuser may comprise an elliptical or asymmetric diffuser. For example, in some embodiments, the diffuser or hologram scatters light at a low angle in one direction and at a large angle in another direction. In some embodiments, the hologram produces a 60°×0.1° or a 60°×5° elliptical distribution.

Figure 42:
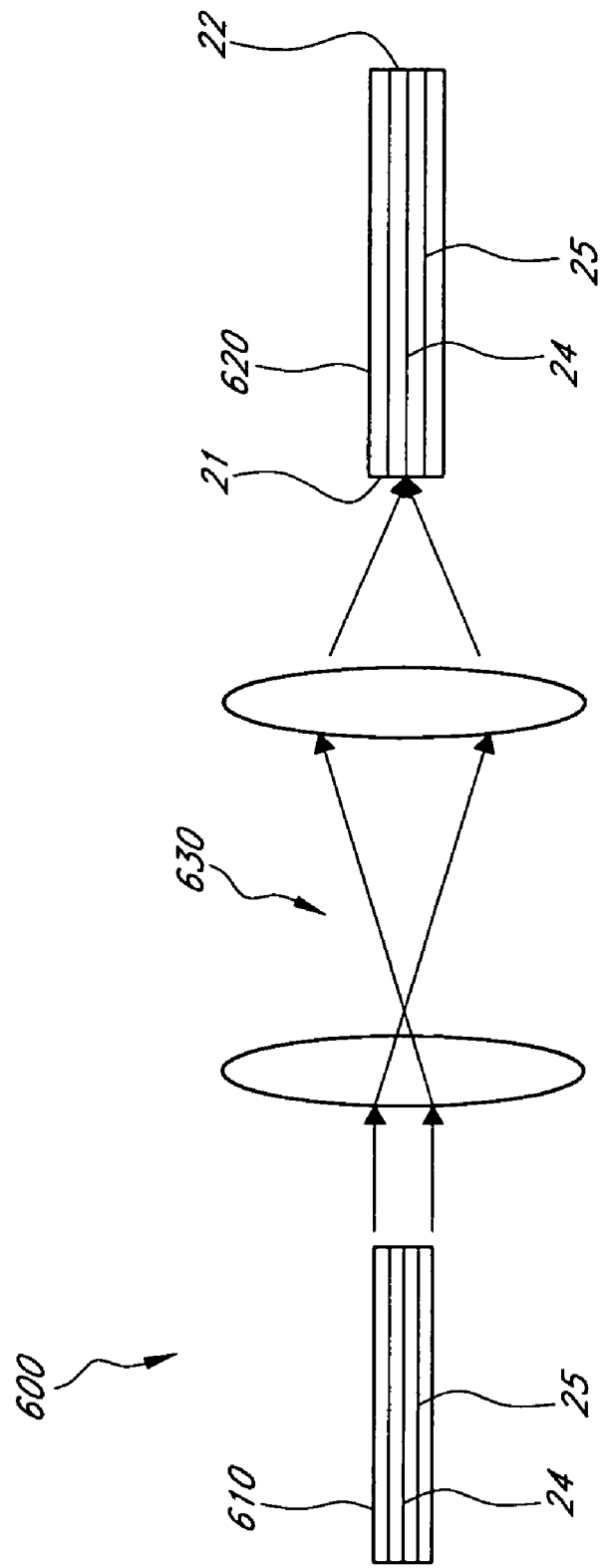

FIG. 42 schematically illustrates one embodiment of a system 600 comprising a first rippled mixer 610, a second rippled mixer 620, and transfer optics 630. In some embodiments, the first mixer 610 is a circular mixer comprising ridges 24 and valleys 25 and the second mixer 620 is a square mixer comprising ridges 24 and valleys 25. In some embodiments, the transfer optics 620 comprise one or more lenses or other suitable optical elements for transferring spatial distributions to angular distributions and vice versa. Such transfer optics may, for example, convert the uniform spatial illuminance distribution output from the first mixer 610 into a uniform angular distribution input into the second mixer 620. Other combinations and configurations of either of the mixers 610, 620, the transfer optics 630, or the system 600 are possible.

In some embodiments, the system 600 provides highly uniform light at an output face 22 of the second mixer 620. In many embodiments, both the angular distribution and the spatial distribution of the light are uniform. In some embodiments, the spatial distribution exiting the first mixer 610 is substantially uniform, but the angular distribution is not. In further embodiments, the transfer optics 630 direct light exiting the first mixer 610 such that the angular distribution exiting the first mixer 610 is transferred to the input face 21 of the second mixer 620 as a spatial distribution, and the spatial distribution exiting the first mixer 610 is transferred to the input face 21 of the second mixer 620 as an angular distribution. For example, in some embodiments, the transfer optics 630 comprises a lens that satisfies the Abbe sign condition, wherein light exiting the mixer 610 at an angle θ would focus at a distance F×sin(θ) above the optical axis, where F is the focal length of the transfer optics 630. In some embodiments, the distribution at the input face of the mixer 620 is telecentric. In some embodiments, the second mixer 620 produces a substantially uniform spatial distribution from the non-uniform distribution introduced at the input face 21, while the substantially uniform angular distribution introduced at the input face 21 remains substantially uniform at the output face 22.

The transfer optics 630 can be configured to produce a variety of angular distribution patterns from uniform illuminance distributions that, in some embodiments, exit the first mixer 610. For example, in some embodiments, the transfer optics 630 produces distributions following the equation $1/\cos\hat{\ }3$.

Figure 43:
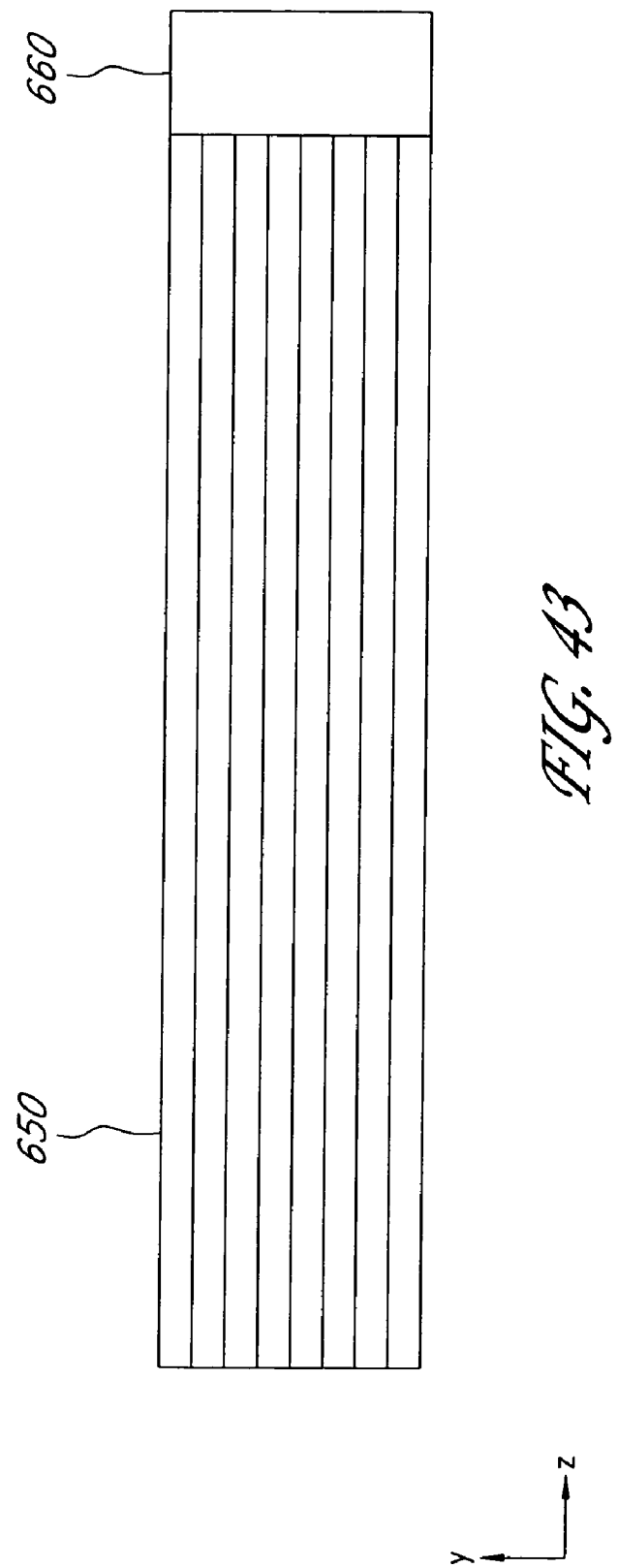

FIG. 43 schematically illustrates one embodiment of a mixer 650, such as the mixers disclosed herein, coupled with a diffuser 660. In certain embodiments, the diffuser 660 is a low angle diffuser. For example, in certain embodiments the diffuser 660 is configured to diffuse collimated light incident perpendicular to the diffuser into an angular distribution having a full-width half-maximum (FWHM) of about 30 degrees or less, about 6 degrees or less, or about 3 degrees or less. Other diffuser angles and diffuser distributions are also possible. In certain advantageous embodiments, the diffuser 660 homogenizes the light that does not hit the sidewalls of the rippled mixer. In some embodiments, the scatter angle of the diffuser is small compared to the numerical aperture of the flux coupled out of the mixer. In certain of such embodiments, the diffuser does not significantly increase the numerical aperture of the output light. A wide variety of different types of diffusers may be used. Surface diffuses, volume diffusers, holographic diffusers are some non-limiting examples. Other diffusers are possible. In some embodiments, the end of the mixer includes a surface that is diffusing (e.g., the output face) or include volume features therein that are diffusing. Still other configurations are possible.

Figure 44A:
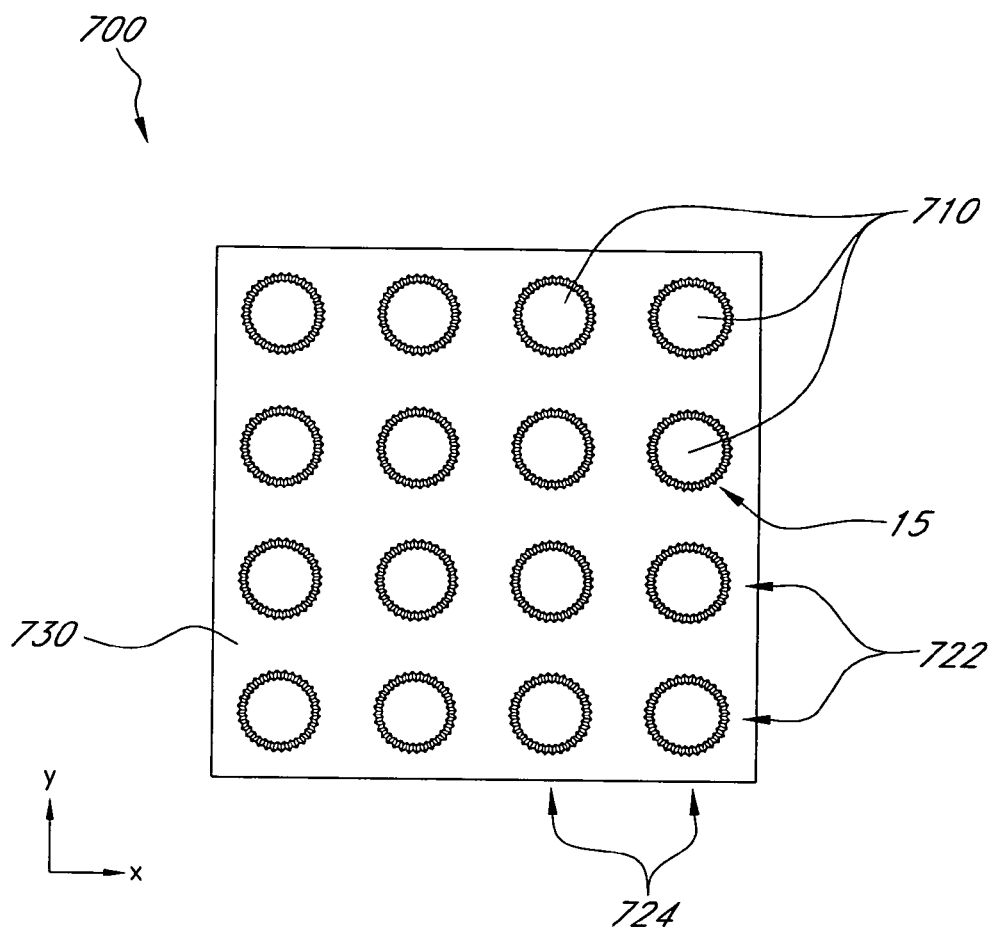

FIG. 44A schematically illustrates a top plan view of one embodiment of a mixer array 700. In certain embodiments, the array 700 comprises a plurality of mixers 710, such as any of the mixers disclosed herein. Accordingly, in some embodiments, one or more of the mixers 710 comprises a rippled sidewall 15. In some embodiments, each of the mixers 710 comprises a rippled sidewall 15. In the illustrated embodiment, the mixers 710 comprise generally circular cross-sections. In some embodiments, mixers with hexagonal, rectangular, or other shapes that tile to cover a substrate 730 are used. Other cross-sectional configurations are also possible.

In some embodiments, the mixers 710 are arranged in rows 722 and columns 724. In other embodiments, the mixers 710 are spaced from each other by irregular or random distances. In still other embodiments, the mixers 710 are grouped or bunched together, and can be in close proximity (e.g., adjacent) to each other. In some embodiments, the rippled sidewalls 15 of two or more adjacent mixers 710 are complementary to each other. In certain of such embodiments, adjacent mixers 710 the mixers 710 are separated by a thin void that may allow leakage from one mixer to another. In some embodiments, optical axes of two or more of the mixers 710 are substantially parallel. In other embodiments, some optical axes are angled with respect to each other.

In certain embodiments, two or more of the mixers 710 are mounted on the substrate 730. In some embodiments, the substrate 730 comprises glass, plastic, or polarizing materials. Other materials are possible. The mixers 710 can be mounted to the substrate in any suitable manner, such as by an optically transmissive and/or index-matching adhesive. In other embodiments, the mixers 710 are integrally formed with the substrate 730. In some embodiments, the mixers 710 and the substrate 730 are formed in a common mold.

Figure 44B:
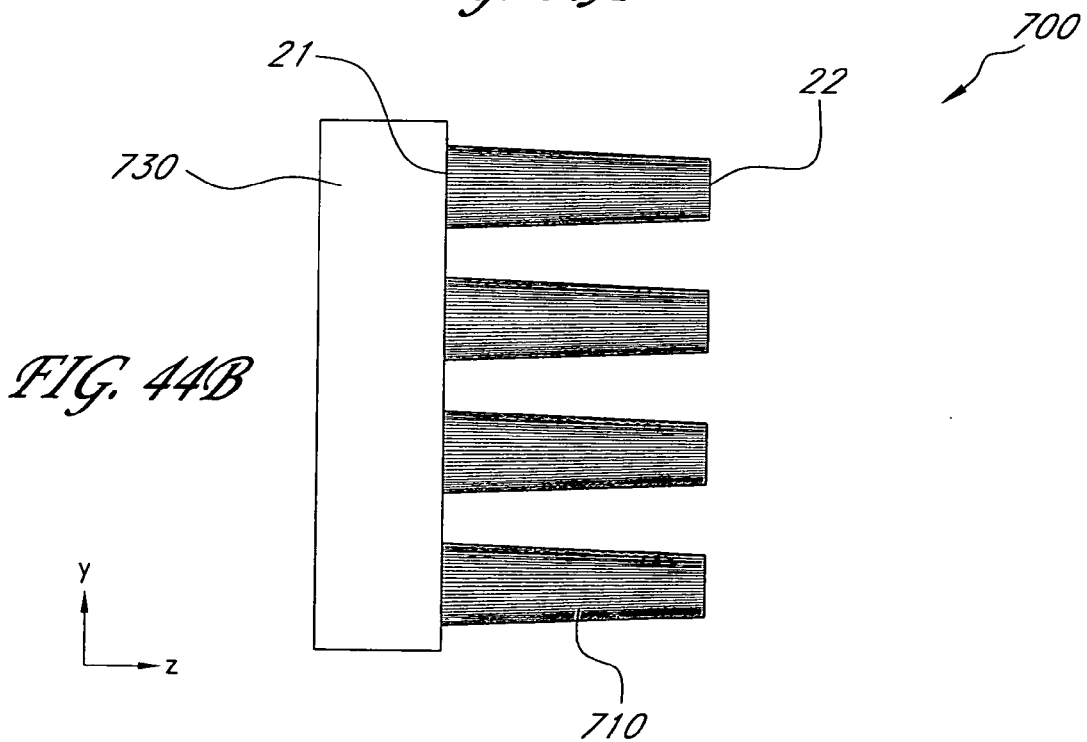

FIG. 44B schematically illustrates a side elevation view of the mixer array 700 depicted in FIG. 44A. In certain embodiments, the cross-sectional area of one or more of the mixers 710 is constant along the length of the mixers 710. In some embodiments, one or more of the mixers 710 are tapered from a larger input end 21 to a smaller output end 22. In other embodiments, one or more of the mixers 710 are tapered from a smaller input end 21 to a larger output end 22. In various embodiments, one or more of the mixers 710 comprise a draft angle of about 1 degree, about 2 degrees, about 3 degrees, or about 5 degrees; greater than about 1 degree, greater than about 2 degrees, greater than about 3 degrees, or greater than about 5 degrees; or less than about 5 degrees, less than about 3 degrees, less than about 2 degrees, or less than about 1 degree.

Other shapes are possible. In some embodiments, for example, the rippled mixers comprise rippled compound parabolic collectors. Other designs may also be used.

In some embodiments, the input faces 21 are spaced away from the substrate 730, and in other embodiments, the output faces 22 are spaced away from the substrate 730. In some embodiments, input faces 21 of two or more of the mixers 710 are substantially coplanar. In other embodiments, output faces 22 of two or more of the mixers 710 are substantially coplanar. In some embodiments, the mixers have different lengths or are not coplanar. Other configurations are possible.

In certain embodiments, a light source (not shown), such as the light source 10 is coupled with the array 700. In some embodiments, the light source is configured to provide a single beam to the mixers 710. In some embodiments, the single beam is coupled with one of the mixers 710, a plurality of the mixers 710, or all of the mixers 710. In other embodiments, two or more light sources are coupled with the array 700. In some embodiments, one or more light sources are individually coupled with one or more of the mixers 710. In further embodiments, one or more light sources are individually coupled with each of the mixers 710. In some embodiments, one or more light sources are coupled with the array 700 such that light propagates through the substrate and into one or more of the mixers 710, and in other embodiments, the light propagates through one or more of the mixers 710 and into the substrate. Other configurations and designs are possible.

In some embodiments, the array of rippled mixers may provide mixing without loss in etendue. Performance is generally less sensitive to the angular distribution exiting the light pipe when ripples are included. In some embodiments, the area between individual mixers is reflective so that light that does not enter the input face of the individual mixers is reflected back toward the source and can therefore be recycled.

In certain embodiments, mixers comprising rippled sidewalls, such as those disclosed herein, produce a substantially uniform illuminance distribution at an output face thereof. In some embodiments, the standard deviation of the illuminance distribution ($\sigma_{Illuminance}$) is less than 5 percent.

In certain embodiments, the rippled mixers produce a substantially uniform color at an output face thereof. One common specification for characterizing color uniformity is as follows:

$$\text{delta}\_u'\_v' = ((u'-u'\_\text{avg}')^2 + (v'-v'\_\text{avg}')^2)^{1/2}$$

where u'_avg and v'_avg are the average color point, and u' and v' are the test point. In some embodiments, the mixers produce a color having a delta_u'_v' less than 0.02. In further embodiments, the delta_u'_v' is less than 0.009. In still further embodiments, the delta_u'_v' is less than 0.003.

Certain embodiments disclosed herein may be used in numerous applications. For example, mixers comprising ribbed or rippled sidewalls may be used to substantially uniformly illuminate a spatial light modulator (e.g., DLP, LCOS, GLV, LCD) in a display, such as a micro-display, a front/rear projector, a heads-up device, a television, etc. In addition, certain embodiments enable spectrally desired or controlled solid state, incandescent, and fluorescent lighting, which can be beneficial in commercial and residential applications. Embodiments may be used for architectural and landscape lighting, display case lighting, stage and studio lighting, which often use spot lighting and flood lighting, signage, and other lighting applications. In particular, many lighting and lighting replacements may benefit from certain embodiments, including portable lights such as flashlight, downlights, spot lights, flood lights, lighting, and wall washing lights. Other areas that can benefit from certain embodiments include lithography, biomedical sensing, and industries where beam patterns are regulated, such the automotive and aviation industries. Military and medical applications are also possible.

As described above, a wide variety of configurations are possible. For example, in different embodiments, features may be added, excluded, rearranged, or configured differently. In some embodiments, for example, the shapes, angles, dimensions, and/or number of features can be different than those disclosed herein.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics of any embodiment described above may be combined in any suitable manner, as would be apparent to one of ordinary skill in the art from this disclosure, in one or more embodiments.

Similarly, it should be appreciated that in the above description of embodiments, various features of the inventions are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. An illumination system comprising:
a plurality of different light emitting diodes; and
a mixer comprising a light pipe having input and output ends and a central region therebetween, an optical path extending in a longitudinal direction from said input end through said central region to said output end, said plurality of light emitting diodes disposed in proximity to said input end wherein at least one of said light emitting diodes is offset from the center of the input end,
wherein said central region of said light pipe comprises one or more rippled sidewalls having a plurality of elongate ridges and valleys and sloping surfaces therebetween, at least one ridge or valley of said ridges and valleys at least partially formed by a faceted surface comprising three or more substantially nonorthogonal surface portions or by a rounded surface,
wherein light from said plurality of light emitting diodes propagating along said optical path reflects from said sloping surfaces and is redirected at a different azimuthal direction toward said output end thereby mixing and increasing uniformity of said light at said output end.

2. The illumination system of claim 1, wherein a portion of said ridges and valleys are formed by rounded surfaces and another portion of said ridges and valleys are formed by faceted surfaces.

3. The illumination system of claim 1, wherein said plurality of light emitting diodes comprises different color light emitting diodes.

4. The illumination system of claim 3, wherein said plurality of light emitting diodes comprises red, blue, and green light emitting diodes.

5. The illumination system of claim 1, wherein said plurality of light emitting diodes comprises a linear array.

6. The illumination system of claim 1, wherein said plurality of light emitting diodes comprises a diode array comprising a plurality of rows and columns of light emitting diodes.

7. The illumination system of claim 1, further comprising a reflective collector at said input end that receives light from said plurality of light emitting diodes and directs said light into said light pipe.

8. The illumination system of claim 7, wherein said reflective collector comprises an elliptical collector having an ellipsoidally shaped reflective surface.

9. The illumination system of claim 1, wherein said light pipe comprises a hollow light pipe with said central region being open.

10. The illumination system of claim 9, wherein said sidewalls comprise a reflective film.

11. The illumination system of claim 10, wherein said reflective film comprises metallization or a dielectric multilayer coating.

12. The illumination system of claim 1, wherein said light pipe comprises a solid light pipe and said central region comprises substantially optically transmissive material.

13. The illumination system of claim 12, wherein said central region comprises glass or plastic.

14. The illumination system of claim 1, wherein said light pipe comprises a flexible light pipe.

15. The illumination system of claim 14, wherein said light pipe comprises an optical fiber.

16. The illumination system of claim 15, wherein said optical fiber has a core diameter of least about 3 millimeters.

17. The illumination system of claim 1, wherein said light pipe comprises one or more substantially planar rippled sidewalls.

18. The illumination system of claim 1, wherein said light pipe comprises one or more substantially curved rippled sidewalls.

19. The illumination system of claim 1, wherein said light pipe comprises a right circular cylinder, said output end having a circular cross-section such that said light pipe outputs a substantially circular beam.

20. The illumination system of claim 1, wherein said light pipe comprises a right prism defined by four planar sidewalls such that said output end has a square or rectangular cross-section and said light pipe outputs a substantially square or rectangular shaped beam.

21. The illumination system of claim 1, wherein said light pipe has a width of between about 1 millimeter and about 12 millimeters.

22. The illumination system of claim 1, wherein said light pipe has a length of between about 2 millimeters and about 35 millimeters.

23. The illumination system of claim 1, wherein said sloping surfaces comprise planar surfaces.

24. The illumination system of claim 23, wherein a given sloping surface comprises a plurality of facets.

25. The illumination system of claim 1, wherein said ridges and valleys are curved.

26. The illumination system of claim 1, wherein at least one of said ridges is at least partially formed by a rounded surface.

27. The illumination system of claim 1, wherein size, shape, or spacing of the ridges or valleys varies for different ridges or valleys.

28. The illumination system of claim 1, wherein said ridges have an average spacing of between about 1 percent and about 30 percent of the width of said light pipe.

29. The illumination system of claim 1, wherein said ridges have an average spacing of between about 1 micron and about 1000 microns.

30. The illumination system of claim 1, wherein said ridges have an average height measured with respect to said valleys of between about 1 micron and about 1000 microns.

31. The illumination system of claim 1, wherein said elongate ridges have the same heights.

32. The illumination system of claim 1, wherein said elongate ridges have different heights.

33. The illumination system of claim 1, wherein said elongate ridges have an average vertex angle of between about 15 degrees and about 65 degrees.

34. The illumination of claim 1, wherein said ridges have an average angle $\alpha$ of between about 10 degrees and about 65 degrees.

35. The illumination system of claim 1, wherein said ridges have an average angle $\alpha$ of between about 10 degrees and about 25 degrees.

36. The illumination system of claim 1, wherein said ridges comprise vertices and at least one of said vertices of said ridges is formed by a rounded surface.

37. The illumination system of claim 36, wherein said ridges have an angle $\alpha$ of between about 20 degrees and about 37 degrees.

38. The illumination system of claim 1, wherein said elongate ridges have a constant spacing therebetween.

39. The illumination system of claim 1, wherein said elongate ridges have varying spacing therebetween.

40. The illumination system of claim 1, wherein said elongate ridges have an average length of between about 50 percent and about 100 percent of the length of the light pipe.

41. The illumination system of claim 1, wherein said elongate ridges have an average length of between about 0.1 centimeters and about 10 centimeters.

42. The illumination system of claim 1, wherein said elongate ridges extend along a direction parallel to said longitudinal direction.

43. The illumination system of claim 1, wherein said elongate ridges are oriented at an oblique angle with respect to said longitudinal direction.

44. The illumination system of claim 43, wherein said angle is between about 5 degrees and about 40 degrees.

45. The illumination system of claim 1, wherein a first portion of said elongate ridges and valleys are oriented at an angle with respect to said longitudinal direction and a second portion of said elongate ridges and valleys are oriented at a different angle with respect to said longitudinal direction.

46. The illumination system of claim 1, wherein a first portion of said elongate ridges and valleys cross a second portion of said elongate ridges and valleys.

47. The illumination system of claim 1, wherein light reflects from said sloping surfaces via total internal reflection.

48. The illumination system of claim 1, wherein the illumination system comprises a flashlight.

49. The illumination system of claim 1, wherein the illumination system comprises a portable light.

50. The illumination system of claim 1, wherein light entering said input end is mixed such that the standard deviation of the illuminance distribution is reduced to less than 5 percent at said output end.

51. The illumination system of claim 1, wherein light of varying color entering said input end is mixed such that the standard deviation of the delta_u'_v' of the color of the light is reduced to less than 0.003 at said output end.

52. The illumination system of claim 1, wherein one or more of said ridges are asymmetrical.

53. A lighting apparatus comprising:
a light source comprising a plurality of emitters; and
a mixer comprising a solid light pipe having an input end and an output end and a central region therebetween, said mixer comprising at least one rippled surface in said central region comprising a plurality of peaks and valleys connected by sloping surface portions, said peaks and valleys each comprising a vertex at least partially formed by a rounded portion or by two or more substantially nonorthogonal surface portions, said peaks having an average angle α of between about 10 and about 65 degrees,
wherein at least one of said emitters is offset from the center of the input end, and light entering said input end propagating longitudinally along said central region is deflected by said sloping surface portions of said rippled surface in an azimuthal direction thereby increasing mixing of said light in said mixer and uniformity at said output end.

54. The lighting apparatus of claim 53, wherein said plurality of emitters comprises a plurality of light emitting diodes.

55. The lighting apparatus of claim 54, wherein said plurality of emitters comprises red, green, and blue light emitting diodes.

56. The lighting apparatus of claim 53, wherein said plurality of emitters comprises at least one emitter that emits light of a shorter wavelength and a phosphor that converts said light having said shorter wavelength into light having a longer wavelength.

57. The lighting apparatus of claim 56, wherein said plurality of emitters comprises a plurality of visible wavelength emitters and said at least one emitter that emits light of a shorter wavelength comprises a UV light emitter.

58. The lighting apparatus of claim 53, wherein said mixer comprises sidewalls defining a cavity for propagation of light therein, said at least one rippled surface being disposed within said cavity spaced apart from said sidewalls.

59. The lighting apparatus of claim 58, wherein said sidewalls comprise a reflective material.

60. The lighting apparatus of claim 58, wherein said cavity comprises substantially optically transmissive material.

61. The lighting apparatus of claim 58, wherein said at least one rippled surface is substantially transmissive.

62. The lighting apparatus of claim 53, wherein said mixer comprises a flexible light pipe.

63. The lighting apparatus of claim 53, wherein said mixer comprises an optical fiber.

64. The lighting apparatus of claim 63, wherein said optical fiber has a core diameter of at least 3 millimeters in diameter.

65. The lighting apparatus of claim 53, wherein said peaks are rounded.

66. The lighting apparatus of claim 53, wherein size, shape, or spacing of the peaks or valleys varies for different peaks or valleys.

67. The lighting apparatus of claim 53, wherein said light source comprises an incoherent light source.

68. The lighting apparatus of claim 53, wherein the lighting apparatus comprises a flashlight.

69. The lighting apparatus of claim 53, wherein the lighting apparatus comprises a portable light.

70. The lighting apparatus of claim 53, wherein light entering said input end is mixed such that the standard deviation of the illuminance distribution is reduced to less than 5 percent at said output end.

71. The lighting apparatus of claim 53, wherein light of varying color entering said input end is mixed such that the standard deviation of the delta_u'_v' of the color of the light is reduced to less than 0.003 at said output end.

72. The lighting apparatus of claim 53, wherein said peaks have an average apex angle of between about 15 degrees and about 65 degrees.

73. The lighting apparatus of claim 53, wherein said peaks have an average angle α of between about 10 degrees and about 25 degrees.

74. The lighting apparatus of claim 53, wherein said vertices of said peaks are formed by round surfaces.

75. The lighting apparatus of claim 74, wherein said peaks have an angle α of between about 20 degrees and about 37 degrees.

76. The lighting apparatus of claim 74, wherein one or more of said peaks are asymmetrical.

77. An illumination system comprising:
a plurality of light emitting diodes; and
an elongate member having an input end and an output end and a central region therebetween, said input end having a different size or shape than said output end, and at least one of said light emitting diodes displaced from the center of the input end;
wherein said elongate member comprises at least one rippled surface in said central region comprising a plurality of peaks and valleys connected by sloping surface portions, said peaks each comprising a vertex at least partially formed by two or more substantially nonorthogonal surface portions or by a rounded surface, said peaks having an average angle α of less than about 65 degrees, such that light entering said input end propagating longitudinally along said central region is deflected by said sloping surface portions of said rippled surface in an azimuthal direction thereby increasing mixing of said light and uniformity at said output end.

78. The illumination system of claim 77, wherein said input end has a different size than said output end.

79. The illumination system of claim 78, wherein said elongate member has a length that is sufficiently long such that etendue is substantially conserved from said input end to said output end.

80. The illumination system of claim 77, wherein said input end has a different shape than said output end.

81. The illumination system of claim 80, wherein said input end has a rectilinear shaped aperture and said output end has a curvilinear shaped aperture.

82. The illumination system of claim 80, wherein said output end comprises a curved output face having optical power.

83. The illumination system of claim 1, wherein at least one of said ridges or valleys is at least partially formed by a rounded surface.

84. An illumination system comprising:
a plurality of light emitting diodes; and
a solid light pipe having an input end and an output end and a central region therebetween, said input end having a different size or shape than said output end, and at least one of said light emitting diodes displaced from the center of the input end,
wherein said solid light pipe comprises at least one rippled surface in said central region comprising a plurality of peaks and valleys connected by sloping surface portions, at least one of said peaks and valleys at least partially formed by a faceted surface comprising two or more substantially nonorthogonal surface portions or by a rounded surface, such that light entering said input end propagating longitudinally along said central region is deflected by said sloping surface portions of said rippled surface in an azimuthal direction thereby increasing mixing of said light and uniformity at said output end.

85. The illumination system of claim 84, wherein said input end has a different size than said output end.

86. The illumination system of claim 85, wherein said solid light pipe has a length that is sufficiently long such that etendue is substantially conserved from said input end to said output end.

87. The illumination system of claim 84, wherein said input end has a different shape than said output end.

88. The illumination system of claim 84, wherein said input end has a rectilinear shaped aperture and said output end has a curvilinear shaped aperture.

89. The illumination system of claim 84, wherein said peaks and valleys each comprise a vertex at least partially formed by two or more substantially nonorthogonal surface portions.

90. The illumination system of claim 84, wherein said peaks and valleys each comprise a vertex at least partially formed by a rounded portion.

91. The lighting apparatus of claim 53, wherein the average angle α is an average of a peak angle defined for each of said plurality of peaks, each peak angle defined in terms of a height of a peak and a distance between successive peaks.

92. The illumination system of claim 77, wherein the average angle α is an average of a peak angle defined for each of said plurality of peaks, each peak angle defined in terms of a height of a peak and a distance between successive peaks.

93. The illumination system of claim 77, wherein said peaks have an average angle α of between about 10 degrees and about 65 degrees.

94. The illumination system of claim 9, wherein said plurality of different light emitting diodes are arranged in the x direction and said light pipe has a length-to-width ratio for a width along the x direction of at least about 6:1 and said light at said input end of said light pipe has a numerical aperture at least about 0.45.

95. The illumination system of claim 12, wherein said plurality of different light emitting diodes are arranged in the x direction and said light pipe has a length-to-width ratio for a width along the x direction of at least about 9:1 and said light at said input end of said light pipe has a numerical aperture at least about 0.45.

96. The lighting apparatus of claim 53, wherein said plurality of emitters are arranged in the x direction and said light pipe has a length-to-width ratio for a width along the x direction of at least about 9:1 and said light entering said input end has a numerical aperture at least about 0.45.

97. The illumination system of claim 1, wherein said three or more substantially nonorthogonal surface portions comprise said sloping surfaces.

98. The lighting apparatus of claim 53, wherein said two or more substantially nonorthogonal surface portions comprise said sloping surface portions.

99. The illumination system of claim 77, wherein said two or more substantially nonorthogonal surface portions comprise said sloping surface portions.

100. The illumination system of claim 84, wherein said two or more substantially nonorthogonal surface portions comprise said sloping surface portions.

101. The illumination system of claim 1, wherein at least one of said valleys is at least partially formed by a rounded surface.

102. The illumination system of claim 1, wherein said central region of said mixer has a top, a bottom, and first and second sides, and a plurality of elongate ridges and valleys and sloping surfaces therebetween on at least one of said top and bottom and on at least one of said first and second sides.

103. The lighting apparatus of claim 53, wherein said central region of said solid light pipe has a top, a bottom, and first and second sides, and a plurality of peaks and valleys connected by sloping surface portions on at least one of said top and bottom and on at least one of said first and second sides.

104. The illumination system of claim 77, wherein said central region of said elongate member has a top, a bottom, and first and second sides, and peaks and valleys connected by sloping surface portions on at least one of said top and bottom and on at least one of said first and second sides.

105. The illumination system of claim 84, wherein said central region of said solid light pipe has a top, a bottom, and first and second sides, and peaks and valleys connected by sloping surface portions on at least one of said top and bottom and on at least one of said first and second sides.

106. The lighting apparatus of claim 53, wherein said mixer comprises an optical path extending in a longitudinal direction from said input end through said central region to said output end, said peaks extending along a direction parallel to said longitudinal direction.

107. The lighting apparatus of claim 53, wherein said mixer comprises an optical path extending in a longitudinal direction from said input end through said central region to said output end, said peaks oriented at an oblique angle with respect to said longitudinal direction.

108. The lighting apparatus of claim 107, wherein said angle is between about 5 degrees and about 40 degrees.

109. The illumination system of claim 77, wherein said elongate member comprises an optical path extending in a longitudinal direction from said input end through said central region to said output end, said peaks extending along a direction parallel to said longitudinal direction.

110. The illumination system of claim 77, wherein said elongate member comprises an optical path extending in a longitudinal direction from said input end through said central region to said output end, said peaks oriented at an oblique angle with respect to said longitudinal direction.

111. The illumination system of claim 110, wherein said angle is between about 5 degrees and about 40 degrees.

112. The illumination system of claim 84, wherein said solid light pipe comprises an optical path extending in a longitudinal direction from said input end through said central region to said output end, said peaks extending along a direction parallel to said longitudinal direction.

113. The illumination system of claim 84, wherein said solid light pipe comprises an optical path extending in a longitudinal direction from said input end through said central region to said output end, said peaks oriented at an oblique angle with respect to said longitudinal direction.

114. The illumination system of claim 113, wherein said angle is between about 5 degrees and about 40 degrees.

* * * * *